US012236397B2

(12) United States Patent
Volkerink et al.

(10) Patent No.: US 12,236,397 B2
(45) Date of Patent: Feb. 25, 2025

(54) MONITORING OF UNIT LOAD DEVICE AND CARTS USING WIRELESS IOT DEVICES

(71) Applicant: Trackonomy Systems, Inc., San Jose, CA (US)

(72) Inventors: Hendrik J. Volkerink, Palo Alto, CA (US); Ajay Khoche, West San Jose, CA (US); Aaron Storrs, Santa Cruz, CA (US); Patrick Muggler, Palo Alto, CA (US); Prabhat Verma, Fremont, CA (US)

( * ) Notice: Subject to any disclaimer, the term of this patent is extended or adjusted under 35 U.S.C. 154(b) by 0 days.

(21) Appl. No.: 18/433,227

(22) Filed: Feb. 5, 2024

(65) Prior Publication Data

US 2024/0265340 A1 Aug. 8, 2024

Related U.S. Application Data

(60) Provisional application No. 63/460,592, filed on Apr. 19, 2023, provisional application No. 63/443,155, filed on Feb. 3, 2023.

(51) Int. Cl.

| | |
|---|---|
| ***G06Q 10/087*** | (2023.01) |
| ***G06Q 10/0833*** | (2023.01) |
| ***H04W 4/029*** | (2018.01) |
| *G06Q 10/10* | (2023.01) |

(52) U.S. Cl.

CPC ....... *G06Q 10/087* (2013.01); *G06Q 10/0833* (2013.01); *H04W 4/029* (2018.02)

(58) Field of Classification Search

CPC .. G06Q 10/087; G06Q 10/0833; H04W 4/029

USPC ............ 705/28

See application file for complete search history.

(56) References Cited

U.S. PATENT DOCUMENTS

| | | | | |
|---|---|---|---|---|
| 5,779,839 | A | 7/1998 | Tuttle et al. | |
| 6,429,810 | B1 | 8/2002 | De | |
| 11,527,148 | B1 * | 12/2022 | Volkerink | G08B 25/10 |
| 2004/0200477 | A1 | 10/2004 | Bleys et al. | |
| 2007/0285240 | A1 | 12/2007 | Sensenig et al. | |
| 2008/0122656 | A1 | 5/2008 | Carani et al. | |
| 2012/0191272 | A1 | 7/2012 | Andersen et al. | |

(Continued)

FOREIGN PATENT DOCUMENTS

| | | | |
|---|---|---|---|
| WO | 2006080857 | A1 | 8/2006 |
| WO | 2016115088 | A1 | 7/2016 |

OTHER PUBLICATIONS

International Search Report and Written Opinion for PCT/US2024/014516 dated Jul. 16, 2024, 21 pages.

(Continued)

*Primary Examiner* — Garcia Ade

(57) ABSTRACT

A gateway node detects loading of a unit load device (ULD) into a vehicle by fusing sensed information. The gateway node, physically coupled to a loading platform of a loader, determines its location and a vehicle identifier (ID) of the vehicle based on the location. The gateway node detects an increase in elevation of the loading platform and receives a movement message containing a unique ID of a tape node attached to the ULD. The gateway node determines that the ULD is being loaded into the vehicle based on the vehicle ID, the detected increase in elevation of the loading platform, and an association of the unique ID with the ULD.

22 Claims, 27 Drawing Sheets

(56) References Cited

U.S. PATENT DOCUMENTS

| | | | | |
|---|---|---|---|---|
| 2015/0077256 | A1 | 3/2015 | Maddox | |
| 2015/0349917 | A1 | 12/2015 | Skaaksrud | |
| 2018/0111698 | A1 | 4/2018 | Podnar et al. | |
| 2018/0367872 | A1 | 12/2018 | Lucrecio et al. | |
| 2019/0279064 | A1 | 9/2019 | Tucker | |
| 2021/0110122 | A1 | 4/2021 | Volkerink | |
| 2022/0058458 | A1 | 2/2022 | Lee et al. | |
| 2022/0108088 | A1* | 4/2022 | Volkerink .......... | G06K 19/0723 |
| 2023/0028603 | A1* | 1/2023 | Volkerink .......... | G06Q 10/0833 |
| 2023/0252399 | A1* | 8/2023 | Khoche .............. | G06Q 10/0833 705/333 |

OTHER PUBLICATIONS

International Search Report and Written Opinion for PCT/US2024/021536 dated Aug. 22, 2024, 15 pages.

Non Final Office Action for U.S. Appl. No. 18/617,529, mailed Nov. 26, 2024, 14 pages.

* cited by examiner

MONITORING OF UNIT LOAD DEVICE AND CARTS USING WIRELESS IOT DEVICES

RELATED APPLICATIONS

This application claims priority to U.S. Patent Application Ser. No. 63/443,155, filed Feb. 3, 2023, and to U.S. Patent Application Ser. No. 63/460,592, filed Apr. 19, 2023, each of which is incorporated herein by reference in their entirety as if fully set forth.

FIELD OF THE DISCLOSURE

This disclosure generally relates to wireless internet of things (IOT) devices.

BACKGROUND

Incorrect handling of a unit load device (ULD) at a transportation facility results in costly delays and/or lost assets, particularly where the ULD departs on the wrong vehicle.

SUMMARY

One aspect of the present embodiments includes the realization that early detection and notification of a unit load device (ULD) or asset being erroneously loaded onto a transportation vehicle at a transportation facility (e.g., loaded onto the wrong vehicle) results in easier correction or the error with reduced effort. This is true of any type of transportation vehicle and any type of asset. The problem is exacerbated when the transportation vehicle into which the asset is incorrectly loaded is scheduled and carrying many assets, requiring significant effort and time to find and remove the incorrectly loaded asset. Where the error is not detected and the vehicle departs, the cost of correcting the error is significantly greater, requiring further transportation of the asset to its intended destination. The present embodiments solve this problem by detecting the error sooner and notifying an operator as the asset is being incorrectly loaded onto the wrong vehicle.

Another aspect of the present embodiments includes the realization that distinguishing between assets moving through an area containing both stationary and moving assets is difficult using simple wireless proximity tracking. For example, at transportation facilities, many assets are pass through areas containing other assets, making tracking more difficult and less reliable. The present embodiments solve this problem by combining multiple tracking techniques to track asset movement more reliably and to avoid generating false negatives, particularly where assets are moved with and around other assets.

In certain embodiments, the techniques described herein relate to a method for detecting loading of an asset into a vehicle, including: detecting, by a gateway node physically coupled to a loading platform of a loader, an increase in elevation of the loading platform; receiving, by the gateway node, a movement message containing a unique ID of a wireless tracking device attached to the asset; and determining, by the gateway node, that the asset is being loaded into the vehicle based on the detected increase in elevation of the loading platform and an association of the unique ID with the asset.

In certain embodiments, the techniques described herein relate to a method, including: determining, by a wireless tracking device on an asset, an elevation of the asset; and determining, by the wireless tracking device, that the asset has been loaded onto a vehicle when the elevation corresponds to an elevation of a cargo hold of the vehicle.

In certain embodiments, the techniques described herein relate to a method for detecting loading of an asset into a vehicle, including: receiving, by a gateway node physically coupled to a loading platform of a loader, a movement message containing a loading indication and a unique ID of a wireless tracking device physically attached to the asset; and determining, by the gateway node, that the asset is being loaded into the vehicle based on the loading indication and an association of the unique ID with the asset.

In certain embodiments, the techniques described herein relate to a method for determining assets being moved by a tug, including: transmitting, at intervals, a request from a gateway node physically coupled to the tug; receiving, at the gateway node, responses to the request from wireless tracking devices in communication range of the gateway node, each response including a corresponding node identifier (ID) of the wireless tracking device sending the response; adding the responses to an in-range list within the gateway node; removing responses received outside a time window from the in-range list; grouping the responses based on the node ID; ignoring groups having fewer than a validating number of responses; determining, for each non-ignored group, a distance of a corresponding asset from the gateway node based on an average RSSI of a strongest validating number of responses for the group; ignoring groups located outside a geofence around the gateway node; and identifying assets associated with non-ignored groups as being on a train pulled by the tug.

In certain embodiments, the techniques described herein relate to a wireless tracking method for generating a notification of a tracking anomaly with low latency for movement of an asset at a transportation facility, including: tracking, by a first gateway node, movement of the asset within a functional area of the transportation facility; tracking, by a second gateway node, movement of the asset on vehicle within the transportation facility; tracking, by a third gateway node, movement of the asset being loaded into a cargo space of a transportation vehicle; determining an anomaly when any of the tracking movements indicate that the asset has departed from an expected path through the transportation facility; and generating a notification indicating the anomaly early during movement of the asset.

In certain embodiments, the techniques described herein relate to a method, including: determining, by a gateway node associated with a vehicle, movement of the vehicle at a speed above a threshold value; receiving, by the gateway node on a motion communication channel when the speed is above the threshold speed, a broadcasted signal including an identifier of a wireless tracking device; and determining, by the gateway node, that an asset associated with the broadcasted identifier is loaded onto the vehicle when that a received signal strength of the broadcast signal is above a threshold value.

In certain embodiments, the techniques described herein relate to a method for determining assets being moved by a tug, including: receiving, by a gateway node of the tug, a first message indicating a first front latch of a first cart is coupled to a first rear latch associated with a first rear latch node ID; determining that the first cart is coupled to the tug when the first rear latch node ID is associated with a rear latch tape node of the tug; and determining that the first cart is coupled to a second cart when the first rear latch node ID is associated with a rear latch tape node of the second cart.

In certain embodiments, the techniques described herein relate to a method for determining coupling of carts in a train, including: receiving, by a front latch tape node of a first cart, a first transmission including a rear latch ID from a rear latch tape node of a second cart or a tug; determining, by the front latch tape node, a first distance of the rear latch tape node from the front latch tape node based on an RSSI of the first transmission; determining that a front latch of the first cart is coupled to a rear latch of the second cart or the tug when the first distance is within a first geofence around the front latch tape node; and sending a message indicating the coupling between a front latch ID of the front latch and a rear latch ID of the rear latch.

In certain embodiments, the techniques described herein relate to a method for detecting an asset on a cart, including: receiving, by a front latch tape node of the cart, a first transmission including a first node ID from a first wireless tracking device attached to the asset; determining, by the front latch tape node, a first distance of the first wireless tracking device from the front latch tape node based on a first RSSI of the first transmission; determining, by the front latch tape node, that; receiving, by a rear latch tape node of the cart, a second transmission including a second node ID from a second wireless tracking device attached to a second asset; determining, by the rear latch tape node, a second distance of the tape node from the rear latch tape node based on a second RSSI of the second transmission; sending a message including the second node ID from the rear latch tape node to the front latch tape node when the second distance is within a second geofence of the rear latch tape node; and determining, by the front latch tape node, an asset ID of the first asset based on the first node ID when (a) the first distance is within a first geofence of the front latch tape node and (b) the first node ID and the second node ID are associated with the asset ID.

DETAILED DESCRIPTION OF THE EMBODIMENTS

Figure 1:
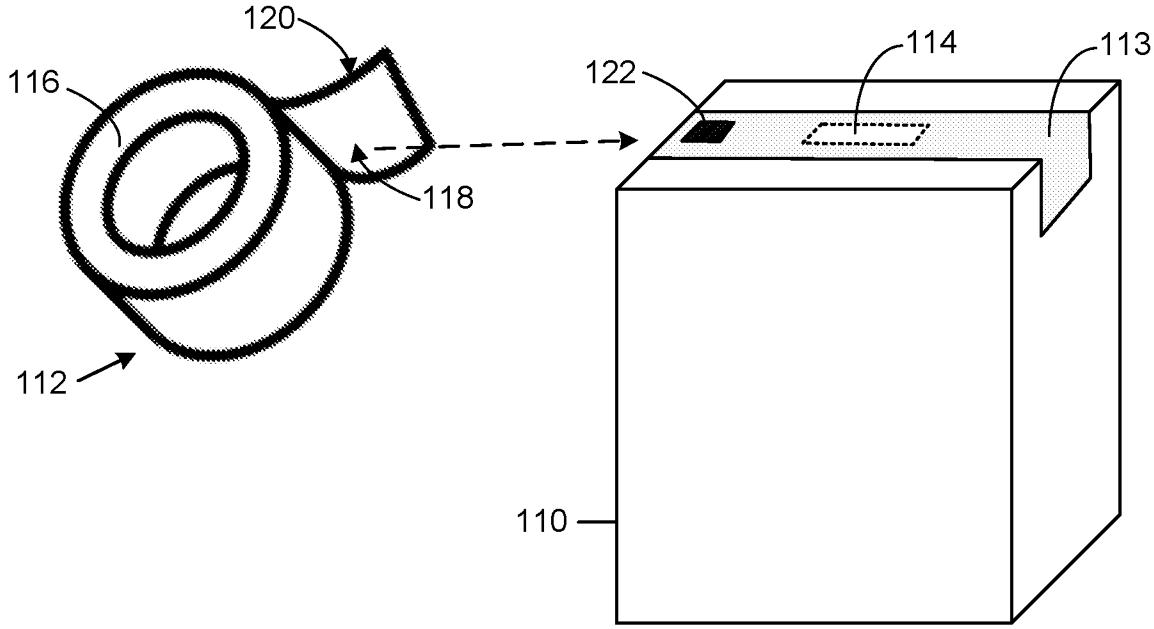
FIG. 1 is a schematic illustrating one example adhesive tape-agent platform used to seal a package for shipment, in embodiments.

FIG. 1 is a schematic illustrating one example adhesive tape-agent platform 112, including wireless transducing circuit 114, used to seal a package 110 for shipment. In this example, a segment 113 of the adhesive tape-agent platform 112 is dispensed from a roll 116 and affixed to the package 110. The adhesive tape-agent platform 112 includes an adhesive side 118 and a non-adhesive surface 120. The adhesive tape-agent platform 112 may be dispensed from the roll 116 in the same way as any conventional packing tape, shipping tape, or duct tape. For example, the adhesive tape-agent platform 112 may be dispensed from the roll 116 by hand, laid across the seam where the two top flaps of the package 110 meet, and cut to a suitable length either by hand or using a cutting instrument (e.g., scissors or an automated or manual tape dispenser). Examples of such tape agents include tape agents having non-adhesive surface 120 that carry one or more coatings or layers (e.g., colored, light reflective, light absorbing, and/or light emitting coatings or layers). Further, the segment 113 may include an identifier 122 (e.g., a QR code, RFID chip, etc.) that may be used to associate the segment 113 with the package 110, as discussed below.

Figure 2:
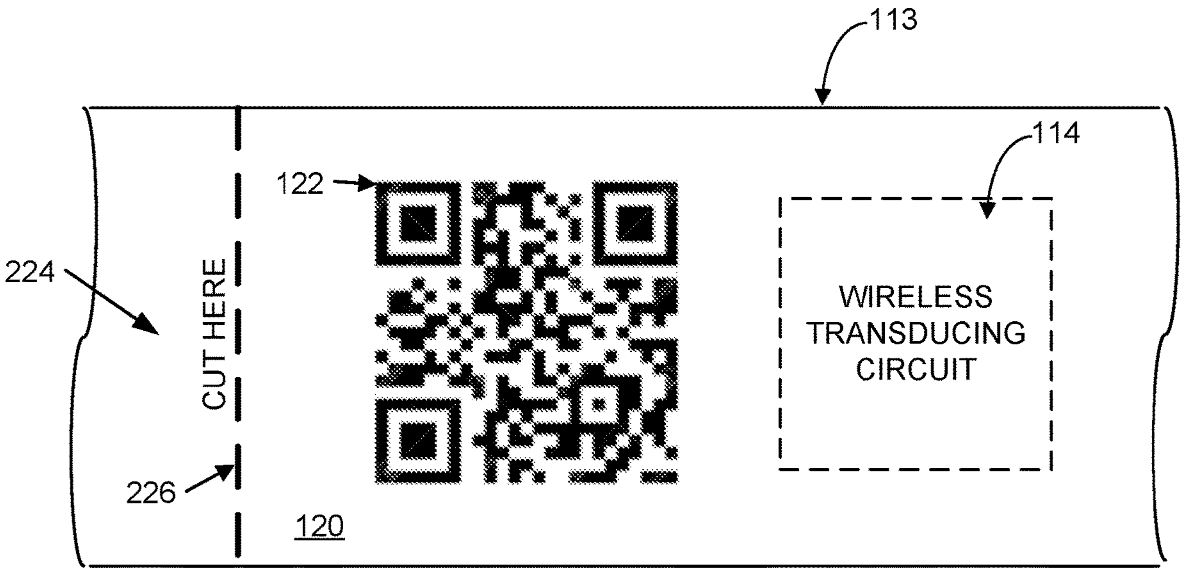
FIG. 2 is a schematic illustrating a non-adhesive surface of a segment of the adhesive tape agent platform of FIG. 1, in embodiments.

FIG. 2 is a schematic illustrating a non-adhesive surface 120 of the segment 113 of the adhesive tape agent platform 112 of FIG. 1 including writing or other markings that convey instructions, warnings, or other information to a person or machine (e.g., a bar code reader), or may simply be decorative and/or entertaining. For example, different types of adhesive tape-agent platforms may be marked with distinctive colorations to distinguish one type of adhesive tape agent platform from another. In the illustrated example of FIG. 2, the segment 113 of the adhesive tape agent platform 112 includes an identifier 122 (e.g., a two-dimensional bar code, such as a QR Code), written instructions 224 (e.g., "Cut Here"), and an associated cut line 226 that indicates where the user should cut the adhesive tape agent platform 112. The written instructions 224 and the cut line 226 typically are printed or otherwise marked on the top non-adhesive surface 120 of the adhesive tape agent platform 112 during manufacture. The identifier 122 (e.g., a two-dimensional bar code), on the other hand, may be marked on the non-adhesive surface 120 of the adhesive tape agent platform 112 during the manufacture of the adhesive tape agent platform 112 or, alternatively, may be marked on the non-adhesive surface 120 of the adhesive tape agent platform 112 as needed using, for example, a printer or other marking device.

To avoid damaging the functionality of the segments of the adhesive tape agent platform 112, the cut lines 226 may demarcate the boundaries between adjacent segments at locations that are free of any active components of the wireless transducing circuit 114. The spacing between the wireless transducing circuit 114 and the cut lines 226 may vary depending on the intended communication, transducing and/or adhesive taping application. In the example illustrated in FIG. 1, the length of the adhesive tape-agent platform 112 that is dispensed to seal the package 110 corresponds to a single segment of the adhesive tape-agent platform 112. In other examples, the length of the adhesive tape-agent platform 112 needed to seal a package or otherwise serve the adhesive function for which the adhesive tape-agent platform 112 is being applied may include multiple segments 113 of the adhesive tape-agent platform 112, one or more of which segments 113 may be activated upon cutting the length of the adhesive tape-agent platform 112 from the roll 116 and/or applying the segment 113 of the adhesive tape agent platform to the package 110.

In some examples, the wireless transducing circuits 114 embedded in one or more segments 113 of the adhesive tape-agent platform 112 are activated when the adhesive tape agent platform 112 is cut along the cut line 226. In these examples, the adhesive tape-agent platform 112 includes one or more embedded energy sources (e.g., thin film batteries, which may be printed, or conventional cell batteries, such as conventional watch style batteries, rechargeable batteries, or other energy storage device, such as a super capacitor or charge pump) that supply power to the wireless transducing circuit 114 in one or more segments of the adhesive tape-agent platform 112 in response to being separated from the adhesive tape-agent platform 112 (e.g., along the cut line 226).

In some examples, each segment 113 of the adhesive tape agent platform 112 includes its own respective energy source. In some embodiments, the energy source is a battery of a type described above, an energy harvesting component or system that harvests energy from the environment, or both. In some of these examples, each energy source is configured to only supply power to the components in its respective adhesive tape platform segment regardless of the number of contiguous segments that are in a given length of the adhesive tape-agent platform 112. In other examples, when a given length of the adhesive tape agent platform 112 includes multiple segments 113, the energy sources in the respective segments 113 are configured to supply power to the wireless transducing circuit 114 in all of the segments 113 in the given length of the adhesive tape agent platform 112. In some of these examples, the energy sources are connected in parallel and concurrently activated to power the wireless transducing circuit 114 in all of the segments 113 at the same time. In other examples, the energy sources are connected in parallel and alternately activated to power the wireless transducing circuit 114 in respective ones of the segments 113 at different time periods, which may or may not overlap.

Figure 3:
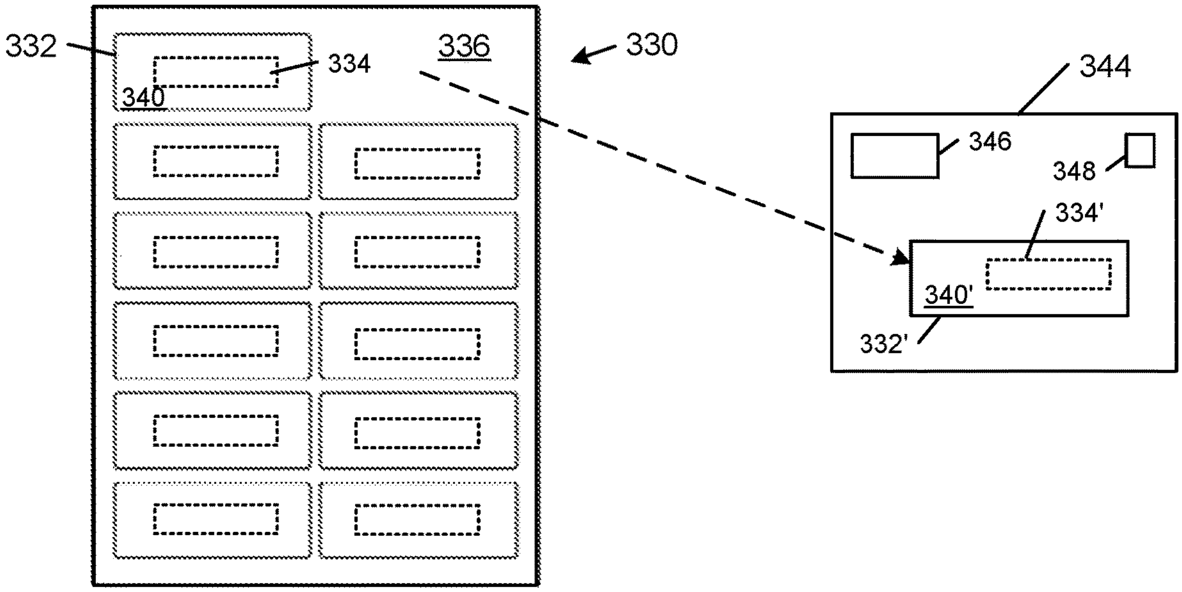
FIG. 3 shows one example adhesive tape platform that includes a set of adhesive tape platform segments on a backing sheet, in embodiments.

FIG. 3 shows an example adhesive tape platform 330 that includes a set of adhesive tape platform segments 332 each of which includes a respective set of embedded wireless transducing circuit components 334, and a backing sheet 336 with a release coating that prevents the adhesive segments 332 from adhering strongly to the backing sheet 336. Adhesive tape platform 330 may represent adhesive tape platform 112 of FIG. 1. Each adhesive tape platform segment 332 includes an adhesive side facing the backing sheet 336, and an opposing non-adhesive side 340. In this example, a particular segment 332 of the adhesive tape platform 330 has been removed from the backing sheet 336 and affixed to an envelope 344. Each segment 332 of the adhesive tape platform 330 can be removed from the backing sheet 336 in the same way that adhesive labels can be removed from a conventional sheet of adhesive labels (e.g., by manually peeling a segment 332 from the backing sheet 336). In general, the non-adhesive side 340 of the segment 332 may include any type of writing, markings, decorative designs, or other ornamentation. In the illustrated example, the non-adhesive side 340 of the segment 332 includes writing or other markings that correspond to a destination address for the envelope 344. The envelope 44 also includes a return address 346 and, optionally, a postage stamp or mark 348.

In some examples, segments of the adhesive tape platform 330 are deployed by a human operator. The human operator may be equipped with a mobile phone or other device that allows the operator to authenticate and initialize the adhesive tape platform 330. In addition, the operator can take a picture of a parcel including the adhesive tape platform and any barcodes associated with the parcel and, thereby, create a persistent record that links the adhesive tape platform 330 to the parcel. In addition, the human operator typically will send the picture to a network service and/or transmit the picture to the adhesive tape platform 330 for storage in a memory component of the adhesive tape platform 330.

In some examples, the wireless transducing circuit components 334 that are embedded in a segment 332 of the adhesive tape platform 330 are activated when the segment 332 is removed from the backing sheet 336. In some of these examples, each segment 332 includes an embedded capacitive sensing system that can sense a change in capacitance when the segment 332 is removed from the backing sheet 336. As explained in detail below, a segment 332 of the adhesive tape platform 330 includes one or more embedded energy sources (e.g., thin film batteries, common disk-shaped cell batteries, or rechargeable batteries or other energy storage devices, such as a super capacitor or charge pump) that can be configured to supply power to the wireless transducing circuit components 334 in the segment 332 in response to the detection of a change in capacitance between the segment 332 and the backing sheet 336 as a result of removing the segment 332 from the backing sheet 336.

Figure 4:
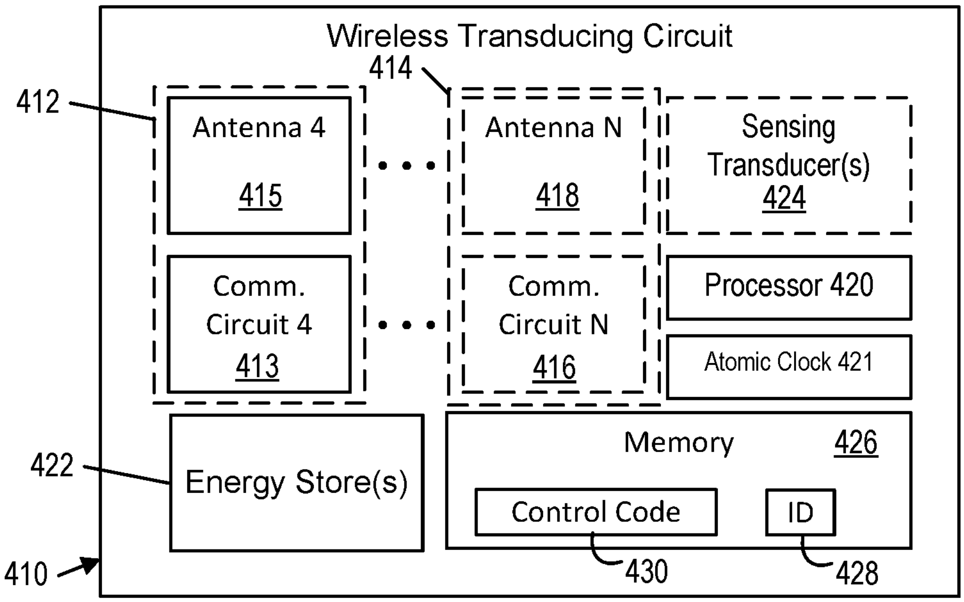
FIG. 4 is a block diagram illustrating components of an example wireless transducing circuit that includes one or more wireless communication modules, in embodiments.

FIG. 4 shows a block diagram of the components of an example wireless transducing circuit 410 (e.g., an agent) that includes one or more wireless communication modules 412, 414. Each wireless communication module 412, 414 includes a wireless communication circuit 413, 416, and an antenna 415, 418, respectively. Each wireless communication circuit 413, 416 may represent a receiver or transceiver integrated circuit that implements one or more of GSM/GPRS, Wi-Fi, LoRa, Bluetooth, Bluetooth Low Energy, Z-wave, and ZigBee. The wireless transducing circuit 410 also includes a processor 420 (e.g., a microcontroller or microprocessor), a solid-state atomic clock 421, at least one energy store 422 (e.g., non-rechargeable or rechargeable printed flexible battery, conventional single or multiple cell battery, and/or a super capacitor or charge pump), one or more sensing transducers 424 (e.g., sensors and/or actuators, and, optionally, one or more energy harvesting transducers). In some examples, the conventional single or multiple cell battery may be a watch style disk or button cell battery that is in an associated electrical connection apparatus (e.g., a metal clip) that electrically connects the electrodes of the battery to contact pads on the wireless transducing circuit 410.

Sensing transducers 424 may represent one or more of a capacitive sensor, an altimeter, a gyroscope, an accelerometer, a velocity sensor, a temperature sensor, a strain sensor, a pressure sensor, a piezoelectric sensor, a weight sensor, an optical or light sensor (e.g., a photodiode or a camera), an acoustic or sound sensor (e.g., a microphone), a smoke detector, a radioactivity sensor, a chemical sensor (e.g., an explosives detector), a biosensor (e.g., a blood glucose biosensor, odor detectors, antibody based pathogen, food, and water contaminant and toxin detectors, DNA detectors, microbial detectors, pregnancy detectors, and ozone detectors), a magnetic sensor, an electromagnetic field sensor, a humidity sensor, a light emitting units (e.g., light emitting diodes and displays), electro-acoustic transducers (e.g., audio speakers), electric motors, and thermal radiators (e.g., an electrical resistor or a thermoelectric cooler).

Wireless transducing circuit 410 includes a memory 426 for storing data, such as profile data, state data, event data, sensor data, localization data, security data, and/or at least one unique identifier (ID) 428 associated with the wireless transducing circuit 410, such as one or more of a product ID, a type ID, and a media access control (MAC) ID. Memory 426 may also store control code 430 that includes machine-readable instructions that, when executed by the processor 420, cause processor 420 to perform one or more autonomous agent tasks. In certain embodiments, the memory 426 is incorporated into one or more of the processor 420 or sensing transducers 424. In other embodiments, memory 426 is integrated in the wireless transducing circuit 410 as shown in FIG. 4. The control code 430 may implement programmatic functions or program modules that control operation of the wireless transducing circuit 410, including implementation of an agent communication manager that manages the manner and timing of tape agent communications, a node-power manager that manages power consumption, and a tape agent connection manager that controls whether connections with other nodes are secure connections (e.g., connections secured by public key cryptography) or unsecure connections, and an agent storage manager that securely manages the local data storage on the wireless transducing circuit 410. In certain embodiments, a node connection manager ensures the level of security required by the end application and supports various encryption mechanisms. In some examples, a tape agent power manager and communication manager work together to optimize the battery consumption for data communication. In some examples, execution of the control code by the different types of nodes described herein may result in the performance of similar or different functions.

Figure 5:
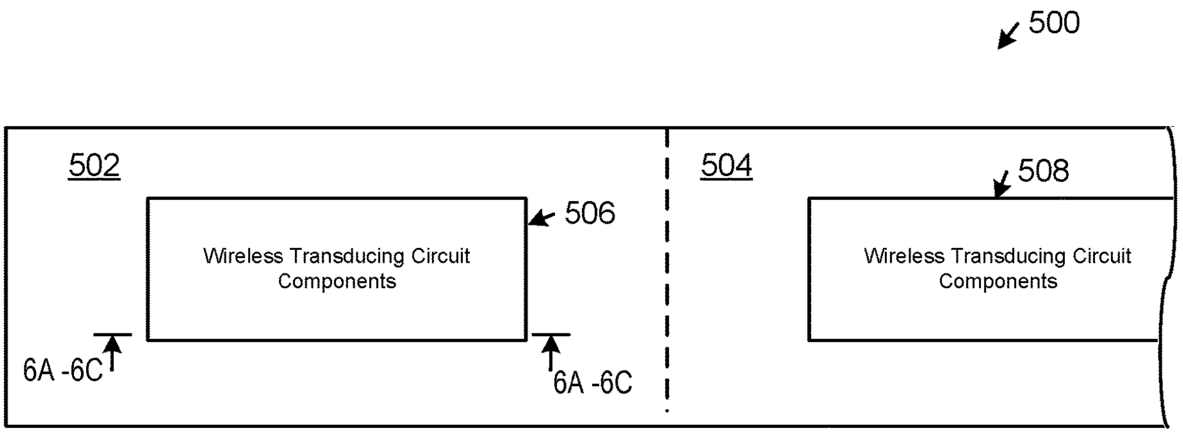
FIG. 5 is a top view of a portion of an example flexible adhesive tape platform illustrating a first segment and a portion of a second segment, in embodiments.

FIG. 5 is a top view of a portion of an example flexible adhesive tape platform 500 that shows a first segment 502 and a portion of a second segment 504. Each segment 502, 504 of the flexible adhesive tape platform 500 includes a respective set 506, 508 of the components of the wireless transducing circuit 410 of FIG. 4. The segments 502, 504 and their respective sets of components 506, 508 typically are identical and configured in the same way. In some other embodiments, however, the segments 502, 504 and/or their respective sets of components 506, 508 are different and/or configured in different ways. For example, in some examples, different sets of the segments of the flexible adhesive tape platform 500 have different sets or configurations of tracking and/or transducing components that are designed and/or optimized for different applications, or different sets of segments of the flexible adhesive tape platform may have different ornamentations (e.g., markings on the exterior surface of the platform) and/or different (e.g., alternating) lengths.

Figure 6A:
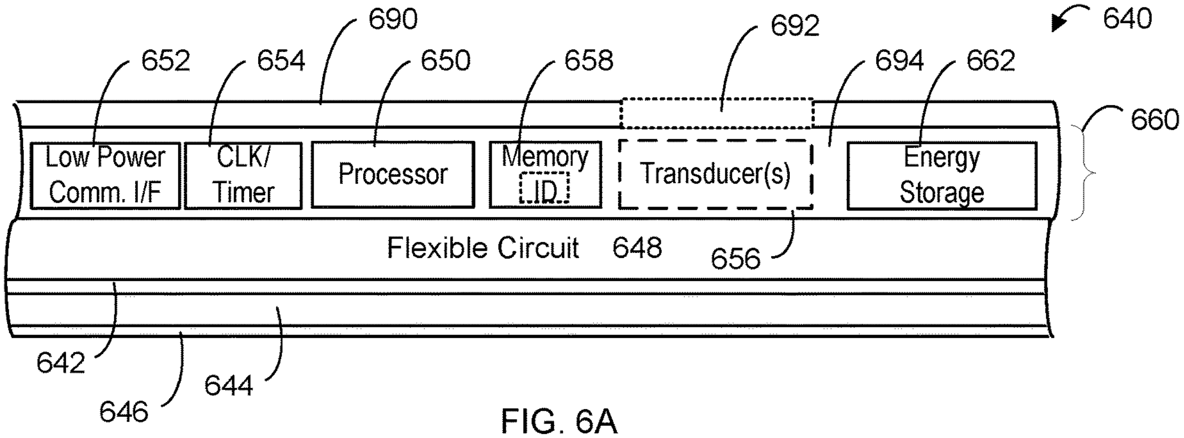
FIGS. 6A-C are schematic diagrams illustrating cross-sectional side views of portions of example segments of three types of flexible adhesive tape agent platforms, in embodiments.
Figure 6B:
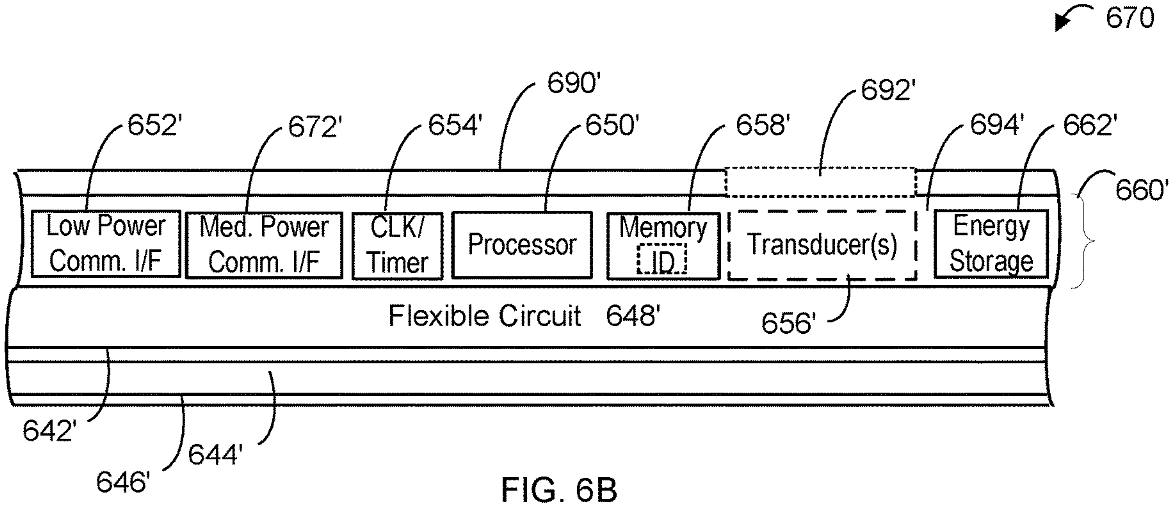
Figure 6C:
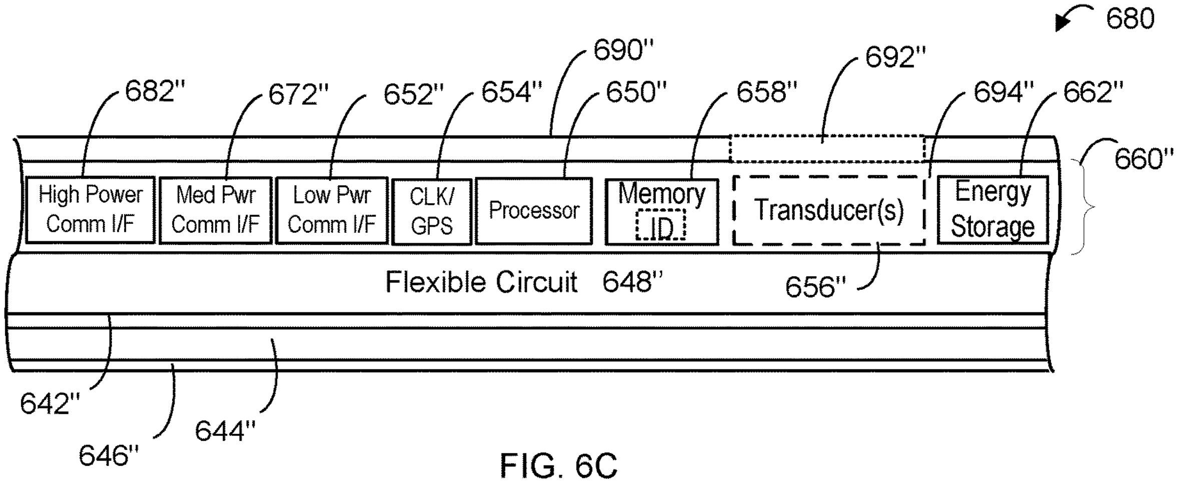
Figure 7A:
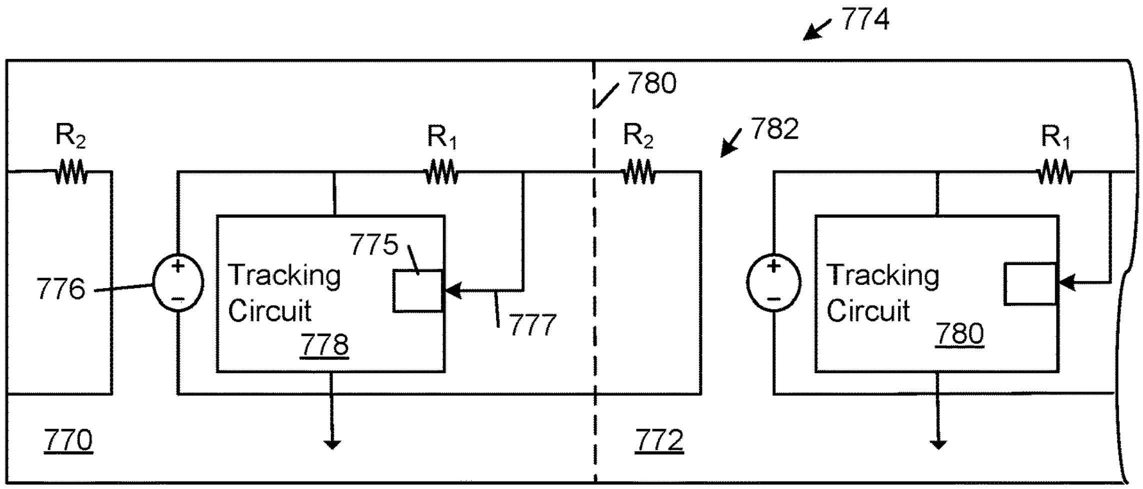
FIG. 7A is a schematic diagram illustrating an adhesive tracking product with a first example wake circuit that delivers power from an energy source to the tracking circuit in response to an event, in embodiments.
Figure 7B:
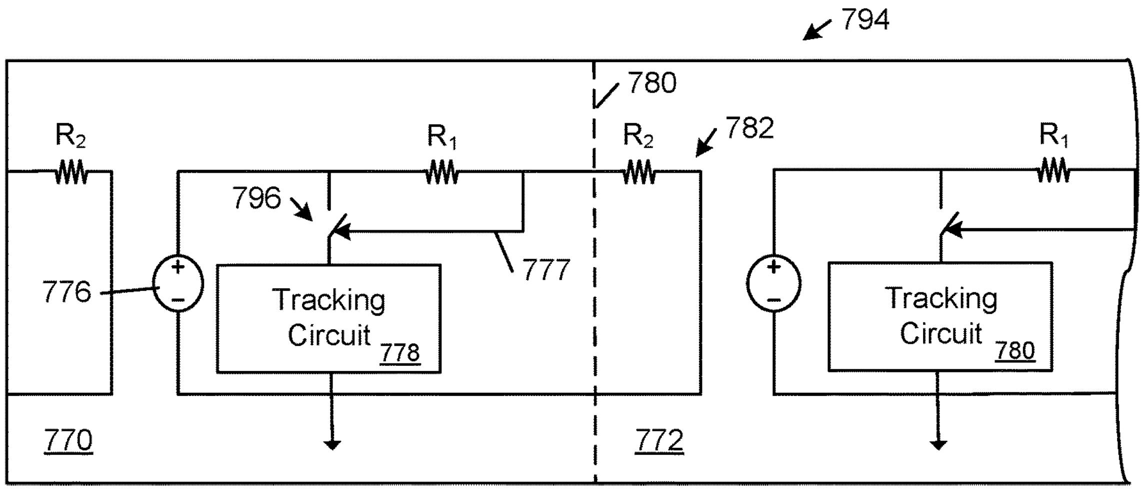
FIG. 7B is a schematic diagram illustrating an adhesive tracking product with a second example wake circuit that delivers power from an energy source to the tracking circuit in response to an event.

An example method of fabricating the adhesive tape platform 500 according to a roll-to-roll fabrication process is described in connection with FIGS. 6A-6C and as shown in FIGS. 7A and 7B of U.S. patent application Ser. No. 15/842,861, filed Dec. 14, 2017, the entirety of which is incorporated herein by reference.

The instant specification describes an example system of adhesive tape platforms (also referred to herein as "tape nodes") that can be used to implement a low-cost wireless network infrastructure for performing monitoring, tracking, and other asset management functions relating to, for example, parcels, persons, tools, equipment and other physical assets and objects. The example system includes a set of three different types of tape nodes that have different respective functionalities and different respective cover markings that visually distinguish the different tape node types from one another. In one non-limiting example, the covers of the different tape node types are marked with different colors (e.g., white, green, and black). In the illustrated examples, the different tape node types are distinguishable from one another by their respective wireless communications capabilities and their respective sensing capabilities.

FIG. 6A is a schematic illustrating a cross-sectional side view of a portion of an example segment 640 of a flexible adhesive tape agent platform (e.g., platform 500 of FIG. 5) that includes a respective set of the components of the wireless transducing circuit 410 corresponding to the first tape-agent type (e.g., white). The segment 640 includes an adhesive layer 642, an optional flexible substrate 644, and an optional adhesive layer 646 on the bottom surface of the flexible substrate 644. When the bottom adhesive layer 646 is present, a release liner (not shown) may be (weakly) adhered to the bottom surface of the adhesive layer 646. In certain embodiments where adhesive layer 646 is included, the adhesive layer 646 is an adhesive (e.g., an acrylic foam adhesive) with a high-bond strength that is sufficient to prevent removal of the segment 640 from a surface on which the adhesive layer 646 is adhered to without destroying the physical or mechanical integrity of the segment 640 and/or one or more of its constituent components.

In certain embodiments including the optional flexible substrate 644, the optional flexible substrate 644 is a prefabricated adhesive tape that includes the adhesive layers 642 and 646 and the optional release liner. In other embodiments including the optional flexible substrate 644, the adhesive layers 642, 646 are applied to the top and bottom surfaces of the flexible substrate 644 during the fabrication of the adhesive tape platform. The adhesive layer 642 may bond the flexible substrate 644 to a bottom surface of a flexible circuit 648, that includes one or more wiring layers (not shown) that connect the processor 650, a low-power wireless-communication interface 652 (e.g., a Zigbee, Bluetooth® Low Energy (BLE) interface, or other low power communication interface), a clock and/or a timer circuit 654, transducing and/or transducer(s) 656 (if present), the memory 658, and other components in a device layer 660 to each other and to the energy storage device 662 and, thereby, enable the transducing, tracking and other functionalities of the segment 640. The low-power wireless-communication interface 652 typically includes one or more of the antennas 415, 418 and one or more of the wireless communication circuits 413, 416 of FIG. 4. The segment 640 may further include a flexible cover 690, an interfacial region 692, and a flexible polymer layer 694.

FIG. 6B shows a cross-sectional side-view of a portion of an example segment 670 of a flexible adhesive tape agent platform (e.g., platform 500 of FIG. 5) that includes a respective set of the components of the wireless transducing circuit 410 corresponding to a second tape-agent type (e.g., green). The segment 670 is similar to the segment 640 shown in FIG. 6A but further includes a medium-power communication-interface 672' (e.g., a LoRa interface) in addition to the low-power communications-interface 652. The medium-power communication-interface 672' has a longer communication range than the low-power communication-interface 652'. In certain embodiments, one or more other components of the segment 670 differ from the segment 640 in functionality or capacity (e.g., larger energy source). The segment 670 may include further components, as discussed above and below with reference to FIGS. 6A, and 6C.

FIG. 6C shows a cross-sectional side view of a portion of an example segment 680 of the flexible adhesive tape-agent platform that includes a respective set of the components of the wireless transducing circuit 410 corresponding to the third tape-node type (e.g., black). The segment 680 is similar to the segment 670 of FIG. 6B, but further includes a high-power communications-interface 682" (e.g., a cellular interface; e.g., GSM/GPRS) in addition to a low-power communications-interface 652", and may include a medium-power communications-interface 672". The high-power communications-interface 682" has a range that provides global coverage to available infrastructure (e.g. the cellular network). In certain embodiments, one or more other components of the segment 680 differ from the segment 670 in functionality or capacity (e.g., larger energy source).

FIGS. 6A-6C show embodiments in which the flexible covers 690, 690', 690" of the respective segments 640, 670, and 680 include one or more interfacial regions 692, 692', 692" positioned over one or more of the transducers 656, 656', 656". In certain embodiments, one or more of the interfacial regions 692, 692', 692" have features, properties, compositions, dimensions, and/or characteristics that are designed to improve the operating performance of the platform for specific applications. In certain embodiments, the flexible adhesive tape platform includes multiple interfacial regions 692, 692', 692" over respective transducers 656, 656', 656", which may be the same or different depending on the target applications. Interfacial regions may represent one or more of an opening, an optically transparent window, and/or a membrane located in the interfacial regions 692, 692', 692" of the flexible covers 690, 690', 690" that is positioned over the one or more transducers and/or transducers 656, 656', 656". Additional details regarding the structure and operation of example interfacial regions 692, 692', 692" are described in U.S. Provisional Patent Application No. 62/680,716, filed Jun. 5, 2018, and U.S. Provisional Patent Application No. 62/670,712, filed May 11, 2018.

In certain embodiments, a planarizing polymer 694, 694', 694" encapsulates the respective device layers 660, 660', 660" and thereby reduces the risk of damage that may result from the intrusion of contaminants and/or liquids (e.g., water) into the device layer 660, 660', 660". The flexible polymer layers 694, 694', 694" may also planarize the device layers 660, 660', 660". This facilitates optional stacking of additional layers on the device layers 660, 660', 660" and also distributes forces generated in, on, or across the segments 640, 670, 680 so as to reduce potentially damaging asymmetric stresses that might be caused by the application of bending, torquing, pressing, or other forces that may be applied to the segments 640, 670, 680 during use. In the illustrated example, a flexible cover 690, 690', 690" is bonded to the planarizing polymer 694, 694', 694" by an adhesive layer (not shown).

The flexible cover 690, 690', 690" and the flexible substrate 644, 644', 644" may have the same or different compositions depending on the intended application. In some examples, one or both of the flexible cover 690, 690', 690" and the flexible substrate 644, 644', 644" include flexible film layers and/or paper substrates, where the film layers may have reflective surfaces or reflective surface coatings. Compositions for the flexible film layers may represent one or more of polymer films, such as polyester, polyimide, polyethylene terephthalate (PET), and other plastics. The optional adhesive layer on the bottom surface of the flexible cover 690, 690', 690" and the adhesive layers 642, 642', 642", 646, 646', 646" on the top and bottom surfaces of the flexible substrate 644, 644', 644" typically include a pressure-sensitive adhesive (e.g., a silicon-based adhesive). In some examples, the adhesive layers are applied to the flexible cover 690, 690', 690" and the flexible substrate 644, 644', 644" during manufacture of the adhesive tape-agent platform (e.g., during a roll-to-roll or sheet-to-sheet fabrication process). In other examples, the flexible cover 690, 690', 690" may be implemented by a prefabricated single-sided pressure-sensitive adhesive tape and the flexible substrate 644, 644', 644" may be implemented by a prefabricated double-sided pressure-sensitive adhesive tape; both kinds of tape may be readily incorporated into a roll-to-roll or sheet-to-sheet fabrication process. In some examples, the flexible substrate 644, 644', 644" is composed of a flexible epoxy (e.g., silicone).

In certain embodiments, the energy storage device 662, 662', 662" is a flexible battery that includes a printed electrochemical cell, which includes a planar arrangement of an anode and a cathode and battery contact pads. In some examples, the flexible battery may include lithium-ion cells or nickel-cadmium electro-chemical cells. The flexible battery typically is formed by a process that includes printing or laminating the electro-chemical cells on a flexible substrate (e.g., a polymer film layer). In some examples, other components may be integrated on the same substrate as the flexible battery. For example, the low-power wireless-communication interface 652, 652', 652" and/or the processor(s) 650, 650', 650" may be integrated on the flexible battery substrate. In some examples, one or more of such components also (e.g., the flexible antennas and the flexible interconnect circuits) may be printed on the flexible battery substrate.

In examples of manufacture, the flexible circuit 648, 648', 648" is formed on a flexible substrate by one or more of printing, etching, or laminating circuit patterns on the flexible substrate. In certain embodiments, the flexible circuit 648, 648', 648" is implemented by one or more of a single-sided flex circuit, a double access or back-bared flex circuit, a sculpted flex circuit, a double-sided flex circuit, a multi-layer flex circuit, a rigid flex circuit, and a polymer-thick film flex circuit. A single-sided flexible circuit has a single conductor layer made of, for example, a metal or conductive (e.g., metal filled) polymer on a flexible dielectric film. A double access or back bared flexible circuit has a single conductor layer but is processed so as to allow access to selected features of the conductor pattern from both sides. A sculpted flex circuit is formed using a multi-step etching process that produces a flex circuit that has finished copper conductors that vary in thickness along their respective lengths. A multilayer flex circuit has three of more layers of conductors, where the layers typically are interconnected using plated through holes. Rigid flex circuits are a hybrid construction of flex circuit consisting of rigid and flexible substrates that are laminated together into a single structure, where the layers typically are electrically interconnected via plated through holes. In polymer thick film (PTF) flex circuits, the circuit conductors are printed onto a polymer base film, where there may be a single conductor layer or multiple conductor layers that are insulated from one another by respective printed insulating layers.

In the example segments 640, 670, 680 shown in FIGS. 6A-6C, the flexible circuit 648, 648', 648" represents a single-access flex-circuit that interconnects the components of the adhesive tape platform on a single side of the flexible circuit 648, 648', 648". However, in other embodiments, the flexible circuit 648, 648', 648" represents a double access flex circuit that includes a front-side conductive pattern that interconnects the low-power communications interface 652, 652', 652", the timer circuit 654, 654', 654", the processor 650, 650', 650", the one or more sensor transducers 656, 656', 656" (if present), and the memory 658, 658', 658", and allows through-hole access (not shown) to a back-side conductive pattern that is connected to the flexible battery (not shown). In these embodiments, the front-side conductive pattern of the flexible circuit 648, 648', 648" connects the communications circuits 652, 652', 652", 672', 672", 682" (e.g., receivers, transmitters, and transceivers) to their respective antennas and to the processor 650, 650', 650" and also connects the processor 650, 650', 650" to the one or more sensors and the memory 658, 658', and 658". The backside conductive pattern connects the active electronics (e.g., the processor 650, 650', 650", the communications circuits 652, 652', 652", 672', 672", 682" and the transducers) on the front-side of the flexible circuit 648, 648', 648" to the electrodes of the energy storage device 662, 662', 662" via one or more through holes in the substrate of the flexible circuit 648, 648', 648".

The various units of the segments 640, 670, 680 shown in FIGS. 6A-6C may be arranged to accommodate different objects or structures (e.g., trash bins, fire extinguishers, etc.) and sensors may be added to, or subtracted from, the segments 640, 670, and 680, according to a particular task.

Referring to FIG. 7A, in some examples, each of one or more of the segments 770, 772 of a tracking adhesive product 774 includes a respective circuit 775 that delivers power from the respective energy source 776 to the respective tracking circuit 778 (e.g., a processor and one or more wireless communications circuits) in response to an event. In some of these examples, the wake circuit 775 is configured to transition from an off-state to an on-state when the voltage on the wake node 777 exceeds a threshold level, at which point the wake circuit transitions to an on-state to power-on the segment 770. In the illustrated example, this occurs when the user separates the segment from the tracking adhesive product 774, for example, by cutting across the tracking adhesive product 774 at a designated location (e.g., along a designated cut-line 780). In particular, in its initial, un-cut state, a minimal amount of current flows through the resistors R1 and R2. As a result, the voltage on the wake node 777 remains below the threshold turn-on level. After the user cuts across the tracking adhesive product 774 along the designated cut-line 780, the user creates an open circuit in the loop 782, which pulls the voltage of the wake node above the threshold level and turns on the wake circuit 775. As a result, the voltage across the energy source 776 will appear across the tracking circuit 778 and, thereby, turn on the segment 770. In particular embodiments, the resistance value of resistor R1 is greater than the resistance value of R2. In some examples, the resistance values of resistors R1 and R2 are selected based on the overall design of the adhesive product system (e.g., the target wake voltage level and a target leakage current).

In some examples, each of one or more of the segments of a tracking adhesive product includes a respective sensor and a respective wake circuit that delivers power from the respective energy source to the respective one or more components of the respective tracking circuit 778 in response to an output of the sensor. In some examples, the respective sensor is a strain sensor that produces a wake signal based on a change in strain in the respective segment. In some of these examples, the strain sensor is affixed to a tracking adhesive product and configured to detect the stretching of the tracking adhesive product segment as the segment is being peeled off a roll or a sheet of the tracking adhesive product. In some examples, the respective sensor is a capacitive sensor that produces a wake signal based on a change in capacitance in the respective segment. In some of these examples, the capacitive sensor is affixed to a tracking adhesive product and configured to detect the separation of the tracking adhesive product segment from a roll or a sheet of the tracking adhesive product. In some examples, the respective sensor is a flex sensor that produces a wake signal based on a change in curvature in the respective segment. In some of these examples, the flex sensor is affixed to a tracking adhesive product and configured to detect bending of the tracking adhesive product segment as the segment is being peeled off a roll or a sheet of the tracking adhesive product. In some examples, the respective sensor is a near field communications sensor that produces a wake signal based on a change in inductance in the respective segment.

FIG. 7B shows another example of a tracking adhesive product 794 that delivers power from the respective energy source 776 to the respective tracking circuit 778 (e.g., a processor and one or more wireless communications circuits) in response to an event. This example is similar in structure and operation as the tracking adhesive product 794 shown in FIG. 7A, except that the wake circuit 775 is replaced by a switch 796 that is configured to transition from an open state to a closed state when the voltage on the switch node 777 exceeds a threshold level. In the initial state of the tracking adhesive product 794, the voltage on the switch node is below the threshold level as a result of the low current level flowing through the resistors R1 and R2. After the user cuts across the tracking adhesive product 794 along the designated cut-line 780, the user creates an open circuit in the loop 782, which pulls up the voltage on the switch node above the threshold level to close the switch 796 and turn on the tracking circuit 778.

A wireless sensing system includes a plurality of wireless nodes configured to detect tampering in assets. Tampering may include, but is not limited to, opening assets such as boxes, containers, storage, or doors, moving the asset without authorization, moving the asset to an unintended location, moving the asset in an unintended way, damaging the asset, shaking the asset in an unintended way, orienting an asset in a way that it is not meant to be oriented. In many cases, these actions may compromise the integrity or safety of assets. Wireless nodes associated with the asset are configured to detect a tampering event. In an embodiment, a tampering event is associated with an action, a time, and a location. In an embodiment, the wireless nodes communicate the tampering event to the wireless sensing system. The wireless sensing system is configured to provide a notification or alert to a user of the wireless sensing system. In some embodiments, a wireless node may directly transmit the notification or alert to the user. In other embodiments, a wireless node may include a display that indicates whether or not a tampering event has occurred (e.g., the display may be an indicator light or LED).

Alerts may be transmitted to server/cloud, other wireless nodes, a client device, or some combination thereof. For example, in an embodiment, a wireless node of the wireless sensing system captures sensor data, detects a tampering event, and transmits an alarm to a user of the wireless sensing system (e.g., without communicating with a server or cloud of the wireless sensing system). In another embodiment, a wireless node of the wireless sensing system captures sensor data and transmits the sensor data to a gateway, parent node (e.g., black tape), or client device. The gateway, parent node, or client device detects a tampering event based on the received sensor data and transmits an alarm to a user of the wireless sensing system. In another embodiment, the wireless node of the wireless sensing system captures sensor data, detects a tampering event, and transmits information describing the tampering event to a server or cloud of the wireless sensing system. The server or cloud of the wireless sensing system transmits an alarm to a user of the wireless sensing system.

Figure 7C:
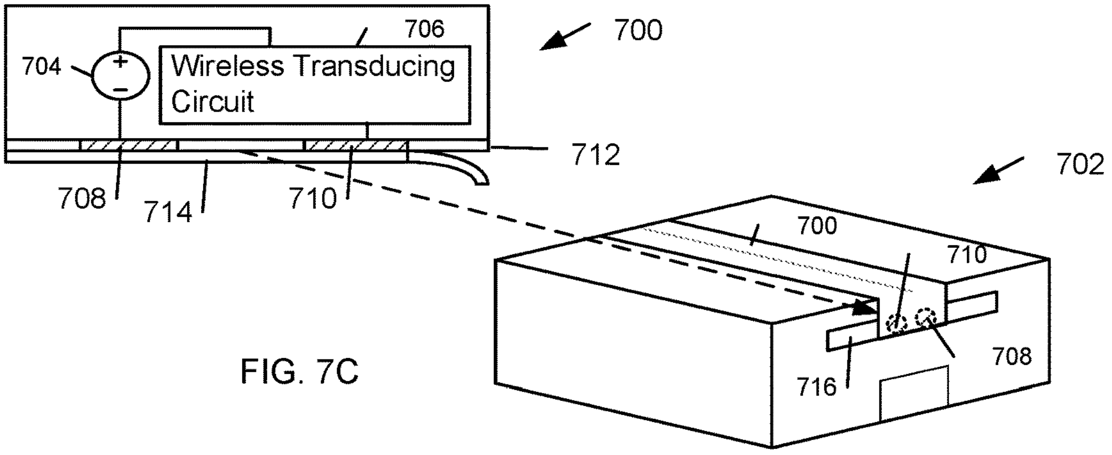
FIG. 7C is a diagrammatic cross-sectional front view of an example adhesive tape platform and a perspective view of an example asset, in embodiments.

FIG. 7C shows a diagrammatic cross-sectional front view of an example adhesive tape platform 700 and a perspective view of an example asset 702. Instead of activating the adhesive tape platform in response to separating a segment of the adhesive tape platform from a roll or a sheet of the adhesive tape platform, this example is configured to supply power from the energy source 704 to turn on the wireless transducing circuit 706 in response to establishing an electrical connection between two power terminals 708, 710 that are integrated into the adhesive tape platform. In particular, each segment of the adhesive tape platform 700 includes a respective set of embedded tracking components, an adhesive layer 712, and an optional backing sheet 714 with a release coating that prevents the segments from adhering strongly to the backing sheet 714. In some examples, the power terminals 708, 710 are composed of an electrically conductive material (e.g., a metal, such as copper) that may be printed or otherwise patterned and/or deposited on the backside of the adhesive tape platform 700. In operation, the adhesive tape platform can be activated by removing the backing sheet 714 and applying the exposed adhesive layer 712 to a surface that includes an electrically conductive region 716. In the illustrated embodiment, the electrically conductive region 716 is disposed on a portion of the asset 702. When the adhesive backside of the adhesive tape platform 700 is adhered to the asset with the exposed terminals 708, 710 aligned and in contact with the electrically conductive region 716 on the asset 702, an electrical connection is created through the electrically conductive region 716 between the exposed terminals 708, 710 that completes the circuit and turns on the wireless transducing circuit 706. In particular embodiments, the power terminals 708, 710 are electrically connected to any respective nodes of the wireless transducing circuit 706 that would result in the activation of the tracking circuit 706 in response to the creation of an electrical connection between the power terminals 708, 710.

In some examples, after a tape node is turned on, it will communicate with the network service to confirm that the user/operator who is associated with the tape node is an authorized user who has authenticated himself or herself to the network service. In these examples, if the tape node cannot confirm that the user/operator is an authorized user, the tape node will turn itself off.

Figure 8:
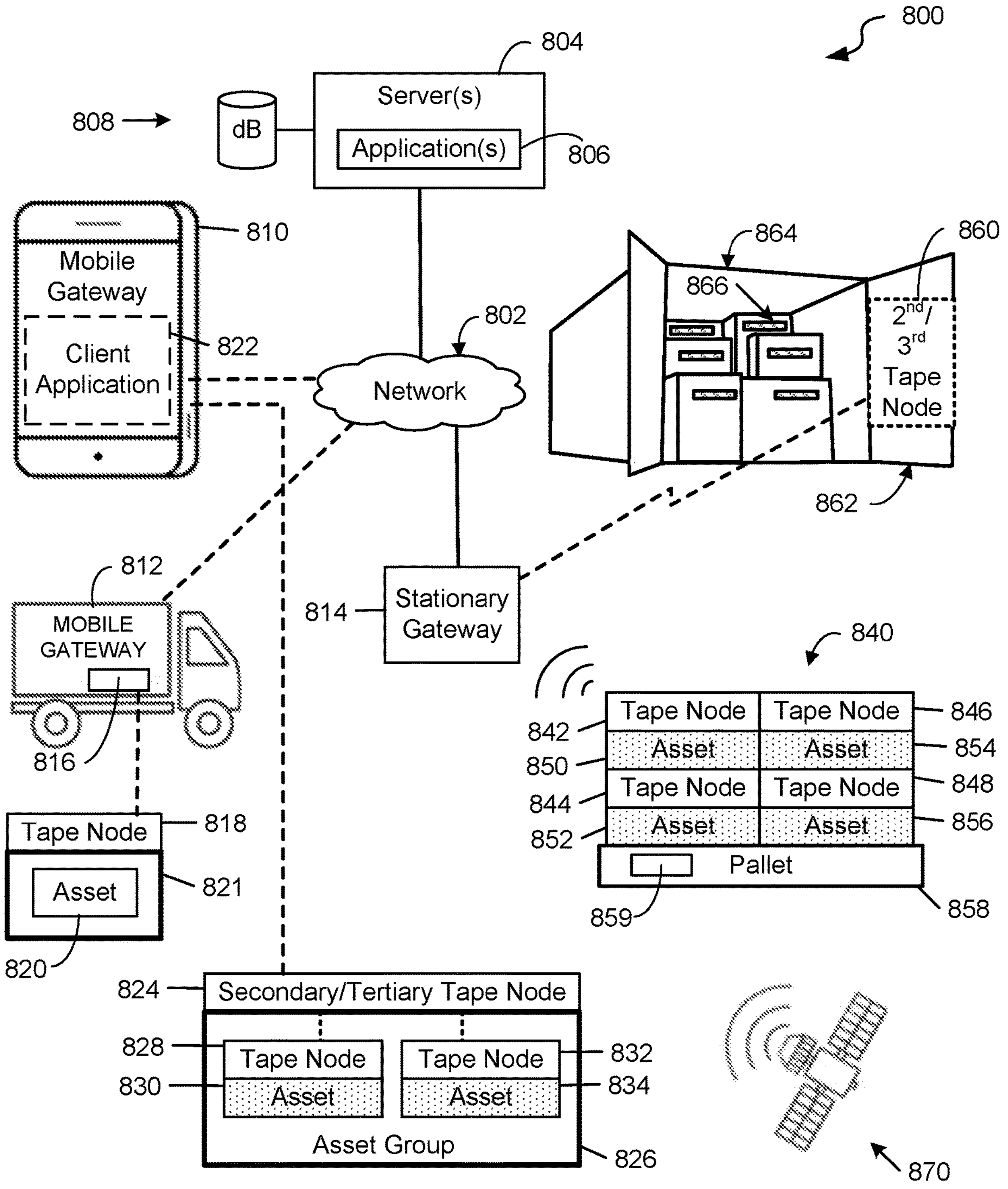
FIG. 8 is a schematic illustrating an example network communications environment that includes a network supporting communications between servers, mobile gateways, a stationary gateway, and various types of tape nodes associated with various assets, in embodiments.

FIG. 8 shows an example network communications environment 800 that includes a network 802 that supports communications between one or more servers 804 executing one or more applications of a network service 808, mobile gateways 810 (a smart device mobile gateway), 812 (a vehicle mobile gateway), a stationary gateway 814, and various types of tape nodes that are associated with various assets (e.g., parcels, equipment, tools, persons, and other things). Hereinafter "tape nodes" may be used interchangeably with the "agents", as described above, with reference to FIGS. 1-9A; the "agents" are in the form of a "tape node" attached to different objects, e.g., an asset, storage container, vehicle, equipment, etc.; the master agent may be referred to as a master tape node, a secondary agent may be referred to as a secondary tape node; and a tertiary agent may be referred to as a tertiary tape node.

In some examples, the network 802 (e.g., a wireless network) includes one or more network communication systems and technologies, including any one or more of wide area networks, local area networks, public networks (e.g., the internet), private networks (e.g., intranets and extranets), wired networks, and wireless networks. For example, the network 802 includes communications infrastructure equipment, such as a geolocation satellite system 870 (e.g., GPS, GLONASS, and NAVSTAR), cellular communication systems (e.g., GSM/GPRS), Wi-Fi communication systems, RF communication systems (e.g., LoRa), Bluetooth communication systems (e.g., a Bluetooth Low Energy system), Z-wave communication systems, and ZigBee communication systems.

In some examples, the one or more network service applications leverage the above-mentioned communications technologies to create a hierarchical wireless network of tape nodes improves asset management operations by reducing costs and improving efficiency in a wide range of processes, from asset packaging, asset transporting, asset tracking, asset condition monitoring, asset inventorying, and asset security verification. Communication across the network is secured by a variety of different security mechanisms. In the case of existing infrastructure, a communication link uses the infrastructure security mechanisms. In the case of communications among tapes nodes, the communication is secured through a custom security mechanism. In certain cases, tape nodes may also be configured to support block chain to protect the transmitted and stored data.

A network of tape nodes may be configured by the network service to create hierarchical communications network. The hierarchy may be defined in terms of one or more factors, including functionality (e.g., wireless transmission range or power), role (e.g., master-tape node vs. peripheral-tape node), or cost (e.g., a tape node equipped with a cellular transceiver vs. a peripheral tape node equipped with a Bluetooth LE transceiver). As described above with reference to the agents, tape nodes may be assigned to different levels of a hierarchical network according to one or more of the above-mentioned factors. For example, the hierarchy may be defined in terms of communication range or power, where tape nodes with higher-power or longer-communication range transceivers are arranged at a higher level of the hierarchy than tape nodes with lower-power or lower-range power or lower range transceivers. In another example, the hierarchy is defined in terms of role, where, e.g., a master tape node is programmed to bridge communications between a designated group of peripheral tape nodes and a gateway node or server node. The problem of finding an optimal hierarchical structure may be formulated as an optimization problem with battery capacity of nodes, power consumption in various modes of operation, desired latency, external environment, etc. and may be solved using modern optimization methods e.g. neural networks, artificial intelligence, and other machine learning computing systems that take expected and historical data to create an optimal solution and may create algorithms for modifying the system's behavior adaptively in the field.

The tape nodes may be deployed by automated equipment or manually. In this process, a tape node typically is separated from a roll or sheet and adhered to a parcel (e.g., asset 820) or other stationary (e.g., stationary gateway 814) or mobile object (e.g., a, such as a delivery truck, such as mobile gateway 812) or stationary object (e.g., a structural element of a building). This process activates the tape node (e.g., the tape node 818) and causes the tape node 818 to communicate with the one or more servers 804 of the network service 808. In this process, the tape node 418 may communicate through one or more other tape nodes (e.g., the tape nodes 842, 844, 846, 848) in the communication hierarchy. In this process, the one or more servers 804 executes the network service application 806 to programmatically configure tape nodes 818, 824, 828, 832, 842, 844, 846, 848, that are deployed in the network communications environment 800. In some examples, there are multiple classes or types of tape nodes (e.g., a master agent, a secondary agent, or a tertiary agent), where each tape node class has a different respective set of functionalities and/or capacities, as described herein with respect to the "agents" in FIGS. 1-9A. For example, the master agents have a lower-power wireless communication interface (e.g., the low-power wireless-communication interface 652, with reference to FIG. 6A), in comparison to the secondary and tertiary agents.

In some examples, the one or more servers 804 communicate over the network 802 with one or more gateways 810, 812, 814 that are configured to send, transmit, forward, or relay messages to the network 802 in response to transmissions from the tape nodes 818, 824, 828, 832, 842, 844, 846, 848 that are associated with respective assets and within communication range. Example gateways include mobile gateways 810, 812 and a stationary gateway 814. In some examples, the mobile gateways 810, 812, and the stationary gateway 814 are able to communicate with the network 802 and with designated sets or groups of tape nodes.

In some examples, the mobile gateway 812 is a vehicle (e.g., a delivery truck or other mobile hub) that includes a wireless communications unit 816 that is configured by the network service 808 to communicate with a designated network of tape nodes, including tape node 818 (e.g., a master tape node) in the form of a label that is adhered to a parcel 821 (e.g., an envelope) that contains an asset 820, and is further configured to communicate with the network service 808 over the network 802. In some examples, the tape node 818 includes a lower-power wireless-communications interface of the type used in, e.g., segment 640 (shown in FIG. 6A), and the wireless communications unit 816 may be implemented by a secondary or tertiary tape node (e.g., one of segment 670 or segment 680, respectively shown in FIGS. 6B and 6C) that includes a lower-power communications interfaces for communicating with tape nodes within range of the mobile gateway 812 and a higher-power communications-interface for communicating with the network 802. In this way, the tape node 818 and wireless communications unit 816 create a hierarchical wireless network of tape nodes for transmitting, forwarding, bridging, relaying, or otherwise communicating wireless messages to, between, or on behalf of the tape node 818 in a power-efficient and cost-effective way.

In some examples, a mobile gateway 810 is a mobile phone that is operated by a human operator and executes a client application 822 that is configured by a network service to communicate with a designated set of tape nodes, including a secondary or tertiary tape node 824 that is adhered to a parcel 826 (e.g., a box), and is further configured to communicate with a server 804 over the network 802. In the illustrated example, the parcel 826 contains a first parcel labeled or sealed by a master tape node 828 and containing a first asset 830, and a second parcel labeled or sealed by a master tape node 832 and containing a second asset 834. The secondary or tertiary tape node 824 communicates with each of the master tape nodes 828, 832 and also communicates with the mobile gateway 810. In some examples, each of the master tape nodes 828, 832 includes a lower-power wireless-communications interface of the type used in, e.g., segment 640 (shown in FIG. 6A), and the secondary/tertiary tape node 824 is implemented by a tape node (e.g., segment 670 or segment 680, shown in FIGS. 6B and 6C) that includes a low-power communications interface for communicating with the master tape nodes 828, 832 contained within the parcel 826, and a higher-power communications interface for communicating with the mobile gateway 810. The secondary or tertiary tape node 824 is operable to relay wireless communications between the master tape nodes 828, 832 contained within the parcel 826 and the mobile gateway 810, and the mobile gateway 810 is operable to relay wireless communications between the secondary or tertiary tape node 824 and the server 804 over the network 802. In this way, the master tape nodes 828 and 832 and the secondary or tertiary tape node 824 create a wireless network of nodes for transmitting, forwarding, relaying, or otherwise communicating wireless messages to, between, or on behalf of the master tape nodes 828, 832, the secondary or tertiary tape node 824, and the network service (not shown) in a power-efficient and cost-effective way.

In some embodiments, the client application 822 is installed on a mobile device (e.g., smartphone) that may also operate as mobile gateway 810. The client application 822 may cause the mobile device to function as a mobile gateway 810. For example, the client application 822 runs in the background to allow the mobile device to bridge communications between tape nodes that are communicating on one protocol to other tape nodes that are communicating on another protocol. For example, a tape node transmits data to the mobile device through Bluetooth, and the mobile device (running the client application 822) relays that data to the server 804 via cellular (2G, 3G, 4G, 5G) or Wi-Fi. Further, the client application 822 may cause the mobile device to establish a connection with, and receive pings (e.g., alerts to nearby assets that an environmental profile threshold has been exceeded), from the tape nodes or from the server 804. The tape nodes or server may request services (e.g., to display alert messages within a graphical user interface of the mobile device, relay messages to nearby tape nodes or mobile or stationary gateways, delegate tasks to the mobile device, such as determining the location of the tape node, etc.) from the mobile device. For example, the mobile device running the client application 822 may share location data with the tape node, allowing the tape node to pinpoint its location.

In some examples, the stationary gateway 814 is implemented by a server 804 executing a network service application 806 that is configured by the network service 808 to communicate with a designated set 840 of master tape nodes 842, 844, 846, 848 that are adhered to respective parcels containing respective assets 850, 852, 854, 856 on a pallet 858. In other examples, the stationary gateway 814 is implemented by a secondary or tertiary tape node 860 (e.g., segments 670 or 680, respectively shown in FIGS. 6B and 6C) that is adhered to, for example, a wall, column or other infrastructure component of the physical premise's environment 800, and includes a low-power communications interface for communicating with nodes within range of the stationary gateway 814 and a higher-power communications interface for communicating with the network 802.

In one embodiment, each of the master tape nodes 842-848 is a master tape node and is configured by the network service 808 to communicate individually with the stationary gateway 814, which relays communications from the master tape nodes 842-848 to the network service 808 through the stationary gateway 814 and over the network 802. In another embodiment, one of the master tape nodes 842-848 at a time is configured to transmit, forward, relay, or otherwise communicate wireless messages to, between, or on behalf of the other master nodes on the pallet 858. In this embodiment, the master tape node may be determined by the master tape nodes 842-848 or designated by the network service 808. In some examples, the master tape nodes 842-848 with the longest range or highest remaining power level is determined to be the master tape node. In some examples, when the power level of the current master tape node drops below a certain level (e.g., a fixed power threshold level or a threshold level relative to the power levels of one or more of the other master tape nodes), another one of the master tape nodes assumes the role of the master tape node. In some examples, a master tape node 859 is adhered to the pallet 858 and is configured to perform the role of a master node for the other master tape nodes 842-848. In these ways, the master tape nodes 842-848, 859 are configurable to create different wireless networks of nodes for transmitting, forwarding, relaying, bridging, or otherwise communicating wireless messages with the network service 808 through the stationary gateway 814 and over the network 802 in a power-efficient and cost-effective way.

In the illustrated example, the stationary gateway 814 also is configured by the network service 808 to communicate with a designated network of tape nodes, including the secondary or tertiary tape node 860 that is adhered to the inside of a door 862 of a shipping container 864, and is further configured to communicate with the network service 808 over the network 802. In the illustrated example, the shipping container 864 contains a number of parcels labeled or sealed by respective master tape nodes 866 and containing respective assets. The secondary or tertiary tape node 860 communicates with each of the master tape nodes 866 within the shipping container 864 and communicates with the stationary gateway 814. In some examples, each of the master tape nodes 866 includes a low-power wireless communications-interface (e.g., the low-power wireless-communication interface 652, 652', 652", with reference to FIGS. 6A-6C), and the secondary or tertiary tape node 860 includes a low-power wireless-communications interface (low-power wireless-communication interfaces 652', 652", with reference to FIGS. 6B-6C) for communicating with the master tape nodes 866 contained within the shipping container 864, and a higher-power wireless-communications interface (e.g., medium-power wireless-communication interface 672', medium-power wireless-communication interface 672", high-power wireless-communication interface 682", with reference to FIGS. 6B-6C) for communicating with the stationary gateway 814. In some examples, either a secondary or tertiary tape node, or both, may be used, depending on whether a high-power wireless-communication interface is necessary for sufficient communication.

In some examples, when the doors of the shipping container 864 are closed, the secondary or tertiary tape node 860 is operable to communicate wirelessly with the master tape nodes 866 contained within the shipping container 864. In some embodiments, both a secondary and a tertiary node are attached to the shipping container 864. Whether a secondary and a tertiary node are used may depend on the range requirements of the wireless-communications interface. For example, if out at sea a node will be required to transmit and receive signals from a server located outside the range of a medium-power wireless-communications interface, a tertiary node will be used because the tertiary node includes a high-power wireless-communications interface.

In an example, the secondary or tertiary tape node 860 is configured to collect sensor data from master tape nodes 866 and, in some embodiments, process the collected data to generate, for example, statistics from the collected data. When the doors of the shipping container 864 are open, the secondary or tertiary tape node 860 is programmed to detect the door opening (e.g., using a photodetector or an accelerometer component of the secondary or tertiary tape node 860) and, in addition to reporting the door opening event to the network service 808, the secondary or tertiary tape node 860 is further programmed to transmit the collected data and/or the processed data in one or more wireless messages to the stationary gateway 814. The stationary gateway 814, in turn, is operable to transmit the wireless messages received from the secondary or tertiary tape node 860 to the network service 808 over the network 802. Alternatively, in some examples, the stationary gateway 814 also is operable to perform operations on the data received from the secondary or tertiary tape node 860 with the same type of data produced by the secondary or tertiary tape node 860 based on sensor data collected from the master tape nodes 842-848. In this way, the secondary or tertiary tape node 860 and master tape node 866 create a wireless network of nodes for transmitting, forwarding, relaying, or otherwise communicating wireless messages to, between, or on behalf of the master tape node 866, the secondary or tertiary tape nodes 860, and the network service 808 in a power-efficient and cost-effective way.

In an example of the embodiment shown in FIG. 8, there are three types of backward compatible tape nodes: a short-range master tape node (e.g., segment 640), a medium-range secondary tape node (e.g., segment 670), and a long-range tertiary tape node (e.g. segment 680), as respectively shown in FIGS. 6A-6C (here, "tape node" is used interchangeably with "agent", as described with reference to FIGS. 1-9A). The short-range master tape nodes typically are adhered directly to parcels containing assets. In the illustrated example, the master tape nodes 818, 828, 832, 842-848, 866 are short-range tape nodes. The short-range tape nodes typically communicate with a low-power wireless-communication protocol (e.g., Bluetooth LE, Zigbee, or Z-wave). The segments 670 are typically adhered to objects (e.g., a parcel 826 and a shipping container 864) that are associated with multiple parcels that are separated from the medium-range tape nodes by a barrier or a long distance. In the illustrated example, the secondary and/or tertiary tape nodes 824 and 860 are medium-range tape nodes. The medium-range tape nodes typically communicate with low and medium-power wireless-communication protocols (e.g., Bluetooth, LoRa, or Wi-Fi). The segments 680 typically are adhered to mobile or stationary infrastructure of the network communications environment 800.

In the illustrated example, the mobile gateway 812 and the stationary gateway 814 are implemented by, e.g., segment 680. The segments 680 typically communicate with other nodes using a high-power wireless-communication protocol (e.g., a cellular data communication protocol). In some examples, the wireless communications unit 416 (a secondary or tertiary tape node) is adhered to a mobile gateway 812 (e.g., a truck). In these examples, the wireless communications unit 816 may be moved to different locations in the network communications environment 800 to assist in connecting other tape nodes to the wireless communications unit 816. In some examples, the stationary gateway 814 is a tape node that may be attached to a stationary structure (e.g., a wall) in the network communications environment 800 with a known geographic location (e.g., GPS coordinates). In these examples, other tape nodes in the environment may determine their geographic location by querying the stationary gateway 814.

In some examples, in order to conserve power, the tape nodes typically communicate according to a schedule promulgated by the network service 808. The schedule usually dictates all aspects of the communication, including the times when particular tape nodes should communicate, the mode of communication, and the contents of the communication. In one example, the server (not shown) transmits programmatic Global Scheduling Description Language (GSDL) code to the master tape node and each of the secondary and tertiary tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the server 804, either directly or indirectly through a gateway tape node (e.g., the long-range tape node, such as wireless communication unit 816, adhered to the mobile gateway 812, or a long-range tape node, such as stationary gateway 814, that is adhered to an infrastructure component of the network communications environment 800). In other examples, the master tape node processes the information contained in the received data packets and transmits the processed information to the server 804.

Figure 9A:
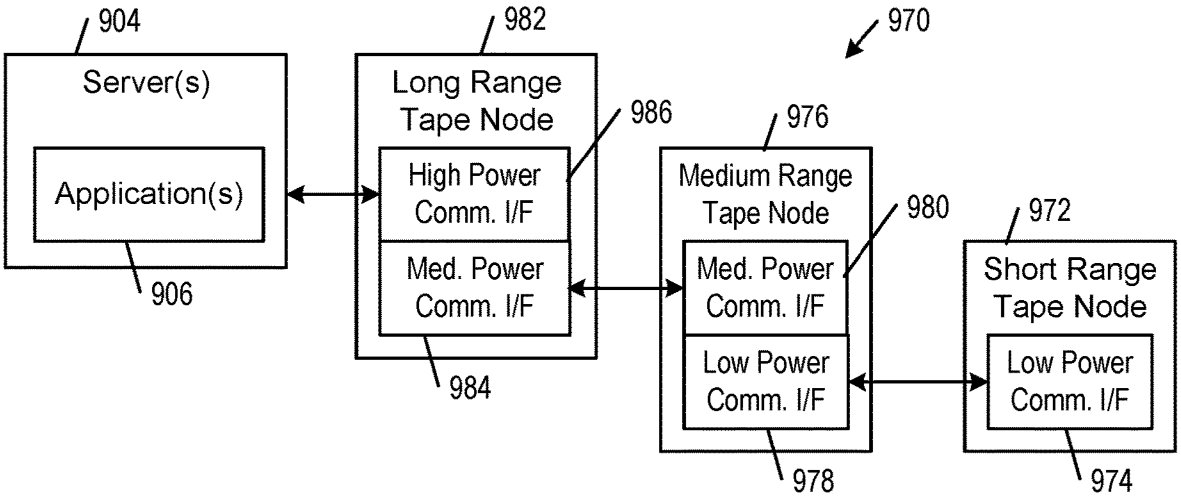
FIG. 9A is a schematic illustrating one example hierarchical wireless communications network of tape nodes, in embodiments.

FIG. 9A is a schematic illustrating one example hierarchical wireless communications network of tape nodes 970. <comment value="Link these to the definition of the tape node types in Template 4??" Type="Comment">In this example</comment>, the short-range tape node 972 and the medium range tape node 976 communicate with one another over their respective low power wireless communication interfaces 974, 978. The medium range tape node 976 and the long-range tape node 982 communicate with one another over their respective medium power wireless communication interfaces 980, 984. The long-range tape node 982 and the one or more network service servers 904 (e.g., server(s) 804, FIG. 8) running application(s) 906 (e.g., application(s) 806) communicate with one another over the high-power communication interface 986. In some examples, the low power communication interfaces 974, 978 establish wireless communications with one another in accordance with the Bluetooth LE protocol, the medium power communication interfaces 980, 984 establish wireless communications with one another in accordance with the LoRa communications protocol, and the high-power communication interface 986 establishes wireless communications with the one or more network service servers 904 in accordance with a cellular communications protocol.

In some examples, the different types of tape nodes are deployed at different levels in the communications hierarchy according to their respective communications ranges, with the long-range tape nodes generally at the top of the hierarchy, the medium range tape nodes generally in the middle of the hierarchy, and the short-range tape nodes generally at the bottom of the hierarchy. In some examples, the different types of tape nodes are implemented with different feature sets that are associated with component costs and operational costs that vary according to their respective levels in the hierarchy. This allows system administrators flexibility to optimize the deployment of the tape nodes to achieve various objectives, including cost minimization, asset tracking, asset localization, and power conservation.

In some examples, one or more network service servers 904 designates a tape node at a higher level in a hierarchical communications network as a master node of a designated set of tape nodes at a lower level in the hierarchical communications network. For example, the designated master tape node may be adhered to a parcel (e.g., a box, pallet, or shipping container) that contains one or more tape nodes that are adhered to one or more packages containing respective assets. In order to conserve power, the tape nodes typically communicate according to a schedule promulgated by the one or more network service servers 904. The schedule usually dictates all aspects of the communication, including the times when particular tape nodes should communicate, the mode of communication, and the contents of the communication. In one example, the one or more network service servers 904 transmits programmatic Global Scheduling Description Language (GSDL) code to the master tape node and each of the lower-level tape nodes in the designated set. In this example, execution of the GSDL code causes each of the tape nodes in the designated set to connect to the master tape node at a different respective time that is specified in the GSDL code, and to communicate a respective set of one or more data packets of one or more specified types of information over the respective connection. In some examples, the master tape node simply forwards the data packets to the one or more network service servers 904, either directly or indirectly through a gateway tape node (e.g., the long-range wireless communication unit 816 adhered to the mobile gateway 812 (which could be a vehicle, ship, plane, etc.) or the stationary gateway 814 is a long-range tape node adhered to an infrastructure component of the environment 800). In other examples, the master tape node processes the information contained in the received data packets and transmits the processed information to the one or more network service servers 904/804.

Figure 9B:
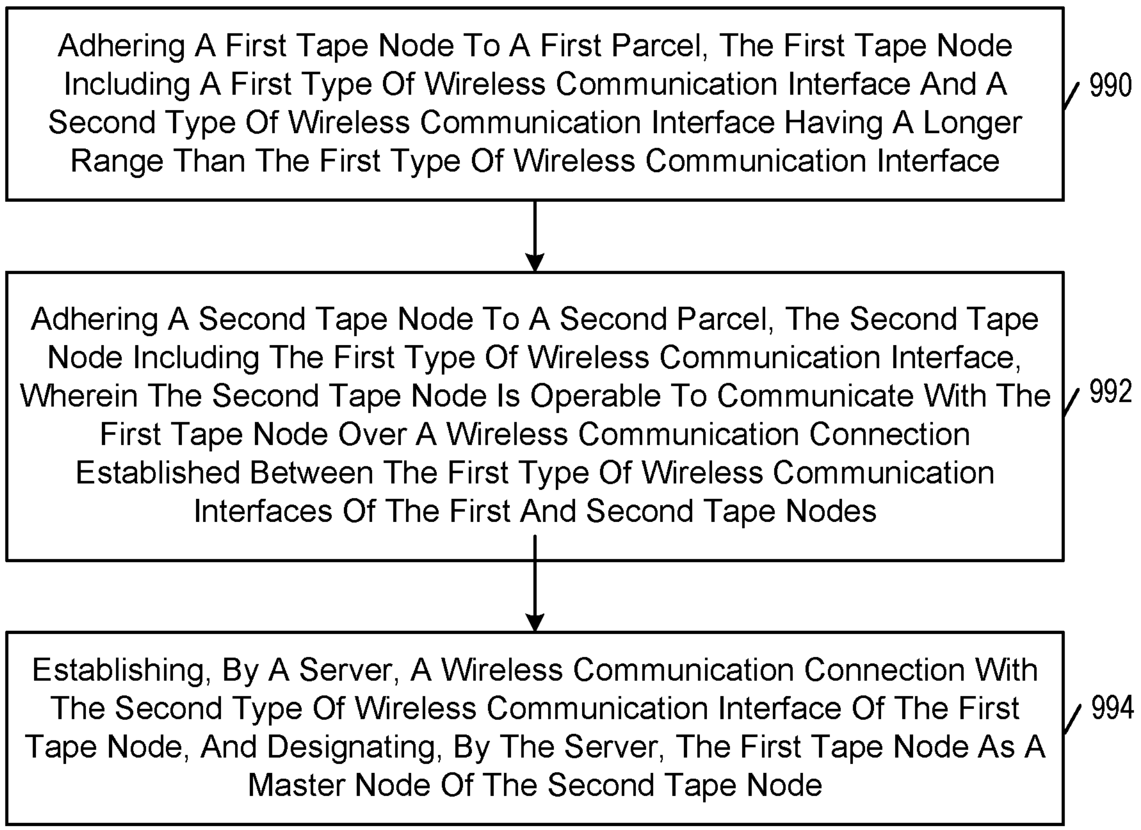
FIG. 9B is a flowchart illustrating one example method of creating a hierarchical communications network, in embodiments.

FIG. 9B is a flowchart illustrating one example method of creating a hierarchical communications network. In accordance with this method, a first tape node is adhered to a first parcel in a set of associated parcels, the first tape node including a first type of wireless communication interface and a second type of wireless communication interface having a longer range than the first type of wireless communication interface (FIG. 9B, block 990). A second tape node is adhered to a second parcel in the set, the second tape node including the first type of wireless communication interface, wherein the second tape node is operable to communicate with the first tape node over a wireless communication connection established between the first type of wireless communication interfaces of the first and second tape nodes (FIG. 9B, block 992). An application executing on a computer system (e.g., the one or more network service servers 904 of network service 808) establishes a wireless communication connection with the second type of wireless communication interface of the first tape node, and the application transmits programmatic code executable by the first tape node to function as a master tape node with respect to the second tape node (FIG. 9B, block 994).

As used herein, the term "node" refers to both a tape node and a non-tape node unless the node is explicitly designated as a "tape node" or a "non-tape node." In some embodiments, a non-tape node may have the same or similar communication, sensing, processing and other functionalities and capabilities as the tape nodes described herein, except without being integrated into a tape platform. In some embodiments, non-tape nodes can interact seamlessly with tape nodes. Each node is assigned a respective unique identifier.

Embodiments of the present disclosure further describe a distributed software operating system that is implemented by distributed hardware nodes executing intelligent agent software to perform various tasks or algorithms. In some embodiments, the operating system distributes functionalities (e.g., performing analytics on data or statistics collected or generated by nodes) geographically across multiple intelligent agents that are bound to logistic items (e.g., parcels, containers, packages, boxes, pallets, a loading dock, a door, a light switch, a vehicle such as a delivery truck, a shipping facility, a port, a hub, etc.). In addition, the operating system dynamically allocates the hierarchical roles (e.g., master and slave roles) that nodes perform over time in order to improve system performance, such as optimizing battery life across nodes, improving responsiveness, and achieving overall objectives. In some embodiments, optimization is achieved using a simulation environment for optimizing key performance indicators (PKIs).

In some embodiments, the nodes are programmed to operate individually or collectively as autonomous intelligent agents. In some embodiments, nodes are configured to communicate and coordinate actions and respond to events. In some embodiments, a node is characterized by its identity, its mission, and the services that it can provide to other nodes. A node's identity is defined by its capabilities (e.g., battery life, sensing capabilities, and communications interfaces). A node may be defined by the respective program code, instructions, or directives it receives from another node (e.g., a server or a master node) and the actions or tasks that it performs in accordance with that program code, instructions, or directives (e.g., sense temperature every hour and send temperature data to a master node to upload to a server). A node's services may be defined by the functions or tasks that it is permitted to perform for other nodes (e.g., retrieve temperature data from a peripheral node and send the received temperature data to the server). At least for certain tasks, once programmed and configured with their identities, missions, and services, nodes can communicate with one another and request services from and provide services to one another independently of the server.

Thus, in accordance with the runtime operating system every agent knows its objectives (programmed). Every agent knows which capabilities/resources it needs to fulfill objective. Every agent communicates with every other node in proximity to see if it can offer the capability. Examples include communicate data to the server, authorize going to lower-power level, temperature reading, send an alert to local hub, send location data, triangulate location, any boxes in same group that already completed group objectives.

Nodes can be associated with logistic items. Examples of a logistic item includes, for example, a package, a box, pallet, a container, a truck or other conveyance, infrastructure such as a door, a conveyor belt, a light switch, a road, or any other thing that can be tracked, monitored, sensed, etc. or that can transmit data concerning its state or environment. In some examples, a server or a master node may associate the unique node identifiers with the logistic items.

Communication paths between tape and/or non-tape nodes may be represented by a graph of edges between the corresponding logistic items (e.g., a storage unit, truck, or hub). In some embodiments, each node in the graph has a unique identifier. A set of connected edges between nodes is represented by a sequence of the node identifiers that defines a communication path between a set of nodes.

Figure 10A:
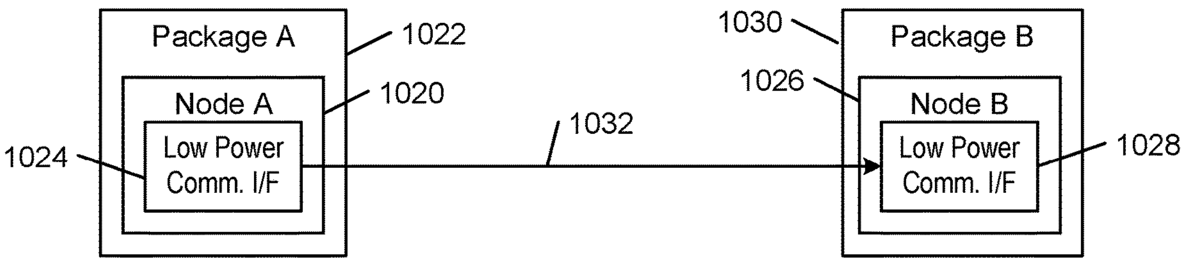
FIG. 10A shows a node (Node A) associated with a package (Package A), in embodiments.

Referring to FIG. 10A, a node 1020 (Node A) is associated with a package 1022 (Package A). In some embodiments, the node 1020 may be implemented as a tape node that is used to seal the package 1022 or it may be implemented as a label node that is used to label the package 1022; alternatively, the node 1020 may be implemented as a non-tape node that is inserted within the package 1022 or embedded in or otherwise attached to the interior or exterior of the package 1022. In the illustrated embodiment, the node 1020 includes a low power communications interface 1024 (e.g., a Bluetooth Low Energy communications interface). Another node 1026 (Node B), which is associated with another package 1030 (Package B), is similarly equipped with a compatible low power communications interface 1028 (e.g., a Bluetooth Low Energy communications interface).

In an example scenario, in accordance with the programmatic code stored in its memory, node 1026 (Node B) requires a connection to node 1020 (Node A) to perform a task that involves checking the battery life of Node A. Initially, Node B is unconnected to any other nodes. In accordance with the programmatic code stored in its memory, Node B periodically broadcasts advertising packets into the surrounding area. When the other node 1020 (Node A) is within range of Node B and is operating in a listening mode, Node A will extract the address of Node B and potentially other information (e.g., security information) from an advertising packet. If, according to its programmatic code, Node A determines that it is authorized to connect to Node B, Node A will attempt to pair with Node B. In this process, Node A and Node B determine each other's identities, capabilities, and services. For example, after successfully establishing a communication path 1032 with Node A (e.g., a Bluetooth Low Energy formatted communication path), Node B determines Node A's identity information (e.g., master node), Node A's capabilities include reporting its current battery life, and Node A's services include transmitting its current battery life to other nodes. In response to a request from Node B, Node A transmits an indication of its current battery life to Node B.

Figure 10B:
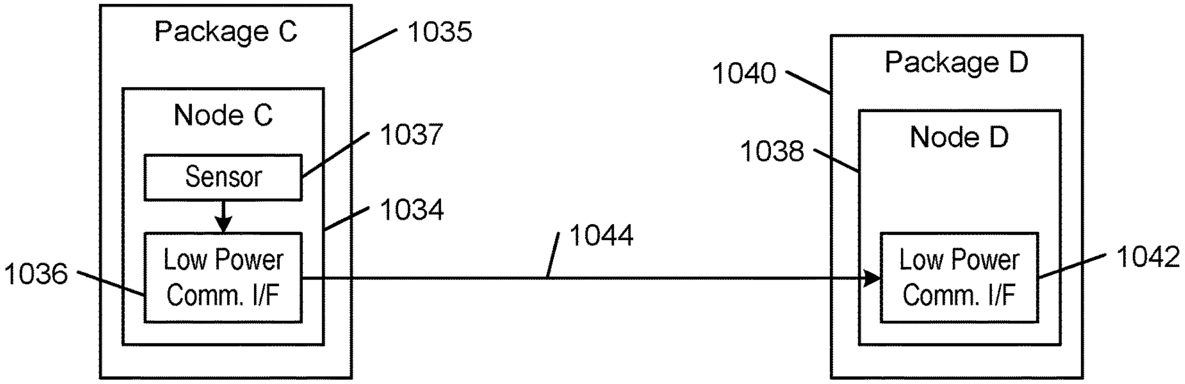
FIG. 10B shows a node (Node C) associated with a package (Package C), in embodiments.

Referring to FIG. 10B, a node 1034 (Node C) is associated with a package 1035 (Package C). In the illustrated embodiment, the Node C includes a low power communications interface 1036 (e.g., a Bluetooth Low Energy communications interface), and a sensor 1037 (e.g., a temperature sensor). Another node 1038 (Node D), which is associated with another package 1040 (Package D), is similarly equipped with a compatible low power communications interface 1042 (e.g., a Bluetooth Low-Energy communications interface).

In an example scenario, in accordance with the programmatic code stored in its memory, Node D requires a connection to Node C to perform a task that involves checking the temperature in the vicinity of Node C. Initially, Node D is unconnected to any other nodes. In accordance with the programmatic code stored in its memory, Node D periodically broadcasts advertising packets in the surrounding area. When Node C is within range of Node D and is operating in a listening mode, Node C will extract the address of Node D and potentially other information (e.g., security information) from the advertising packet. If, according to its programmatic code, Node C determines that it is authorized to connect to Node D, Node C will attempt to pair with Node D. In this process, Node C and Node D determine each other's identities, capabilities, and services. For example, after successfully establishing a communication path 1044 with Node C (e.g., a Bluetooth Low Energy formatted communication path), Node D determines Node C's identity information (e.g., a peripheral node), Node C's capabilities include retrieving temperature data, and Node C's services include transmitting temperature data to other nodes. In response to a request from Node D, Node C transmits its measured and/or locally processed temperature data to Node D.

Figure 10C:
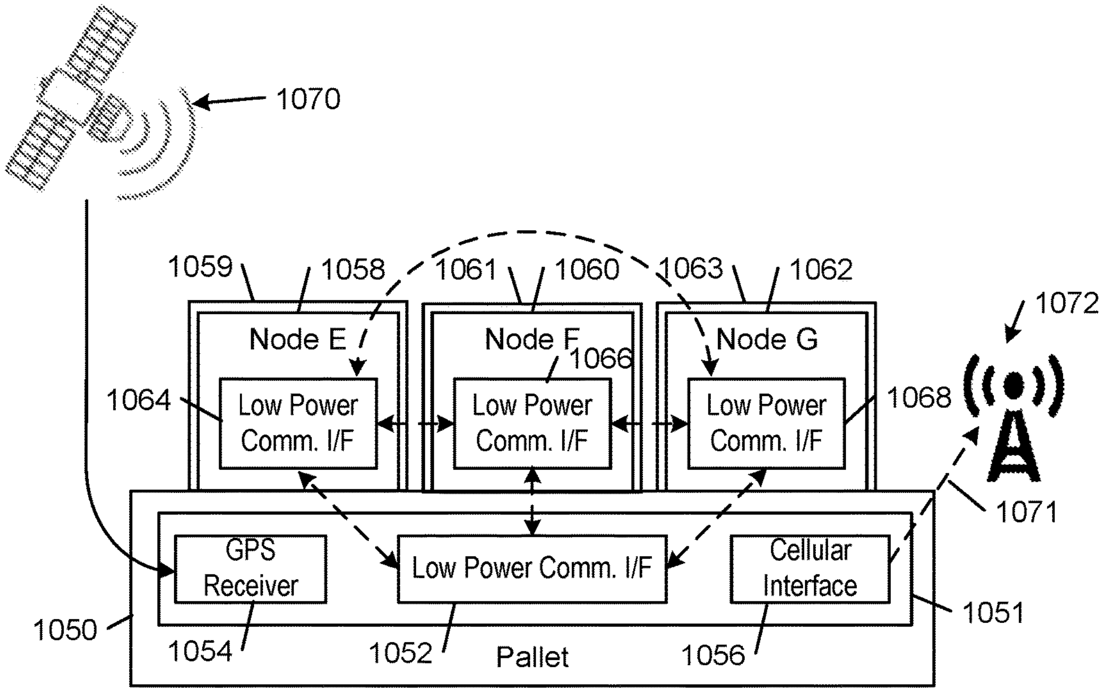
FIG. 10C shows a pallet associated with a master node that includes a low-power communications interface, a GPS receiver, and a cellular communications interface, in embodiments.

Referring to FIG. 10C, a pallet 1050 is associated with a master node 1051 that includes a low-power communications interface 1052, a GPS receiver 1054, and a cellular communications interface 1056. In some embodiments, the master node 1051 may be implemented as a tape node or a label node that is adhered to the pallet 1050. In other embodiments, the master node 1051 may be implemented as a non-tape node that is inserted within the body of the pallet 1050 or embedded in or otherwise attached to the interior or exterior of the pallet 1050.

The pallet 1050 provides a structure for grouping and containing packages 1059, 1061, 1063 each of which is associated with a respective peripheral node 1058, 1060, 1062 (Node E, Node F, and Node G). Each of the peripheral nodes 1058, 1060, 1062 includes a respective low power communications interface 1064, 1066, 1068 (e.g., Bluetooth Low Energy communications interface). In the illustrated embodiment, each of the nodes E, F, G, and the master node 1051 are connected to each of the other nodes over a respective low power communications path (shown by dashed lines).

In some embodiments, the packages 1059, 1061, 1063 are grouped together because they are related. For example, the packages 1059, 1061, 1063 may share the same shipping itinerary or a portion thereof. In an example scenario, the master pallet node 1051 scans for advertising packets that are broadcasted from the peripheral nodes 1058, 1060, 1062. In some examples, the peripheral nodes broadcast advertising packets during respective scheduled broadcast intervals. The master node 1051 can determine the presence of the packages 1059, 1061, 1063 in the vicinity of the pallet 1050 based on receipt of one or more advertising packets from each of the nodes E, F, and G. In some embodiments, in response to receipt of advertising packets broadcasted by the peripheral nodes 1058, 1060, 1062, the master node 1051 transmits respective requests to the server to associate the master node 1051 and the respective peripheral nodes 1058, 1060, 1062. In some examples, the master tape node requests authorization from the server to associate the master tape node and the peripheral tape nodes. If the corresponding packages 1059, 1061, 1063 are intended to be grouped together (e.g., they share the same itinerary or certain segments of the same itinerary), the server authorizes the master node 1051 to associate the peripheral nodes 1058, 1060, 1062 with one another as a grouped set of packages.

In some embodiments, the server registers the master node and peripheral tape node identifiers with a group identifier. The server also may associate each node ID with a respective physical label ID that is affixed to the respective package.

In some embodiments, after an initial set of packages is assigned to a multi package group, the master node 1051 may identify another package arrives in the vicinity of the multi-package group. The master node may request authorization from the server to associate the other package with the existing multi-package group. If the server determines that the other package is intended to ship with the multi-package group, the server instructs the master node to merge one or more other packages with currently grouped set of packages. After all packages are grouped together, the server authorizes the multi-package group to ship. In some embodiments, this process may involve releasing the multi-package group from a containment area (e.g., customs holding area) in a shipment facility.

In some embodiments, the peripheral nodes 1058, 1060, 1062 include environmental sensors for obtaining information regarding environmental conditions in the vicinity of the associated packages 1059, 1061, 1063. Examples of such environmental sensors include temperature sensors, humidity sensors, acceleration sensors, vibration sensors, shock sensors, pressure sensors, altitude sensors, light sensors, and orientation sensors.

In the illustrated embodiment, the master node 1051 can determine its own location based on geolocation data transmitted by a satellite-based radio navigation system 1070 (e.g., GPS, GLONASS, and NAVSTAR) and received by the GPS receiver 1054 component of the master node 1051. In an alternative embodiment, the location of the master pallet node 1051 can be determined using cellular based navigation techniques that use mobile communication technologies (e.g., GSM, GPRS, CDMA, etc.) to implement one or more cell-based localization techniques. After the master node 1051 has ascertained its location, the distance of each of the packages 1059, 1061, 1063 from the master node 1051 can be estimated based on the average signal strength of the advertising packets that the master node 1051 receives from the respective peripheral node. The master node 1051 can then transmit its own location and the locations of the package nodes E, F, and G to a server over a cellular interface connection with a cellular network 1072. Other methods of determining the distance of each of the packages 1059, 1061, 1063 from the master node 1051, such as Received Signal-Strength Index (RSSI) based indoor localization techniques, also may be used.

In some embodiments, after determining its own location and the locations of the peripheral nodes, the master node 1051 reports the location data and the collected and optionally processed (e.g., either by the peripheral nodes peripheral nodes 1058, 1060, 1062 or the master node 1051) sensor data to a server over a cellular communication path 1071 on a cellular network 1072.

In some examples, nodes are able to autonomously detect logistics execution errors if packages that are supposed to travel together no longer travel together and raise an alert. For example, a node (e.g., the master node 1051 or one of the peripheral nodes 1058, 1060, 1062) alerts the server when the node determines that a particular package 1059 is being or has already been improperly separated from the group of packages. The node may determine that there has been an improper separation of the particular package 1059 in a variety of ways. For example, the associated peripheral node 1058 that is bound to the particular package 1059 may include an accelerometer that generates a signal in response to movement of the package from the pallet. In accordance with its intelligent agent program code, the associated peripheral node 1058 determines that the master node 1051 has not disassociated the particular package 1059 from the group and therefore broadcasts advertising packets to the master node, which causes the master node 1051 to monitor the average signal strength of the advertising packets and, if the master node 1051 determines that the signal strength is decreasing over time, the master node 1051 will issue an alert either locally (e.g., through a speaker component of the master node 1051) or to the server.

Figure 11:
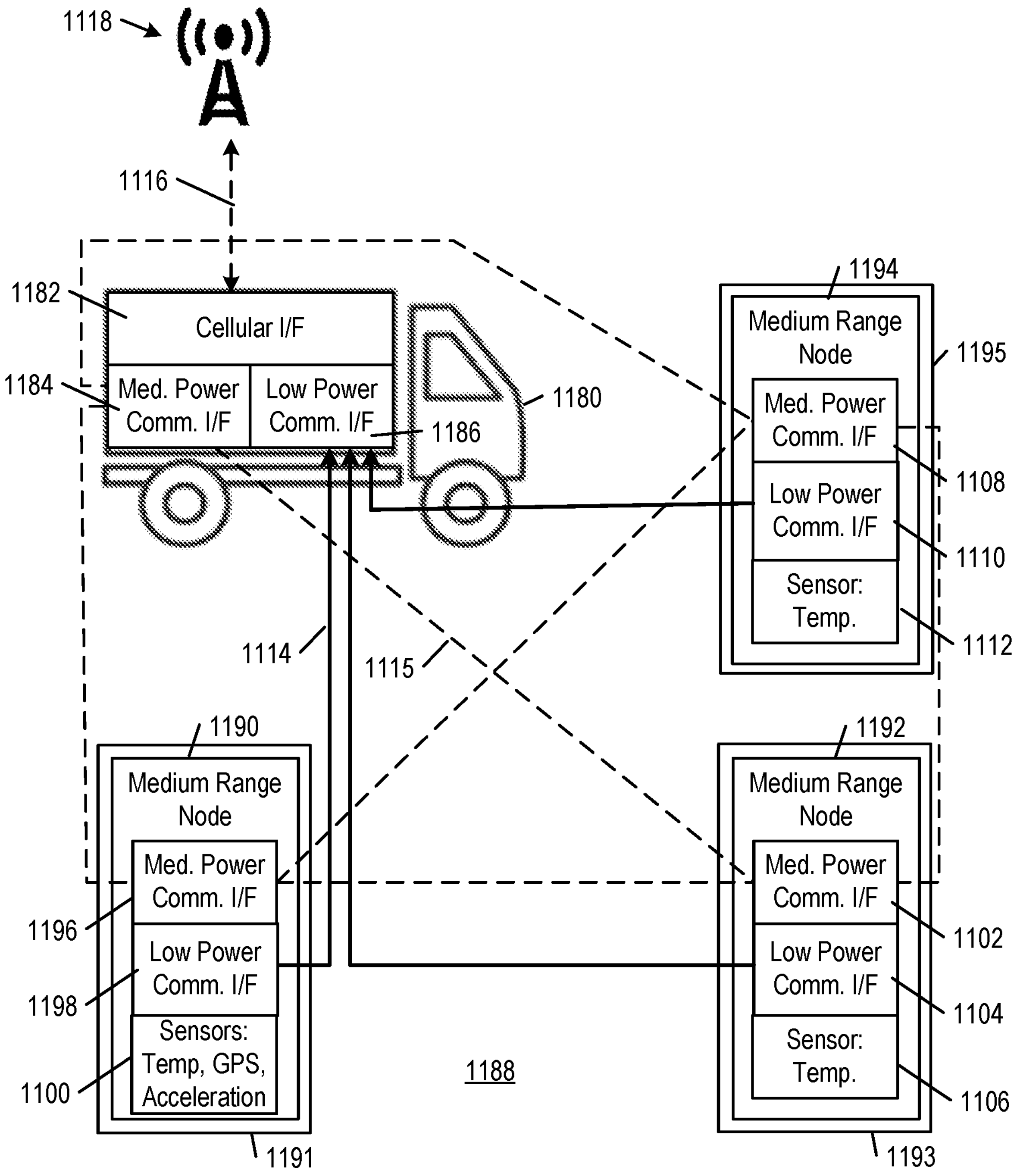
FIG. 11 is a schematic illustrating a truck configured as a mobile node, or mobile hub, with a cellular communications interface, a medium-power communications interface, and a low power communications interface, in embodiments.

FIG. 11 is a schematic illustrating a truck 1180 configured as a mobile node or mobile hub that includes a cellular communications interface 1182, a medium-power communications interface 1184, and a low power communications interface 1186. The communications interfaces 1180-1186 may be implemented on one or more tape and non-tape nodes. In an illustrative scenario, the truck 1180 visits a logistic storage facility, such as a warehouse 1188, to wirelessly obtain temperature data generated by temperature sensors in the medium range nodes 1190, 1192, 1194. The warehouse 1188 contains nodes 1190, 1192, and 1194 that are associated with respective logistic containers 1191, 1193, 1195. In the illustrated embodiment, each node 1190-1194 is a medium range node that includes a respective medium power communications interface 1196, 1102, 1108, a respective low power communications interface 1198, 1104, 1110 and one or more respective sensors 1100, 1106, 1112. In the illustrated embodiment, each of the package nodes 1190, 1192, 1194 and the truck 1180 is connected to each of the other ones of the package nodes through a respective medium power communications path (shown by dashed lines). In some embodiments, the medium power communications paths are LoRa formatted communication paths.

In some embodiments, the communications interfaces 1184 and 1186 (e.g., a LoRa communications interface and a Bluetooth Low Energy communications interface) on the node on the truck 1180 is programmed to broadcast advertisement packets to establish connections with other network nodes within range of the truck node. A warehouse 1188 includes medium range nodes 1190, 1192, 1194 that are associated with respective logistic containers 1191, 1193, 1195 (e.g., packages, boxes, pallets, and the like). When the truck node's low power interface 1186 is within range of any of the medium range nodes 1190, 1192, 1194 and one or more of the medium range nodes is operating in a listening mode, the medium range node will extract the address of truck node and potentially other information (e.g., security information) from the advertising packet. If, according to its programmatic code, the truck node determines that it is authorized to connect to one of the medium range nodes 1190, 1192, 1194, the truck node will attempt to pair with the medium range node. In this process, the truck node and the medium range node determine each other's identities, capabilities, and services. For example, after successfully establishing a communication path with the truck node (e.g., a Bluetooth Low Energy formatted communication path 1114 or a LoRa formatted communication path 1115), the truck node determines the identity information for the medium range node 1190 (e.g., a peripheral node), the medium range node's capabilities include retrieving temperature data, and the medium range node's services include transmitting temperature data to other nodes. Depending of the size of the warehouse 1188, the truck 1180 initially may communicate with the nodes 1190, 1192, 1194 using a low power communications interface (e.g., Bluetooth Low Energy interface). If any of the anticipated nodes fails to respond to repeated broadcasts of advertising packets by the truck 1180, the truck 1180 will try to communicate with the non-responsive nodes using a medium power communications interface (e.g., LoRa interface). In response to a request from the medium-power communication interface 1184, the medium range node 1190 transmits an indication of its measured temperature data to the truck node. The truck node repeats the process for each of the other medium range nodes 1192, 1194 that generate temperature measurement data in the warehouse 1188. The truck node reports the collected (and optionally processed, either by the medium range nodes 1190, 1192, 1194 or the truck node) temperature data to a server over a cellular communication path 1116 with a cellular network 1118.

Figure 12:
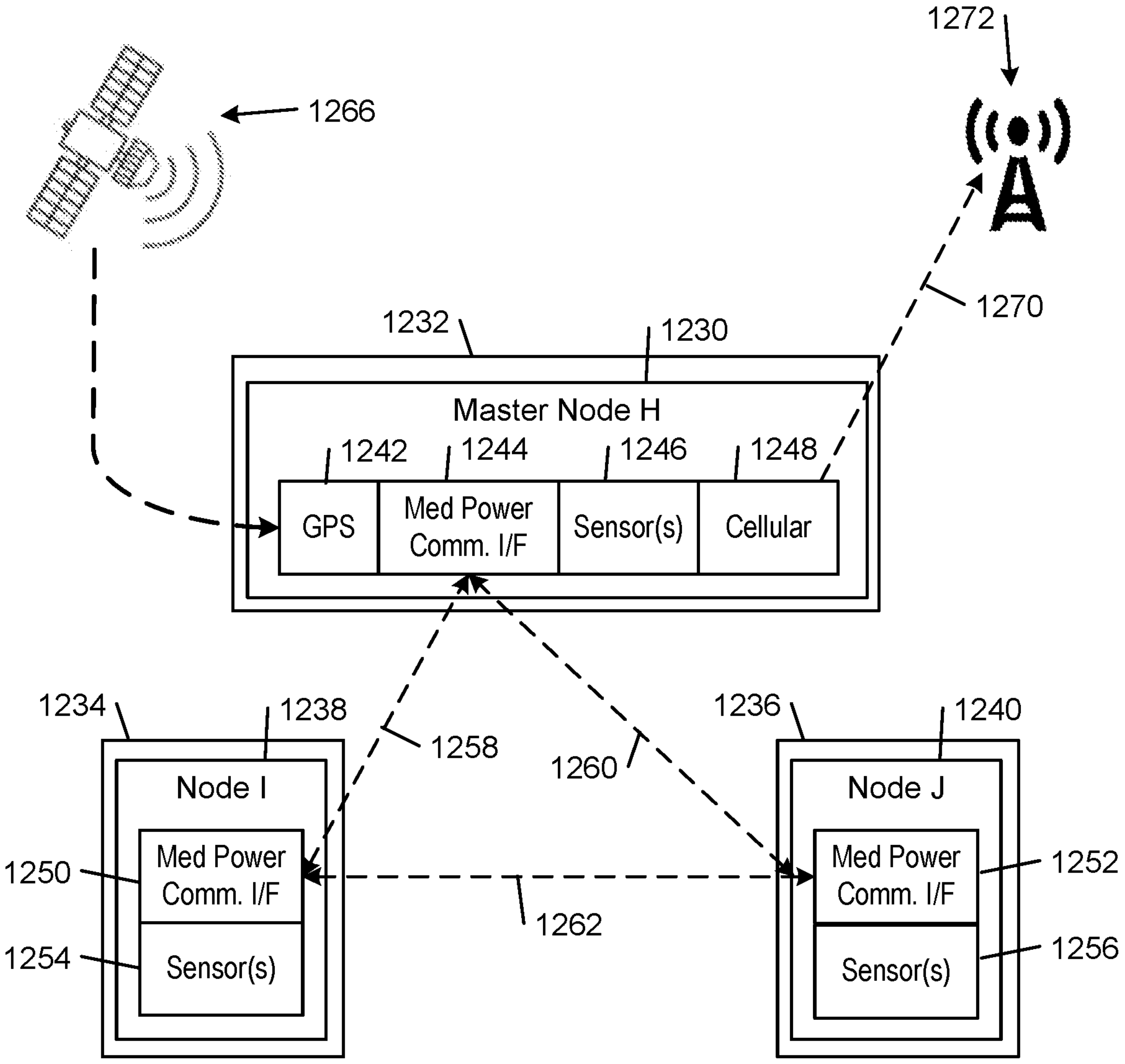
FIG. 12 is a schematic illustrating a master node associated with a logistic item that is grouped together with other logistic items associated with peripheral nodes, in embodiments.

FIG. 12 is a schematic illustrating a master node 1230 is associated with a logistic item 1232 (e.g., a package) and grouped together with other logistic items 1234, 1236 (e.g., packages) that are associated with respective peripheral nodes 1238, 1240. The master node 1230 includes a GPS receiver 1242, a medium power communications interface 1244, one or more sensors 1246, and a cellular communications interface 1248. Each of the peripheral nodes 1238, 1240 includes a respective medium power communications interface 1250, 1252 and one or more respective sensors 1254, 1256. In the illustrated embodiment, the peripheral and master nodes are connected to one another other over respective pairwise communications paths (shown by dashed lines). In some embodiments, the nodes 1230, 1238, 1240 communicate through respective LoRa communications interfaces over LoRa formatted communications paths 1258, 1260, 1262.

In the illustrated embodiment, the master and peripheral nodes 1230, 1238, 1240 include environmental sensors for obtaining information regarding environmental conditions in the vicinity of the associated logistic items 1232, 1234, 1236. Examples of such environmental sensors include temperature sensors, humidity sensors, acceleration sensors, vibration sensors, shock sensors, pressure sensors, altitude sensors, light sensors, and orientation sensors.

In accordance with the programmatic code stored in its memory, the master node 1230 periodically broadcasts advertising packets in the surrounding area. When the peripheral nodes 1238, 1240 are within range of master node 1230, and are operating in a listening mode, the peripheral nodes 1238, 1240 will extract the address of master node 1230 and potentially other information (e.g., security information) from the advertising packets. If, according to their respective programmatic code, the peripheral nodes 1238, 1240 determine that they are authorized to connect to the master node 1230, the peripheral nodes 1238, 1240 will attempt to pair with the master node 1230. In this process, the peripheral nodes 1238, 1240 and the master node 1230 determine each other's identities, capabilities, and services. For example, after successfully establishing a respective communication path 1258, 1260 with each of the peripheral nodes 1238, 1240 (e.g., a LoRa formatted communication path), the master node 1230 determines certain information about the peripheral nodes 1238, 1240, such as their identity information (e.g., peripheral nodes), their capabilities (e.g., measuring temperature data), and their services include transmitting temperature data to other nodes.

After establishing LoRa formatted communications paths 1258, 1260 with the peripheral nodes 1238, 1240, the master node 1230 transmits requests for the peripheral nodes 1238, 1240 to transmit their measured and/or locally processed temperature data to the master node 1230.

In the illustrated embodiment, the master node 1230 can determine its own location based on geolocation data transmitted by a satellite-based radio navigation system 1266 (e.g., GPS, GLONASS, and NAVSTAR) and received by the GPS receiver 1242 component of the master node 1230. In an alternative embodiment, the location of the master node 1230 can be determined using cellular based navigation techniques that use mobile communication technologies (e.g., GSM, GPRS, CDMA, etc.) to implement one or more cell-based localization techniques. After the master node 1230 has ascertained its location, the distance of each of the logistic items 1234, 1236 from the master node 1230 can be estimated based on the average signal strength of the advertising packets that the master node 1230 receives from the respective peripheral node. The master node 1230 can then transmit its own location and the locations of the package nodes H, J, and I to a server over a cellular interface connection with a cellular network 1272. Other methods of determining the distance of each of the logistic items 1234, 1236 from the master node 1230, such as Received Signal-Strength Index (RSSI) based indoor localization techniques, also may be used.

In some embodiments, after determining its own location and the locations of the peripheral nodes, the master node 1230 reports the location data, the collected and optionally processed (e.g., either by the peripheral nodes peripheral nodes 1238, 1240 or the master node 1230) sensor data to a server over a cellular communication path 1270 on a cellular network 1272.

Asset Transport and Monitoring

U.S. patent application Ser. No. 18/143,452, titled "Portable Wireless Network Enhancement Device and Associated Methods," filed May 4, 2023, also filed as PCT/US23/21045, is incorporated herein by reference, and referred to hereafter as the "Enhancement Device Application." The Enhancement device application teaches of a portable wireless network enhancement device that provides a human-interaction interface to a wireless network.

ULD (universal loading device) is a container for loading air freight onto planes. ULD is transported on individual ULD carts. "ULD carts" or "carts" may herein refer to carts, dollies, or other transport containers used for transporting ULDs. The ULD carts link to each other to form a train using latching mechanics (front latch hooks up to rear latch of adjacent ULD cart, and so on). The train is pulled by a tug that moves the ULD carts throughout airport and airfield. A tug is a vehicle that tows or moves ULD carts. A tug may be a tractor or a truck, in some embodiments. A loader is a machine that loads ULDs into a cargo space of a vehicle for transport over a next phase of its journey.

One aspect of the present embodiments includes the realization that handling of ULDs (or individual assets, pallets of assets, etc.), at a transport facility (e.g., an airport) involves many movements and stops for the ULDs, prior to being loaded onto a vehicle for a next phase of a journey to a destination. With many stops and shared journeys, the ULDs are often waiting at locations that are not associated with their destination vehicle, and thus anomaly reports for location based tracking are often delayed until after the ULD is loaded onto its transportation vehicle. By the time the anomaly report is generated, the ULD may already be loaded onto the wrong vehicle or is noted as missing from that vehicle when it is ready to depart. The present embodiments solve this problem by providing a more robust tracking solution with reduced chance of producing false negative reports that uses time quantization algorithms for end-to-end monitoring of the ULDs journey through the transport facility. This multi-mode tracking allows early reporting of incorrect ULD movements and thereby easier rectification of the error.

As used herein, the term anomaly means a deviation or error in transportation of an asset through a transportation facility and/or erroneous loading of the asset, such as loading of the asset onto the wrong transportation vehicle. For example, where the asset is intended to be loaded onto a specific vehicle for movement through the transportation facility to the transportation vehicle, but the vehicle is being directed to a different transportation vehicle, the movement of the asset is an anomaly since it is heading to the wrong transportation vehicle. Where the asset is being loaded onto the wrong transportation vehicle, that is an anomaly. Where the asset is stopped at an unexpected location, that is an anomaly. Thus, the anomaly occurs when the asset deviates from an expected path through the transportation facility or when the asset is loaded onto the wrong transportation vehicle (e.g., one not headed to a destination or waypoint of the asset).

Figure 13:
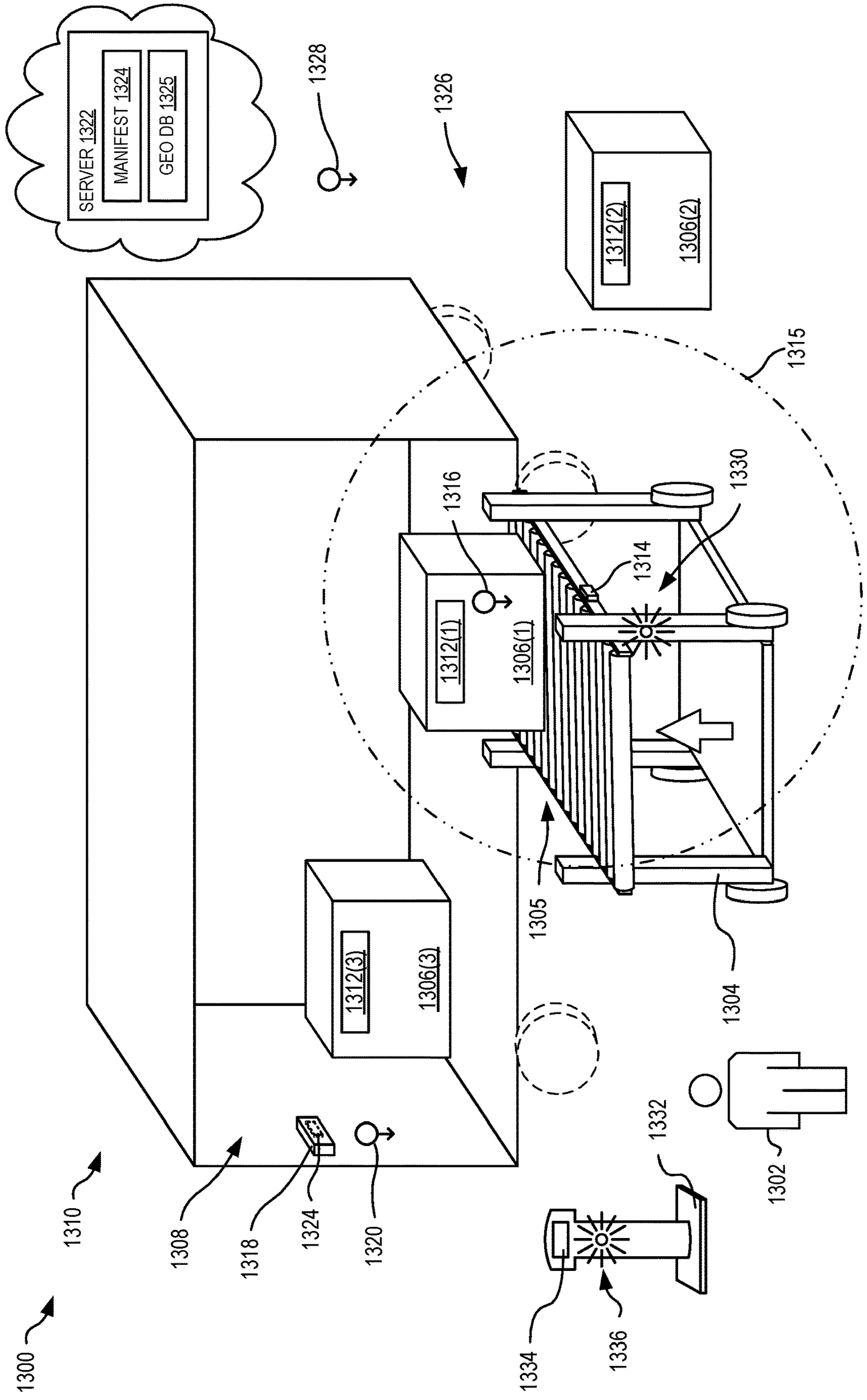
FIG. 13 is a schematic diagram illustrating one example wireless tracking system for detecting when a ULD is being loaded into a cargo space in error, in embodiments.

FIG. 13 is a schematic diagram illustrating one example wireless tracking system 1300 for detecting when a ULD 1306 is being loaded into a cargo space 1308 of a vehicle 1310 in error, in embodiments. Advantageously, by detecting loading ULD 1306 onto vehicle 1310, wireless tracking system 1300 may immediately detect when the ULD is not intended for that vehicle 1310 and generate a notification of the error before ULD 1306 is completely loaded, thereby allowing the error to be easily rectified.

In some embodiments, vehicle 1310 is an airplane (e.g., a commercial airplane or a cargo plane). In other embodiments, vehicle 1310 is a different type of vehicle with a cargo space 1308 that is typically elevated off the ground, such as a truck, an automobile, or a train. In some embodiments, cargo space 1308 is a cargo space or component that may be coupled to different vehicles, such as a trailer or a semi-trailer. Vehicle 1310 may have an associate vehicle ID that identifies the vehicle and/or the transportation provided by the vehicle. For example, where vehicle 1310 is an aircraft, the vehicle ID may be a flight number that indicates a destination of the vehicle.

Wireless tracking system 1300 implements a wireless network (e.g., see wireless network 802, gateways 810, 812, 814 and tape nodes 842, 844, 846, 848, etc. of FIG. 8) and may also include one or more cloud based servers 1322 (e.g., server(s) 804 of FIG. 8), however, certain functionality of wireless tracking system 1300 does not require communication with server 1322 and thereby avoids undesired latency as described in detail below.

In the example of FIG. 13, an operator 1302 uses a loader 1304 (e.g., a K-loader, fork-lift, etc.) to load ULD 1306(1) into a cargo space 1308 of vehicle 1310. Vehicle 1310 represents any one of an aircraft, a train, an air-trailer, a truck, a van, a ship, and so on, where cargo space 1308 is a corresponding one of a cargo hold, a carriage, a trailer area, and a deck.

ULD 1306 may represent one or more of an individually packaged item, a pallet of items, a container containing at least one item, and so on, without departing from the scope hereof. In FIG. 13, ULD 1306(1) is positioned on loader 1304, ULD 1306(2) is on the ground waiting to be loaded, and ULD 1306(3) is already loaded into cargo space 1308. Each ULD 1306 is configured with at least one tape node 1312 (e.g., a wireless tracking device such as master tape nodes 842, 844, 846, 848 of FIG. 8) that tracks movement of the asset. In certain embodiments, tape node 1312 is solar powered. Each tape node 1312 has a unique node ID that is associated with a unique ULD ID of the ULD to which it is attached. Accordingly, given one of the node ID and the ULD ID, the other is easily determined, as assumed in the following description, based on an association between the two ID defined in at least a cloud based server 1322 of wireless tracking system 1300. Tape node 1312 includes one or more sensors (e.g., one or more of an accelerometer, a gyroscope, a temperature sensor, a light sensor, and a pressure sensor—see sensing transducers 424 of FIG. 4) that allows tape node 1312 to detect movement of ULD 1306, according to some embodiments. To conserve battery power, tape node 1312 may 1312 may not transmit information (e.g., status messages, activity information, detected events) when tape node 1312 does not detect movement above a threshold level (e.g., when ULD 1306 is not moving or is waiting in storage).

Wireless tracking system 1300 implements both a motion communication channel and a stationary communication channel (e.g., two channels of the wireless protocol used by wireless tracking system 1300 where wireless tracking devices that are stationary do not transmit on the motion communication channel). Accordingly, tape node 1312 transmits status messages on the stationary communication channel when motion is not detected, and transmits status messages on the motion communication channel when motion is detected. Accordingly, when tape node 1312 detects movement above the threshold level, tape node 1312 sends a movement detected message 1316 on the motion communication channel of wireless tracking system 1300 (e.g., see also communication interfaces 652, 672', and 682" of FIGS. 6A, 6B, and 6C respectively). For example, tape node 1312 detects its own movement based on one or more sensors of tape node 1312, such as detecting acceleration or calculating velocity using an accelerometer.

Loader 1304 represents one or more of a ULD loader, a conveyor loader, a fork lift, a ball-deck or ball-mat (e.g., also call a CSP), and so on. That is, any device that facilitates movement for purposes of loading ULD 1306 onto a vehicle. Loader 1304 may be configured with a gateway node 1314 (e.g., a medium-range secondary tape node such as segment 670 of FIG. 6B or a long-range tertiary tape node such as segment 680 of FIG. 6C, and so on) that also includes a short-range communication interface (e.g., low-power wireless-communication interface 652 of FIG. 6A) to communicate with nearby tape nodes 1312. Gateway node 1314 may be line powered, battery powered, solar powered, or a different type of wireless communication device. In some embodiments, gateway node 1314 is a solar mobile gateway that includes a rechargeable battery, a solar panel, and a solar charging circuit coupled to the battery and the solar panel that controls when the solar panel is used to recharge the battery. Gateway node 1314 includes short-range communication capability (e.g., Bluetooth for scanning for ULDs), medium-range communication (e.g., Wi-Fi), long-range communication capability (e.g., cellular and/or LoRa for communication with cloud based server 1322), and may include GPS capability for determining its current geographic location.

To conserve battery power, gateway node 1314 transitions to a low power mode when no movement is detected. As shown in FIG. 13, gateway node 1314 may be positioned on a loading platform 1305 (or other moving part) of loader 1304. Gateway node 1314 may include at least one accelerometer for detecting vertical acceleration and/or a pressure sensor for detecting ambient air pressure. While in a low-power mode, gateway node 1314 monitors its accelerometer and/or a pressure sensors to detect movement and/or vibration indicative of operation (e.g., raising or lowering of loading platform 1305, etc.) of loader 1304, and transitions to an operational mode for detecting tape nodes 1312 on ULDs 1306 when operation of loader 1304 is detected. Loading platform 1305 may be raised a distance of up to five or six meters above the ground, which corresponds to a change of a several pascals in air pressure that is detectable by the pressure sensor of gateway node 1314 and/or similar pressure sensors of tape node 1312 attached to ULD 1306(1) positioned on loading platform 1305. For example, tape node 1312 of ULD 1306(1) and gateway node 1314 may detect vertical movements as small as one meter by detecting changes in ambient air pressure.

In the example of FIG. 13, operator 1302 controls loader 1304 to raise loading platform 1305 to lift ULD 1306(1) to a suitable height for maneuvering of ULD 1306(1) into cargo space 1308. As loading platform 1305 is raised by loader 1304, gateway node 1314 detects an increase in elevation (e.g., rising) of loading platform 1305 using its accelerometers and/or pressure sensor for example. In response to detecting operation of loader 1304, gateway node 1314 controls its short-range wireless interface to receive messages on the motion communication channel of wireless tracking system 1300.

Tape node 1312(1), attached to ULD 1306(1) positioned on loading platform 1305, detects the increasing elevation of loading platform 1305 and transmits a movement message 1316, including a unique ID of tape node 1312(1), on the motion communication channel of wireless tracking system 1300. In certain embodiments, tape node 1312 determines, based on the change in detected air pressure, that it is being loaded into a cargo space. Since ULD 1306(2) and 1306(3) are not moving, they do not transmit messages on the motion communication channel and therefore gateway node 1314 only receives message 1316 from tape node 1312(1) on the motion communication channel. Accordingly, based on receiving message 1316 (and by absence of messages from other tape nodes on the motion communication channel), gateway node 1314 determines that ULD 1306(1) is being raised by loading platform 1305 and is being loaded into cargo space 1308. Tape node 1312(1) may also transmit on other channels of wireless tracking system 1300 when motion is detected to report loading of ULD 1306(1) into cargo space 1308. For example, messages on the motion communication channel may not be reported to cloud based server 1322, and therefore tape node 1312(1) also transmits a message on the stationary communication channel and/or other communication channels of wireless tracking system 1300, such that information of the loading event is received by cloud based server 1322. For example, tape node 1312(1) may transmit message 1316 on both the motion communication channel and the stationary communication channel.

In certain embodiments, where vehicle 1310 is an aircraft, loading of ULD 1306(1) is determined a special event in logic of tape node 1312(1), which causes tape node 1312(1) to transmit message 1316 on both the motion communication channel and the stationary communication channel. Similarly, tape node 1312(3) of ULD 1306(3) already located within cargo space 1308 may use sensed information, such as pressure change (e.g., elevation change), to determine that it is on an aircraft, and/or that it has not been unloaded from an aircraft. Accordingly, tape node 1312(3) may transmit a message on the stationary communication channel with an indication (e.g., one or more flags, bits, instructions, etc.) that defining its determined status as one or more of: on an aircraft, loaded onto the aircraft and not unloaded. In certain embodiments, data transmitted by tape nodes 1312 may include an elevation (or sensed air pressure) with its unique identifier, whereby gateway node 1314 (or other gateway node) process the elevation (or pressure) information to determine whether the corresponding ULD is loaded on a plane, based for example on a known height of cargo space 1308 above the ground.

Where other messages are receive on the motion communication channel, gateway node 1314 may use additional information to determine that ULD 1306(1) is being loaded into cargo space 1308 as described below. The use of multiple indications of ULD 1306(1) being on loading platform 1305 increases the accuracy of detecting loading of ULD 1306(1) into cargo space 1308 and thereby reduces the number of false negatives generated by wireless tracking system 1300 of incorrectly loaded ULDs 1306. For example, gateway node 1314 may correlate the timing of detecting motion of loading platform 1305 with a time of receiving message 1316 to determines a most likely ULD to be on loading platform 1305. Gateway node 1314 may also determine whether ULD 1306(1) is being loaded or unloaded based on a detected direction of loading platform 1305 while tape node 1312(1) is determined to be thereon. For example, a decrease in detected ambient air pressure by gateway node 1314 indicates that loading platform 1305 has increasing elevation (e.g., rising) and any ULD 1306 thereon is being loaded into cargo space 1308.

In certain embodiments, tape node 1312 includes a light sensor for determining when cargo space 1308 has been closed. For example, when the light sensors indicates a transition from light to dark, tape node 1312 determines that cargo space 1308 has been closed. Accordingly, tape node 1312 determines that loading is complete and transitions into a hibernation (e.g., low power) mode. Tape node 1312 may transition out of the hibernation mode when the light sensor transition from dark to light.

In certain embodiments, gateway node 1314 may also track a number of times messages are received from tape nodes 1312 of each ULD 1306, whereby infrequent communication from a particular tape node may indicate that the tape node has not been near gateway node 1314 for long and is therefore unlikely to be positioned on loading platform 1305. Where the number of times a message is received from the same tape node 1312 is low, gateway node 1314 determines that the corresponding ULD 1306 has not been waiting to be loaded and is therefore not being loaded into cargo space 1308. Gateway node 1314 may also determine that no loading is in progress when it does not detect movement of loading platform 1305.

In another example, gateway node 1314 determines a distance between gateway node 1314 and tape node 1312(1) based on detected RSSI of message 1316, ignoring messages having an RSSI that indicates that the corresponding ULD is located outside a loader geofence 1315 (illustrated as a circle, but represents a spherical boundary centered on gateway node 1314 and that includes loading platform 1305 of loader 1304 but does not extend significantly beyond it). For example, for a received message, gateway node 1314 determines that the corresponding ULD 1306 is not on loader 1304, and therefore not being loaded into cargo space 1308, when the RSSI indicates that the corresponding ULD is not within loader geofence 1315. That is, gateway node 1314 verifies that the RSSI of message 1316 indicates that the corresponding tape node 1312 is close enough to gateway node 1314 to be on loading platform 1305, ignoring the message and the tape node when the distance is greater than the radius of loader geofence 1315. Further, gateway node 1314 may monitor change in RSSI for each tape node 1312 and where the detected RSSI for the tape node is not changing significantly, gateway node 1314 determines that the corresponding ULD 1306 is not moving and is therefore not being loaded into cargo space 1308.

Verifying ULD Loading

Gateway node 1314 may receive a manifest 1324 of assets expected to be loaded in to cargo space 1308 of vehicle 1310 from a gateway node 1318 of vehicle 1310. For example, vehicle 1310 may include gateway node 1318 to monitor ULDs 1306 within cargo space 1308 during transit and may therefore store manifest 1324 that includes the vehicle ID and lists unique ID of tape nodes 1312 and/or a ULD ID of each expected ULD. Accordingly, gateway node 1314 may request that gateway node 1318 send its manifest 1324, shown as message 1320, prior to loading of ULDs 1306 into cargo space 1308.

Where vehicle 1310 is not configured with gateway node 1318, or where gateway node 1318 does not have manifest 1324, gateway node 1314 may request manifest 1324, based on the vehicle ID and/or a current location of gateway node 1314, from cloud based server 1322 prior to loading ULDs 1306 into cargo space 1308. For example, where gateway node 1314 includes a GPS receiver (e.g., GPS receiver 1054 of FIG. 10C), gateway node 1314 determines its current geographic location. Alternatively, where loader 1304 includes a locationing device, gateway node 1314 may receive its current location from loader 1304. In certain embodiments, gateway node 1314 may determine its location based on triangulation of wireless signals, such as Wi-Fi and/or cellular signals. Gateway node 1314 then requests manifest 1324 from the cloud based server based on its current location. Accordingly, since vehicle 1310 is parked in a designated area 1326 (e.g., a loading bay at a warehouse, a platform of a train station, a gate or tarmac area at an airport, etc.), the server may identify vehicle 1310 when the current location of gateway node 1314 is within the designated area for that vehicle. Having identified vehicle 1310 and/or a destination of the vehicle, cloud based server 1322 sends a message 1328 with manifest 1324 to gateway node 1314 based on the determined vehicle ID and/or location. In certain embodiments, gateway node 1314 is configured, from a geofence database 1325 of cloud based server 1322 for example, with geographic coordinates and/or geofences one or more designated areas 1326 in which gateway node 1314 is expected to operate. Accordingly, gateway node 1314 may compare its current location with the geographic coordinates and/or geofences to determine when it is incorrectly located during loading of ULDs 1306, and may generate at least one notification 1330 to indicate the incorrect location. For example, geofence database 1325 may store geographic coordinate and/or geofence areas of designated areas 1326 (e.g., a loading bay at a warehouse, a platform of a train station, a gate or tarmac area at an airport, etc.) where loading of ULD 1306 into vehicle 1310 occurs.

Alternatively, gateway node 1314 may determine the vehicle ID of vehicle 1310 and request the corresponding manifest 1324 from cloud based server 1322. In certain embodiments, tape node 1312 may download or receive manifest 1324 that includes data for multiple loading operations (e.g., a loading schedule for loader 1304 for at least part of the day) that defines the ID of each vehicle 1310 and the corresponding ULD IDs (or unique IDs or corresponding tape nodes 1312) for each vehicle for which loader 1304 provides a loading service. For example, manifest 1324 may define a geofence that defines designated area 1326 where the loading of vehicle 1310 is to occur. Accordingly, gateway node 1314 may verify loader 1304 is at the expected loading location based on its current location (e.g., determined from GPS or from loader 1304) and the defined geofence, vehicle ID, and/or schedule within manifest 1324.

In another example where vehicle 1310 is an aircraft, gateway node 1314 may receive flight data in an ADS broadcast from the aircraft, and then communicate with cloud based server 1322 to receive the manifest based on the flight data. In another example, gateway node 1314 uses GPS (or a GPS of loader 1304) to determine its current location, sends the location to cloud based server 1322, and receives in response the manifest corresponding to vehicle 1310 at that location. For example, the determined location may correspond to a designated area 1326 for loading vehicle 1310, such as one of a loading bay, an apron area, a flight gate, etc. In certain embodiments, designated area 1326 is defined by a geofencing of an airport or other transportation facility. Cloud based server 1322 uses the location of gateway node 1314 to determine an identifier of vehicle 1310 based on a schedule of vehicle 1310 and/or of designated area 1326. For example, where designated area 1326 is an aircraft gate or apron area at an airport, cloud based server 1322 uses a schedule of designated area 1326 and/or of an aircraft located within designated area 1326 to determine a manifest that indicates which ULDs 1306 should be loaded onto vehicle 1310. Accordingly, gateway node 1314 may use the received manifest to determine whether ULD 1306(1) is being correctly loaded onto vehicle 1310. In certain embodiments, gateway node 1314 sends the ULD ID of ULD 1306(1) and/or unique ID of tape node 1312(1) to cloud based server 1322 which then determines whether ULD 1306(1) is being correctly loaded onto vehicle 1310 based on the manifest associated with vehicle 1310.

Continuing with the example of FIG. 13, gateway node 1314 compares the unique ID of tape node 1312(1), received in message 1316, to manifest 1324 to determine whether or not ULD 1306(1) is expected to be loaded into cargo space 1308. In response to determining that ULD 1306(1) does not match manifest 1324 (e.g., ULD 1306(1) is not expected in cargo space 1308), gateway node 1314 generates a notification 1330 (e.g., a flashing light, an audible alert, or a notification on a smart phone of operator 1302, etc.) to indicate that ULD 1306(1) currently being loaded, is not expected on vehicle 1310 (e.g., tape node 1312(1) is being loaded in error). Notification 1330 is generates near where the loading is occurring, such as near operator 1302 and/or loader 1304. Advantageously, notification 1330 has a low latency and operator 1302 receives notification 1330 before ULD 1306(1) is completely loaded into cargo space 1308, allowing operator 1302 to pause and/or reverse the loading process to correct the problem. In other embodiments, gateway node 1314 may send received information from tape nodes 1312 to cloud based server 1322, whereby cloud based server 1322 determines when ULDs 1306 are loaded incorrectly and instructs gateway node 1314 to generate notification 1330 as needed. Alternatively, cloud based server 1322 generates notification 1330 via portable wireless network enhancement device 1332, described below.

Advantageously, gateway node 1314 may use more than one sensed property to determine whether each ULD 1306 is being correctly loaded into cargo space 1308. By using (fusing) these properties together, gateway node 1314 increases reliability of detecting incorrectly loaded assets and reduces false positives that would impede the loading process. For example, gateway node 1314 uses both RSSI and movement detect to determine that ULD 1306(1) in on loading platform 1305.

In certain embodiments, notification 1330 may indicate a correct designated area 1326 (e.g., a loading bay at a warehouse, a platform of a train station, and a gate or tarmac area at an airport) for ULD 1306(1) when it is being loaded in error. In one example, notification 1330 causes a description of the correct designated area 1326 to be displayed on a display of a device receiving the notification 1330. In another example, notification 1330 is displayed on a display of a device generating notification 1330. Accordingly, an operator is informed to intervene and redirect ULD 1306(1) to the correct designated area 1326. In some embodiments, the device that receives the notification 1330 receives the notification 1330 directly from tape node 1312 or gateway node 1314. In certain embodiment, gateway node 1314 includes a display and displays notification 1330.

In certain embodiments, where loader 1304 is not configured with gateway node 1314, wireless tracking system 1300 may include a portable wireless network enhancement device 1332 (see the Enhancement Device Application for additional details) positioned near loader 1304 and/or vehicle 1310. Portable wireless network enhancement device 1332 includes a human-interaction interface 1334 that may also function similarly to gateway node 1314 as described above. For example, portable wireless network enhancement device 1332 may detect when ULD 1306(1) is being erroneously loaded into cargo space 1308 by receiving message 1316 and generates a notification 1336 to alert operator 1302 of a loading error when portable wireless network enhancement device 1332 determines that ULD 1306(1) is being loaded in error. Notification 1336 is similar to notification 1330 but is generated by human-interaction interface 1334 for example. Advantageously, portable wireless network enhancement device 1332 may be positioned where it is easily seen and/or heard by operator 1302. As described in the Enhancement Device Application, portable wireless network enhancement device 1332 may have any suitable form factor including a cone form factor or a briefcase for factor. In certain embodiments, portable wireless network enhancement device 1332 and gateway node 1314 may 1314 may be used together where portable wireless network enhancement device 1332 cooperates with gateway node 1314 to provide an improved interface with operator 1302 and/or communication with cloud based server 1322.

In certain embodiments, other gateway nodes (e.g., gateway node 1414 of a nearby tug 1410, see FIG. 14) may receive messages 1316 from tape nodes 1312 and optionally a status from loader 1304 that may be processed to determine when ULDs 1306 are loaded incorrectly into cargo space 1308.

As noted above, ULDs 1306 may also represent individual or groups of assets that are not being transported within a ULD.

Transportation Facilities

Another aspect of the present embodiments includes the realization that association of ULDs based on proximity (e.g., geofencing) alone is insufficient where many ULDs are moved within a transportation facility, particularly where the ULDs are stationary and moving at different times as they are moved to a next stage of their transportation schedule. For example, ULDs may be moved together even when they have different destinations and designated transportation vehicles. The present embodiments solve this problem by using multiple methods to track ULDs within the transportation facility to detect and notify of erroneously moved assets with low latency and with reduced false positives.

Figure 14:
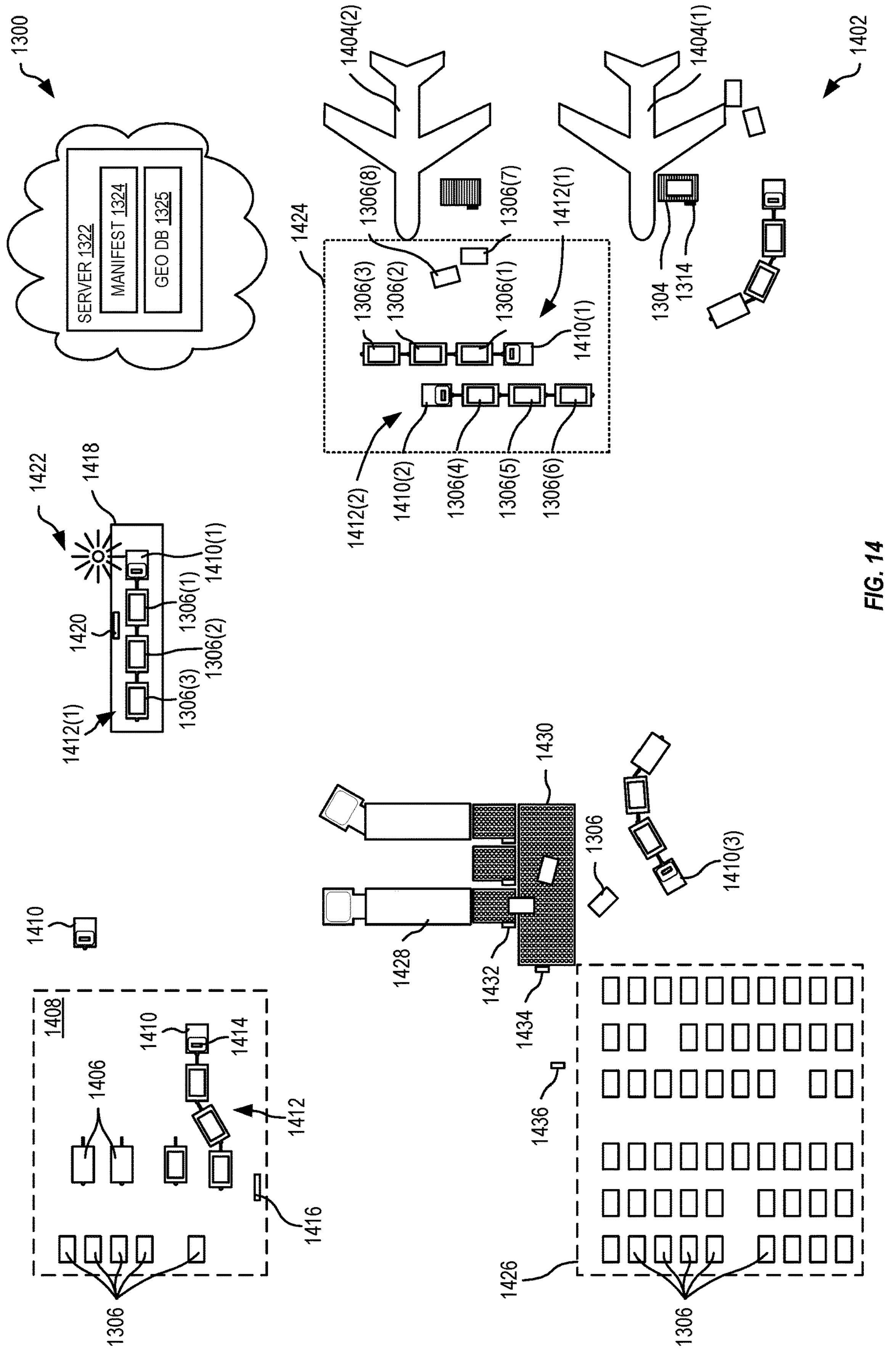
FIG. 14 is a schematic showing the wireless tracking system of FIG. 13 monitoring transportation of ULDs within a transportation facility, in embodiments.

FIG. 14 is a schematic showing wireless tracking system 1300 of FIG. 13 monitoring transportation of ULDs 1306 within a transportation facility 1402, in embodiments. In this example, vehicle 1310 of FIG. 13 is represented as aircraft 1404 that are used to transport ULDs 1306 to and from transportation facility 1402. As shown, ULDs 1306 are delivered to aircraft 1404 on ULD carts 1406 pulled by a tug 1410, as often found in busy airports. However, the described features and solutions also apply to any type of transportation facility (e.g., a freight handling), any type of asset, and any type of vehicle.

Figure 15:
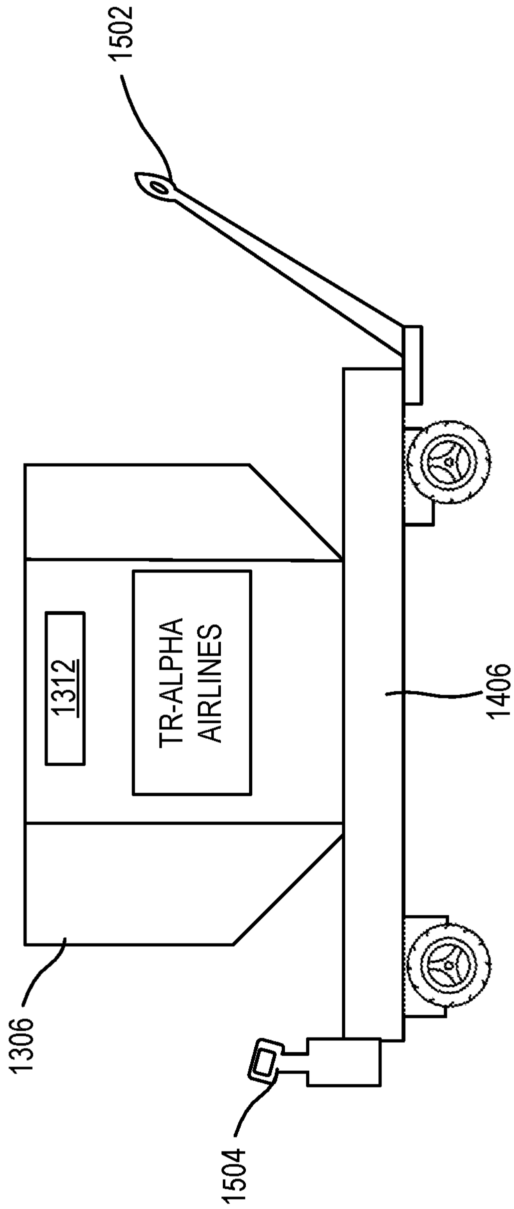
FIG. 15 shows one example ULD loaded onto a ULD cart in further detail, in embodiments.
Figure 16:
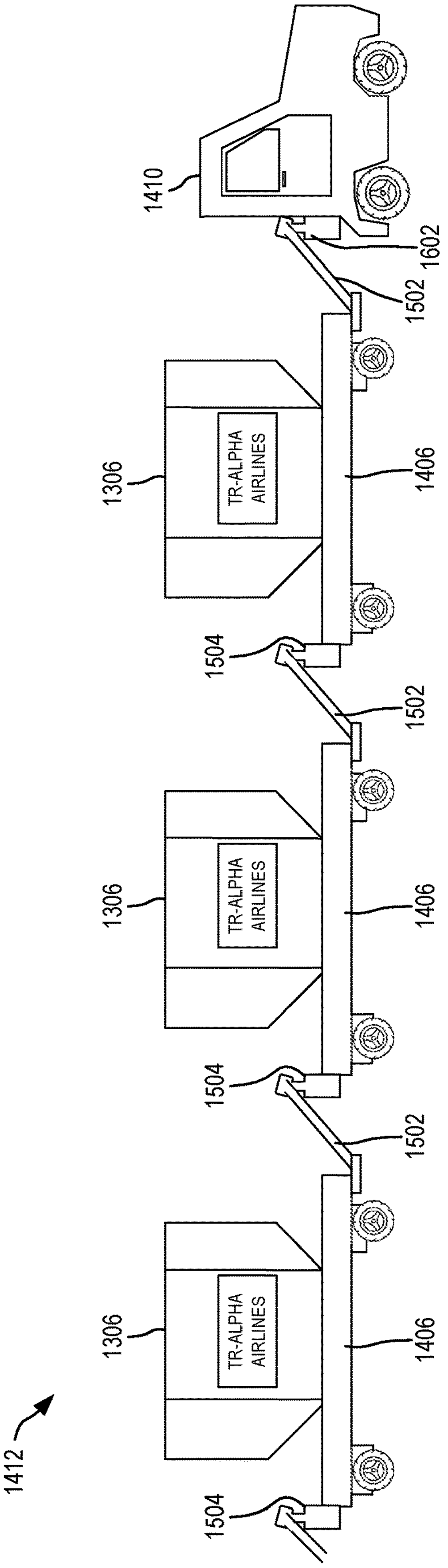
FIG. 16 shows a portion of one example train of ULD carts being towed by tug in further example detail, in embodiments.

Wireless tracking system 1300 tracks movement of ULDs 1306 to (and from) aircraft 1404 on ULD carts 1406 pulled by tugs 1410 as a train 1412. That is, ULDs 1306 are delivered to aircraft 1404 on ULD carts 1406 pulled by a tug 1410. Wireless tracking system 1300 provides end-to-end tracking of ULDs 1306 with low latency detection of ULD 1306 anomalies (e.g., transportation errors). FIG. 15 shows one example ULD 1306 loaded onto ULD cart 1406 in further detail, in embodiments. FIG. 16 shows a portion of one example train 1412 of ULD carts 1406 being towed by tug 1410 in further example detail, in embodiments. FIGS. 14, 15, and 16 are best viewed together with the following description.

In the example of FIG. 14, ULDs 1306 are loaded onto ULD carts 1406 at a staging area 1408, where certain ULD carts 1406 are linked together with a tug 1410 to form train 1412. For example, ULD carts 1406 may be grouped by a designated aircraft 1404 (e.g., flight number, gate, apron area) of ULDs 1306. In certain embodiments, train 1412 may be formed of ULD carts 1406 with ULDs 1306 designated for different aircraft. Each tug 1410 has a gateway node 1414 that may be configured with a tug manifest that identifies each ULD 1306, its position in train 1412 and its destination. Gateway node 1414 is a medium-range secondary tape node (e.g., segment 670 of FIG. 6B or a long-range tertiary tape node such as segment 680 of FIG. 6C), and may be implemented as a solar mobile gateway. Gateway node 1414 also includes a short-range communication interface (e.g., low-power wireless-communication interface 652 of FIG. 6A) to communicate with nearby tape nodes 1312.

Staging area 1408 may include a staging gateway node 1416 (e.g., see gateways 810, 812, 814 of FIG. 8) that implement a mesh network at staging area 1408 and may send the tug manifest to gateway node 1414 of tug 1410 as train 1412 is formed. In certain embodiments, the tug manifest defines a loading location (e.g., a location where the ULD is to be delivered by train 1412) for each ULD 1306. That is, movement of each ULD 1306 is planned and defines which tug 1410 is to pull the train used to move the ULD. Gateway node 1414 may include a GPS receiver (e.g., GPS receiver 1054 of FIG. 10C) for determining its geographic location, or, where tug 1410 includes a locationing device, gateway node 1414 may receive its current location from tug 1410. In certain embodiments, gateway node 1414 determines its location based on triangulation of wireless signals (e.g., Wi-Fi and/or cellular).

Each ULD cart 1406 has a front latch 1502 and a rear latch 1504 and tug 1410 has a rear latch 1602. A front latch 1502 of a first ULD carts 1406 mechanically couples to rear latch 1602 of tug 1410, a front latch 1502 of a next ULD cart 1406 mechanically couples with rear latch 1504 of the first ULD cart 1406, and so on to form train 1412. The driver of tug 1410 may detach ULD carts 1406 from train 1412 at a designated drop point of the ULDs (e.g., at aircraft 1404), continuing to a next drop point with any remaining ULDs 1306, returning to staging area 1408 to collect further ULDs 1306 for transport to aircraft 1404, or collecting ULDs 1306 from arriving aircraft 1404 for delivery to staging area 1408, for example. When arriving at the designated drop point, tug 1410 stops and gateway node 1414 stops scanning for ULDs 1306 until tug 1410 resumes motion.

As described in further detail below, gateway node 1414 of tug 1410(1) tracks ULDs 1306(1)-(3) by receiving messages from corresponding tape nodes 1312 thereon as train 1412 journeys towards the destination aircraft 1404. Accordingly, the collected tracking data defines a location where each ULD 1306 is delivered. For example, gateway node 1414 scans for tape nodes 1312, at various intervals, and receives transmissions from each tape node 1312 within wireless communication range of gateway node 1414. However, gateway node 1414 may receive a transmission response from many tape nodes, the number varying depending on the location of gateway node 1414 and the circumstances. For example, in area 1424 of transportation facility 1402, train 1412 passes a second train 1412(2) that is transporting ULDs 1306(4)-(6), and also passes stationary ULDs 1306(7) and 1306(8). Accordingly, gateway node 1414 of tug 1410(1) receives messages from tape nodes 1312 of ULDs 1306(1)-(8). To better discern between ULDs 1306 on train 1412(1) and ULDs 1306 that are not on train 1412(1) (e.g., ULDs 1306(4)-(8)), gateway node 1414 implements a smart algorithm (see algorithm 1906 of FIG. 19 and method 2000 of FIG. 20) that distinguished between ULDs that follow the path of tug 1410 and those that do not. For example, algorithm 1906 running on gateway node 1414 ignores ULDs 1306(4)-(8) since they are not travelling the same path as tug 1410(1) as shown in further detail in FIGS. 17 and 18.

Figure 17:
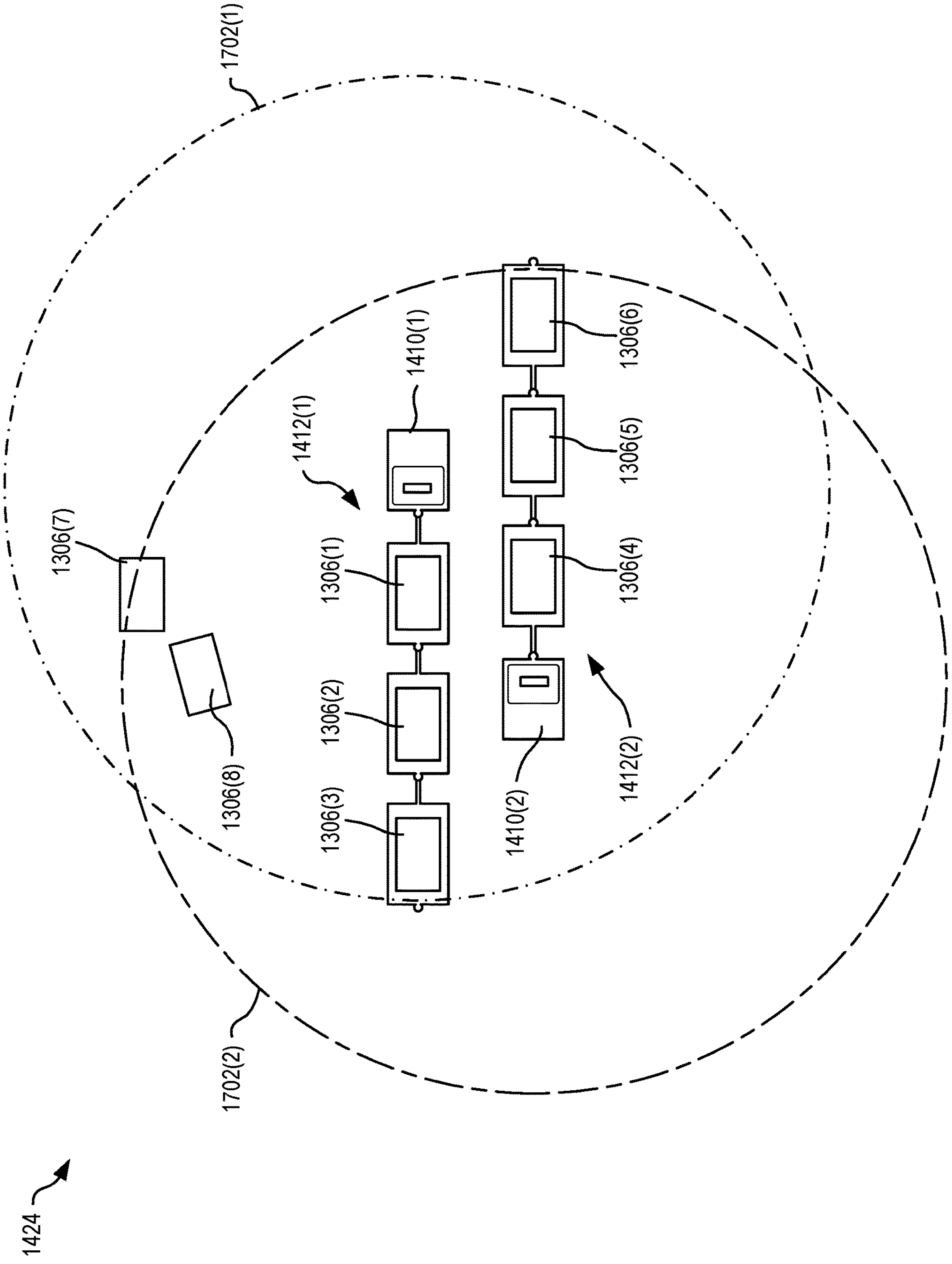
FIG. 17 is a plan view of an area of the transportation facility FIG. 14 at a first time illustrating use of a geofence by the gateway node of the tug to detect ULDs being transported on a train pulled by the tug, in embodiments.
Figure 18:
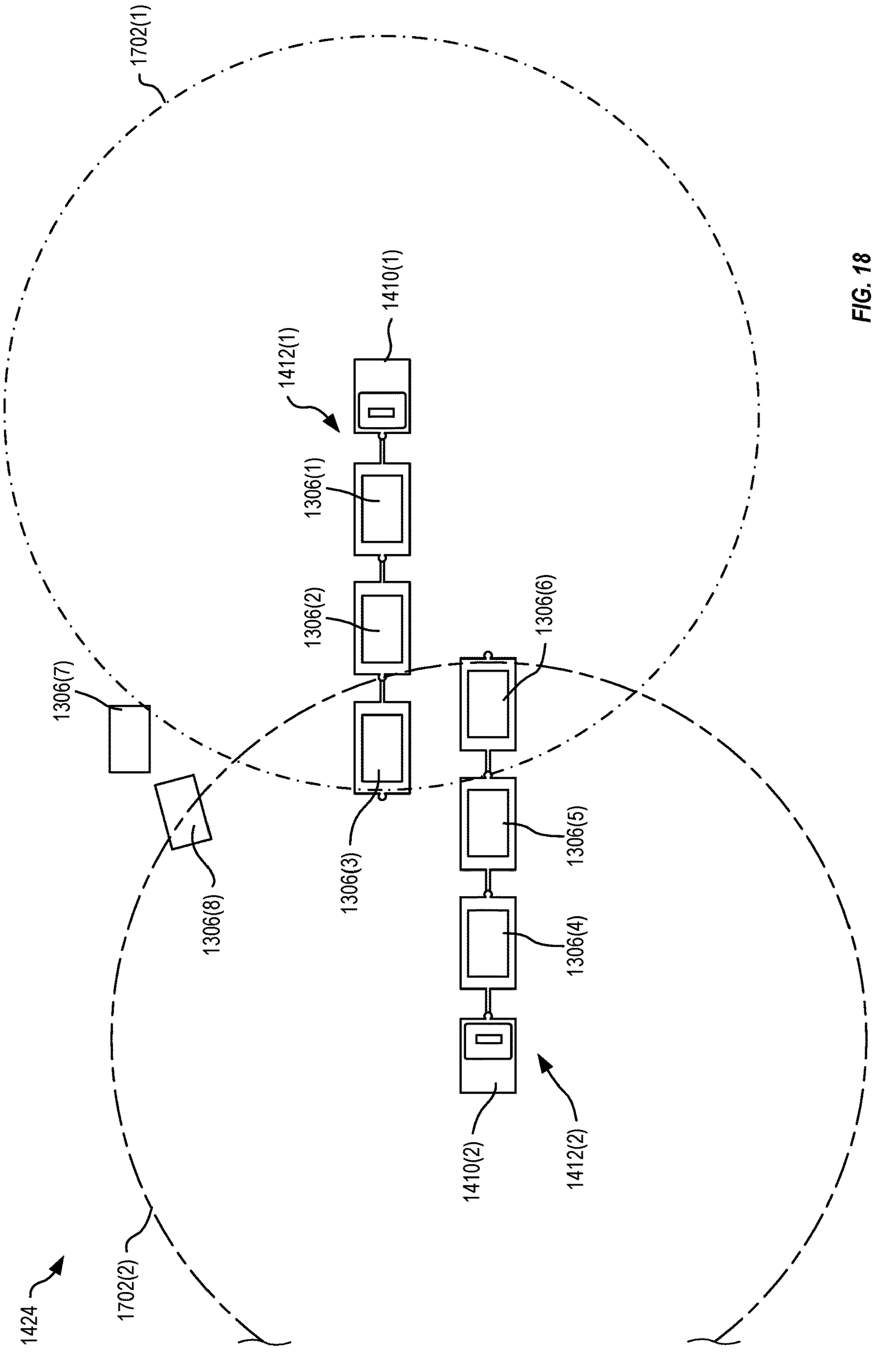
FIG. 18 is a plan view of the area of the transportation facility of FIG. 14, at a later time that shown in FIG. 17, when the trains have moved further along their respective paths, in embodiments.
Figure 19:
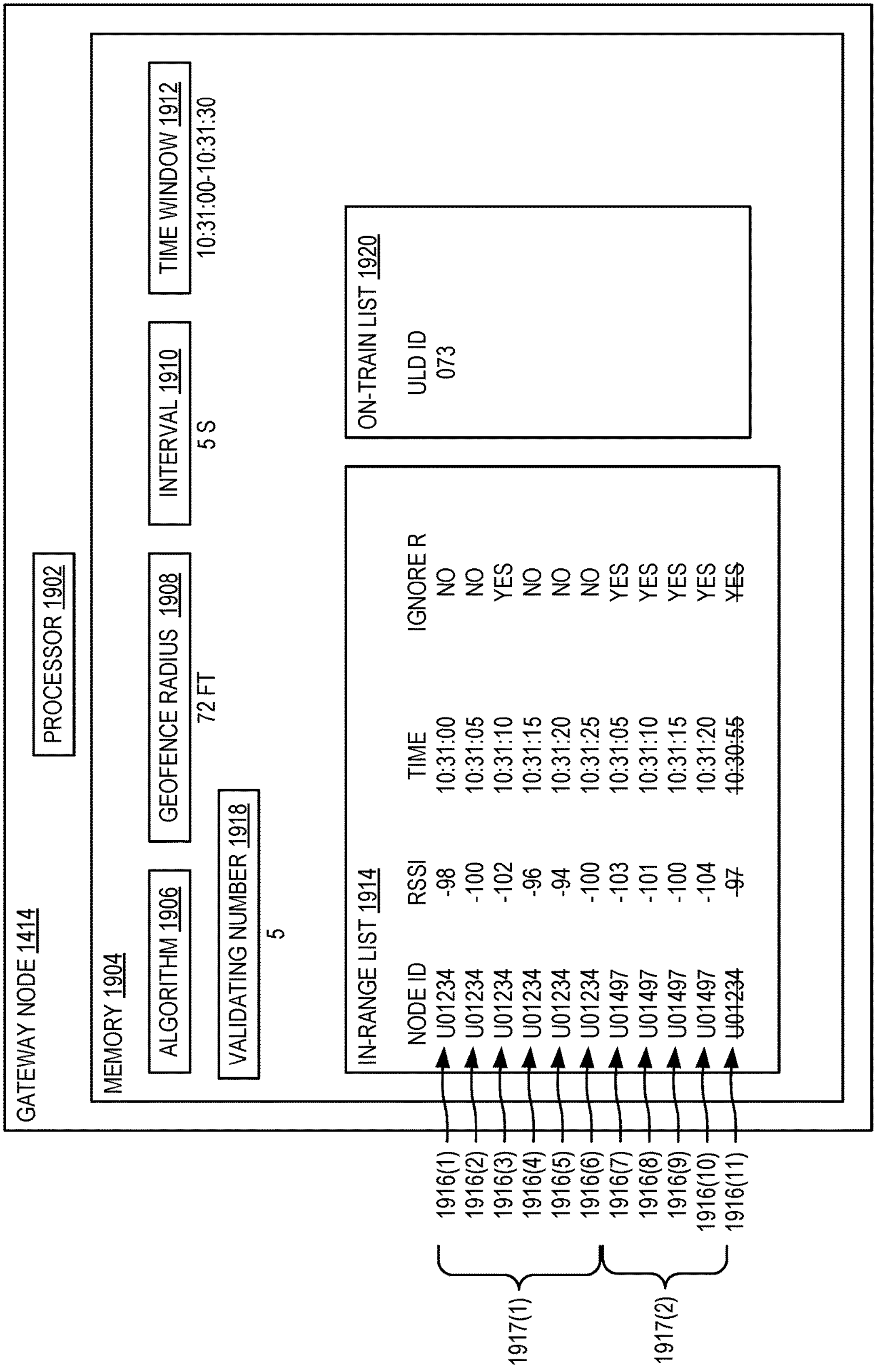
FIG. 19 is a block diagram illustrating the gateway node of the tug of FIG. 14 in further example detail, in embodiments.

FIG. 17 is a plan view of area 1424 of FIG. 14 at a first time illustrating use of a geofence 1702 by gateway node 1414 of tug 1410 to detect ULDs 1306 being transported on train 1412 pulled by tug 1410, in embodiments. FIG. 18 is a plan view of area 1424 of transportation facility 1402 of FIG. 14, at a later time that shown in FIG. 17, when trains 1412(1) and 1412(2) have moved further along their respective paths, in embodiments. FIG. 19 is a block diagram illustrating gateway node 1414 of tug 1410 of FIG. 14 in further example detail, in embodiments. FIG. 19 shows gateway node 1414 with a processor 1902 (e.g., processor 650' of FIG. 6B or processor 650" of FIG. 6C) and memory 1904 (e.g., memory 658' of FIG. 6B or memory 658" of FIG. 6C) storing an algorithm 1906, a geofence radius 1908, an interval 1910, a time window 1912, and an in-range list 1914. FIGS. 17, 18, and 19 are best viewed together with the following description.

Gateway node 1414 of tug 1410(1) implements a geofence 1702(1) based on a geofence radius 1908, where gateway node 1414 determines a location of tape node 1312, such as by determining a distance between gateway node 1414 and tape node 1312 based on a sensed RSSI of a transmission from tape node 1312 and then determining whether that distance is within the geofence radius. Accordingly, to determine whether tape node 1312 could be located on train 1412, geofence radius 1908 is set to a maximum length of train 1412. In the example of FIG. 17, tug 1410(1) pulls a maximum of three ULD carts 1406, wherein geofence radius 1908 (e.g., defining geofence 1702(1)) is set to include ULD 1306(3) positioned on the third ULD cart 1406 of train 1412(1). Accordingly, based on RSSI of responses received from tape nodes 1312 attached to ULDs 1306(1)-(3), these tape nodes 1312 are determined to be within geofence 1702(1). However, ULDs 1306(4)-(8) are also within geofence 1702(1) and thus geofence 1702(1) alone cannot distinguish between ULDs being pulled by tug 1410(1) and ULDs not being pulled by tug 1410(1).

Similarly, geofence 1702(2) implemented by gateway node 1414 of tug 1410(2) includes ULD 1306(6) positioned on the third ULD cart 1406 of train 1412(2) and thus tape nodes 1312 attached to ULDs 1306(4)-(6) are determined (e.g., based on RSSI of responses received by gateway node 1414) to be on train 1412(2). However, ULDs 1306(1)-(3), 1306(7), and 1306(8) are also within geofence 1702(2) and thus geofence 1702(2) alone cannot distinguish between ULDs being pulled by tug 1410(2) and ULDs not being pulled by tug 1410(2). To overcome this problem, gateway node 1414 implements algorithm 1906 to distinguish between tape node 1312 of ULDs 1306 being transported by train 1412 and those not being transported by train 1412 by determining which ULDs 1306 are following the same path as tug 1410.

FIG. 18 corresponds to a time that is one interval 1910 after the time of FIG. 17 and shows that for train 1412(1), ULDs 1306(1)-(3) and 1306(6) are still within geofence 1702(1) and ULDs 1306(4), 1306(5), 1306(7) and 1306(8) are no longer within geofence 1702(1). For train 1412(2), ULDs 1306(3), 1306(4)-(6), and 1306(8) are still within geofence 1702(2) and ULDs 1306(1), 1306(2), and 1306(7) are no longer within geofence 1702(2). After a subsequent interval, not shown, only ULDs 1306(1)-(3) remain with geofence 1702(1) and only ULDs 1306(4)-(6) remain within geofence 1702(2).

Gateway node 1414 scans (e.g., transmits a request to provoke response messages from tape node 1312 within wireless communication range) for ULDs only when tug 1410 is moving faster than a threshold speed (e.g., five miles per hour), invoking algorithm 1906 to determine between ULDs following the path of tug 1410 and ULDs not following the path of tug 1410. That is, gateway node 1414 does not scan for ULDs when tug 1410 is stopped or moving very slowly. The parameters of algorithm 1906 may be tuned to any threshold speed of tug 1410 and for any number of scans.

Gateway node 1414 scans for ULDs at an interval 1910 and determines which of the responding tape nodes 1312 are within geofence 1702, defined by geofence radius 1908 around gateway node 1414 based on the measured RSSI of each response message. Geofence radius 1908 and interval 1910 are based on a maximum length and an operating speed of train 1412. For example, where tug 1410 pulls a maximum of six ULD carts 1406 and a length of each ULD cart 1406 is twelve feet, geofence radius 1908 is set to seventy-two feet such that geofence 1702 includes a ULD on the last ULD cart 1406 of train 1412. Interval 1910 may be determined based on a minimum speed of tug 1410 and geofence radius 1908. In this example, tug 1410 is expected to move at a minimum speed of five miles per hour. Accordingly, a stationary ULD being passed by tug 1410 appears within geofence 1702 for less than twenty seconds. Accordingly, interval 1910 is set to five seconds such that a maximum of four responses, likely fewer, could be received from the stationary ULD while it is within geofence 1702.

Gateway node 1414 further defines a time window 1912 as interval 1910 (e.g., five seconds) multiplied by a validating number 1918 (e.g., 5) plus one. Responses receives outside time window 1912 are discarded. For example, five second multiplied by six defines time window 1912 as thirty seconds. Time window 1912 ends at the current time and thus forms a sliding window of time. Accordingly, time window 1912 defines a period in which fewer than validating number 1918 (e.g., five) responses are expected from tape nodes 1312 of any stationary ULD (e.g., ULDs 1306(7) and (8)) as it is passed by tug 1410. Interval 1910 and validating number 1918 may be adjusted for other speeds and lengths of train 1412 such that any stationary ULD being passed by tug 1410 does not remain within geofence 1702 for more than validating number minus two scans. ULDs 1306 being transported by train 1412 remain within geofence 1702 and therefore gateway node 1414 receives validating number plus one (e.g., six) responses from each of their tape nodes 1312 within time window 1912.

To further improve reliability and to reduce false positives, of six responses received from the same tape node 1312, the response with the weakest RSSI is ignored and a distance of the corresponding tape node 1312 from gateway node 1414 is determined by averaging the RSSI of the remaining five of the six responses. Nodes having fewer than validating number 1918 responses are ignored. Where the averaged RSSI indicates a distance of the tape node 1312 from gateway node 1414 is greater than geofence radius 1908 (e.g., tape node 1312 is outside geofence 1702 at a distance of more than seventy-two feet from gateway node 1414), it is ignored. Any non-ignored ULD 1306 with validating number 1918 of responses within time window 1912 is assumed to be part of train 1412. Further, since train 1412 has a maximum length (six ULD carts 1406 in this example, but could be four or any other number), gateway node 1414 selects the nearest ULDs 1306 that make up the maximum length as being part of the train. Effectively, gateway node 1414 ignores ULDs that are not following the same path as tug 1410.

In an alternative embodiment, gateway node 1414 uses a GPS receiver (e.g., GPS receiver 1054 of FIG. 10C and where gateway node 1414 has sufficient power, such as a large battery or receives power from tug 1410) or receives a current location from a location device of tug 1410, transmission of requests from gateway node 1414 may be triggered by distance moved by tug 1410. For example, the request may be triggered when tug 1410 is two-hundred meters from the location when the previous request was transmitted. Advantageously, the use of GPS ensures that scanning only occurs when tug 1410 is moving and thus stationary ULDs (e.g., ULDs 1306(7) and 1306(8)) are ignored, even when tug 1410 is moving slowly, is stationary, or is maneuvering within a small area. In these embodiments, time window 1912 is a dynamic interval that is adjusted to include the last validating number of scans.

In certain embodiments, the GPS receiver is used to determine a velocity of tug 1410 for determining when to transmit requests. In alternative embodiments, gateway node 1414 includes accelerometers that are used to determine movement of tug 1410 and to determine when to transmit requests.

In certain embodiments, tape node 1312 include GPS functionality for determining a current location of ULD 1306, whereby tape node 1312 reports its location to gateway node 1414, which determines therefrom whether ULD 1306 is on tug 1410. In certain embodiments, validation of ULD movement by tape node 1312 is performed redundantly to algorithm 1906. For example, where gateway node 1414 determines that ULD 1306 is being moved incorrectly by train 1412, gateway node 1414 may request that the corresponding tape node 1312 determine its current location using GPS for comparison to a current location of gateway node 1414, thereby allowing gateway node 1414 to resolve a false positive indication of a ULD 1306 included by algorithm 1906 for example. Further, where granular, real-time location tracking of ULD 1306 is desired, tape node 1312 updates cloud based server 1322 with its current location of ULD 1306, determined using GPS, at intervals.

Figure 20:
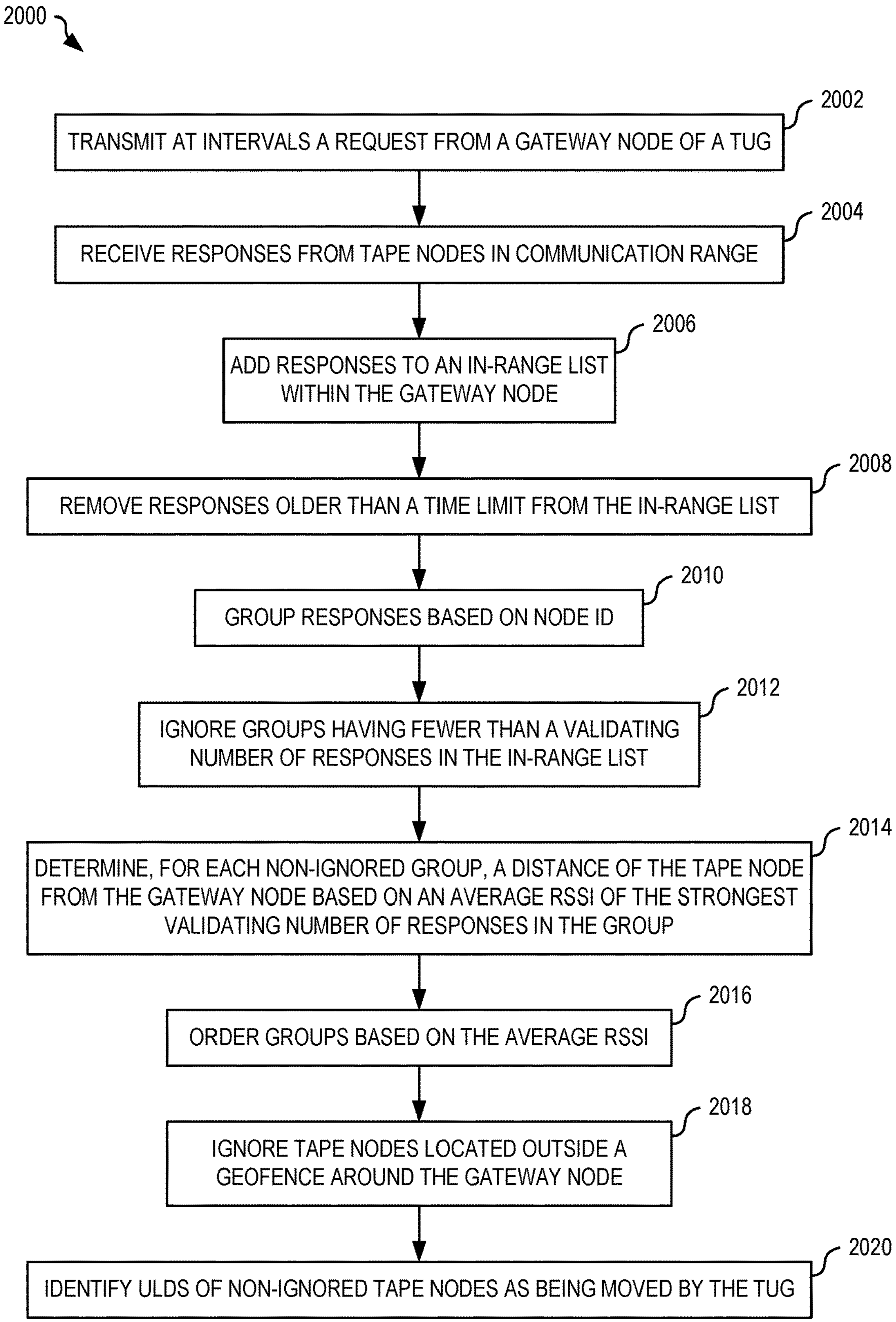
FIG. 20 is a flowchart illustrating one example method for determining ULDs being moved by the tug of FIG. 14, in embodiments.

FIG. 20 is a flowchart illustrating one example method 2000 for determining ULDs 1306 being moved by tug 1410 of FIG. 14, in embodiments. Method 2000 is, for example, implemented within algorithm 1906 of gateway node 1414 that it attached to tug 1410, for example.

In block 2002, method 2000 transmits, at intervals, a request from a gateway node of the tug. In one example of block 2002, gateway node 1414 transmits a request at an interval of five seconds. In block 2004, method 2000 receives, at the gateway node, responses from tape nodes in communication range. In one example of block 2004, gateway node 1414 receives responses transmitted from tape nodes 1312 within wireless communication range of gateway node 1414.

In block 2006, method 2000 adds the responses to an in-range list within the gateway node. In one example of block 2006, gateway node 1414 creates one response entry 1916 within in-range list 1914 for each received response. In block 2008, method 2000 removes responses older than a time window from the in-range list. In one example of block 2008, algorithm 1906 removes response entry 1916(11) from in-range list 1914. In block 2010, method 2000 groups the responses based on node ID. In one example of block 19010, algorithm 1906 forms a group 1917(1) of response entries 1916(1)-1916(6) based on ID U01234 of tape node 1312.

In block 2012, method 2000 ignores groups having fewer than a validating number of responses in the in-range list. In one example of block 2012, algorithm 1906 ignores group 1917(2) with response entries 1916(7)-1916(10) because they number less than validating number 1918. In block 2014, method 2000 determines, for each non-ignored group, a distance of the tape node from the gateway node based on an average RSSI of the strongest validating number of responses in the group. In one example of block 2014, algorithm 1906 determines an average of RSSI values for response entries 1916(1), 1916(2), 1916(4), 1916(5) and 1916(6) of group 1917(1), ignoring weakest RSSI value of −102 dB of response entry 1916(3), to get an average value of ninety-seven point six, which corresponds to a distance of sixty-two feet, for example.

Block 2016 is optional. In block 2016, method 2000 orders groups based on the average RSSI. In one example of block, algorithm 1906 orders groups 1917 based on the average RSSI calculated in block 2014, where the ordering defines the order of ULDs 1306 (e.g., ULD carts 1406) in train 1412. In block 2018, method 2000 ignores tape nodes located outside a geofence around the gateway node. In one example of block 2018, algorithm 1906 does not ignore the tape node having ID U01234 since the determined distance of sixty-two feet is within geofence radius 1908, which is seventy-two feet. In block 2020, method 2000 identifies ULDs corresponding to non-ignored groups as being towed by the tug. In one example of block 2020, algorithm 1906 adds ULD ID 073 based on its association with node ID U01234 to an on-train list 1920.

Method 2000 repeats at each interval 1910 to determine on-train list 1920.

Given the diversity in the continually changing environment of gateway node 1414, additional solutions for detecting ULDs 1306 on train 1412 may be implemented to improve reliability. Method 2000 may be used with any vehicle that transports ULDs 1306, or individual assets, where accurate association of the ULDs with the moving vehicle is required for tracking location of the ULDs. For example, a car with a gateway node implementing method 2000 may determine tracked assets are loaded onto the car and moving along with the car, as opposed to assets that are stationary and sitting at a road used by the car or loaded onto a different moving vehicle.

Functional Areas

In the example of FIG. 14, tug 1410(1) is shown pulling train 1412(1) through a functional area 1418 enroute to aircraft 1404. Functional area 1418 is a weight station, for example, where weight of each ULD 1306 on train 1412 is determined. However, functional area 1418 may represent other areas through which trains 1412 and/or ULDs 1306 pass. Functional area 1418 may include a gateway node 1420 that records measurements of each ULD being weighed and communicates these measurement to cloud based server 1322. In certain embodiments, gateway node 1420 may also scan for tape nodes 1312 within functional area 1418.

Gateway node 1414 pauses scanning for ULDs 1306 when tug 1410 stops (e.g., within functional area 1418) and may transition to a low power state. Gateway node 1420 detects tug 1410 (e.g., receives an ID of gateway node 1414 of tug 1410(1)) within functional area 1418 and starts scanning for tape nodes 1312 attached to ULDs 1306 on train 1412. Gateway node 1420 may retrieve the tug manifest from gateway node 1414 of tug 1410(1), or from cloud based server 1322, and determines whether any of the detected ULDs 1306 are incorrectly loaded on train 1412(1), or whether any ULD 1306 expected on train 1412 is missing. Gateway node 1414 may also attempt to connect with gateway node 1314 on loader 1304 to create an association that indicates loading of cargo space 1308. Similarly, gateway node 1414 may communicate with gateway node 1416 at staging area 1408 to indicate its presence and/or availability for coupling with ULD carts 1406. Where gateway node 1414 is unable to connect with other gateway nodes 1314, 1420, within a set number of attempts, then gateway node 1414 transitions to hibernation state (e.g., low power). In certain embodiments, gateway node 1414 periodically communicates with gateway node 1420, but reduces or disables other functions while in the low power state. For example, gateway node 1414 may periodically scan for notifications from gateway node 1420 and/or transmit the tug manifest to gateway node 1420.

When gateway node 1420 detects anomaly, gateway node 1420 generates a notification 1422 (e.g., a flashing light, an audible alert, or a notification on a smart phone of a driver of tug 1410, etc.) to immediately indicate the anomaly to an operator of tug 1410 for example. For example, gateway node 1420 may trigger an alarm (audio and/or visual) to indicate erroneous movement of ULD 1306, and/or may cause output of a notification on the mobile device of the driver of tug 1410. For example the notification 1422 and or the notification on the mobile device of the driver may include the ULD ID of ULD 1306 being moved in error. Advantageously, any anomaly in the loading of train 1412 is detected early during movement of ULDs 1306 within transportation facility 1402. Where functional area 1418 restricts occupancy to only one train 1412 at a time, identification of ULDs 1306(1)-(3) by gateway node 1420 is more reliable than at other areas where other ULDs may be present.

When tug 1410(1) departs functional area 1418, gateway node 1420 may stop scanning for tape nodes 1312. Gateway node 1414 detects (e.g., using accelerometer sensors) movement of tug 1410 as it leaves functional area 1418 and may control its short-range communication information to monitor the motion communication channel of wireless tracking system 1300. Each tape node 1312 of ULDs 1306 on train 1412(1) may detect (e.g., using accelerometer sensors or velocity sensors) movement of train 1412(1) and transmit a movement message on the motion communication channel. Accordingly, gateway node 1414 receives the movement messages and may discern therefrom which ULDs 1306 are on train 1412(1) when the received movement messages that align with the motion it detected. Thereafter, gateway node 1414 may resume scanning for ULDs 1306 on train 1412(1) as train 1412(1) continues its journey.

In certain embodiments, where gateway nodes 1314 and 1414 include Wi-Fi and/or cellular communication capability, upon detection of a loading or transporting anomaly for ULD 1306, the gateway node performs one or more of the following functions: make a phone call and play a prerecorded message, send one or more email messages, and/or send one or more text messages (e.g., over SMS). For example, gateway node 1314 and/or gateway node 1414 may be assigned a phone number or multiple phone numbers designated to receive a notifications (e.g., a prerecorded message or a text) indicating erroneous ULD movement. Similarly, gateway node 1314 and/or gateway node 1414 may be assigned an email address or multiple email addresses that is configured to receive email messages indicative of erroneous ULD movement. In certain embodiments, the phone number and/or email address is associated with the ULD and defined in manifest 1324.

In certain embodiments, the phone number corresponds to a mobile device of operator 1302 of loader 1304 or to a mobile device of a driver of tug 1410. Accordingly, gateway node 1314 calls operator 1302 and/or gateway node 1414 calls the driver of tug 1410 to indicate that intervention is needed for a ULD being loaded or moved erroneously. In certain embodiments, gateway node 1314 may receive the phone number from gateway node 1414. For example, a smartphone app installed on the mobile device of the driver of tug 1410 may communicate the phone number to gateway node 1414. Advantageously, direct communication between gateway node 1314 and operator 1302 and/or gateway node 1414 and the driver of tug 1410 allows low latency intervention.

In certain embodiments, one or more of tape node 1312 (where tape node 1312 has Wi-Fi and/or cellular capability), gateway node 1314 and/or gateway node 1414 may trigger an alarm (audio and/or visual) to indicate erroneous loading or movement of ULD 1306. For example, tape node 1312, gateway node 1314, or gateway node 1414 may cause one of notification 1330, human-interaction interface 1334, and notification 1336 to display a ULD ID of ULD 1306 being loaded in error, and/or cause output of notification 1422 and/or a notification on the mobile device of the driver of tug 1410 to display the ULD ID of ULD 1306 being moved in error. Advantageously, the error notification displays the corresponding ULD ID that is printed on ULD 1306 with the anomaly, allowing the operator or the driver to easily identify the ULD and correct the error. In one example of operation, tape node 1312, gateway node 1314, or gateway node 1414 communicates with alarm and/or notification devices using low-power or medium-power wireless communication (e.g., Bluetooth or LoRa). As shown in FIG. 13, notifications may be displayed by portable wireless network enhancement device 1332 (see the Enhancement Device Application for additional details), which may be a smart cone as shown or a briefcase style portable gateway. Where tape node 1312 does not have Wi-Fi or cellular capabilities, tape node 1312 may delegate the above task to another node of wireless tracking system 1300 that does.

ULD Cart Based Sensing

Figure 21:
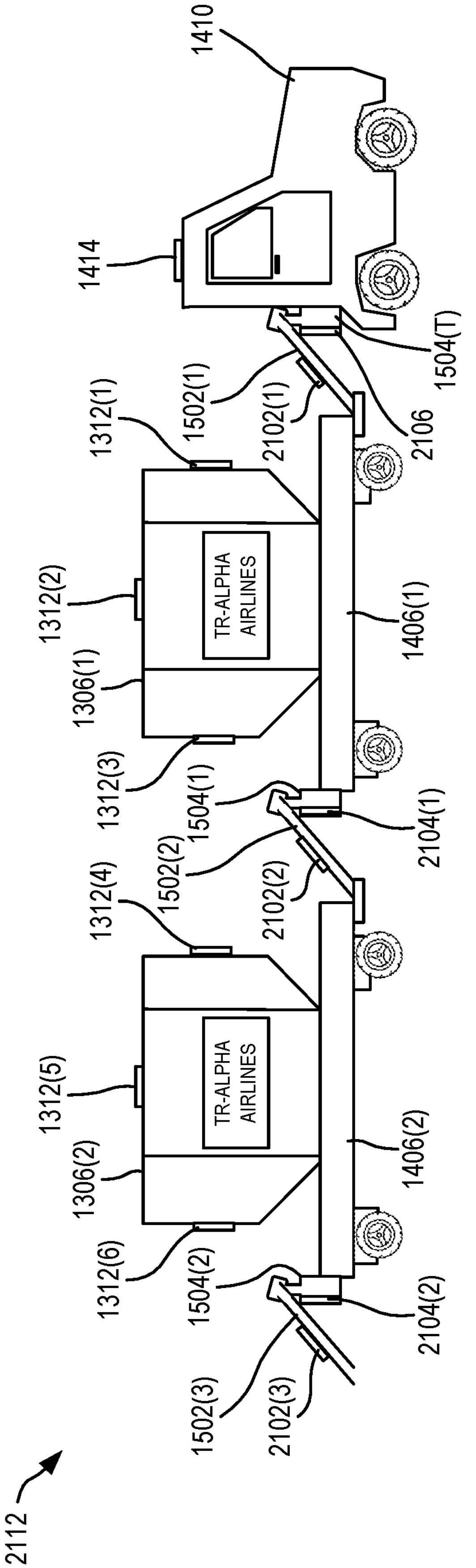
FIG. 21 shows a front portion of one example train formed of two ULD carts coupled with the tug and configured with front latch tape nodes, rear latch tape nodes, and a tug rear latch tape node that cooperate to monitor connectivity of ULD carts, in embodiments.
Figure 22:
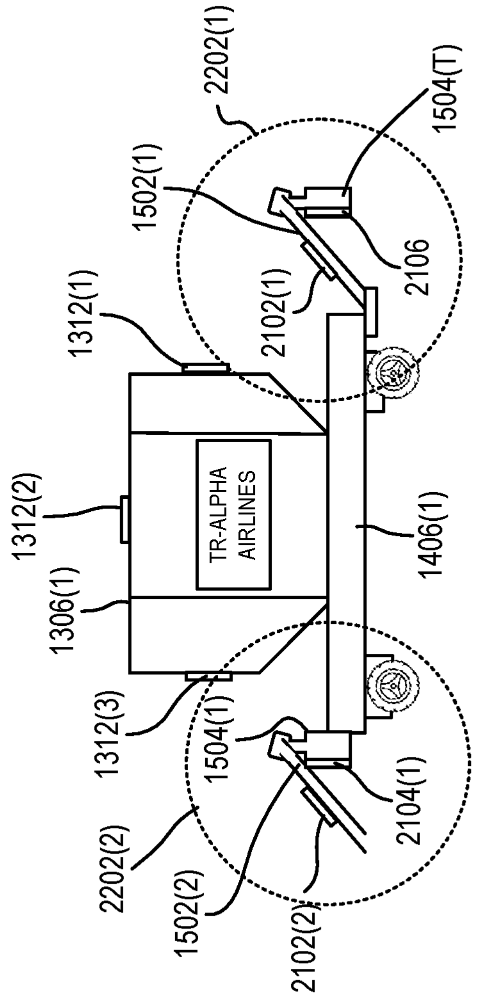
FIG. 22 shows a diagrammatic example of a geofence implemented by, and centered around, the front latch tape node and a geofence implemented by, and centered around, the rear latch tape node, in embodiments.

FIG. 21 shows a front portion of one example train 2112 having two ULD carts 1406 coupled with tug 1410 and configured with front latch tape nodes 2102, rear latch tape nodes 2104, and a tug rear latch tape node 2106 that cooperate to monitor connectivity of ULD carts 1406, in embodiments. FIG. 22 shows ULD cart 1406(1) of train 2112 of FIG. 21 in further example detail illustrating detection of mechanical coupling, in embodiments. FIGS. 21 and 22 are best viewed together with the following description.

ULD 1306(1) is configured with one tape node 1312(1) positioned at one end, one tape node 1312(2) positioned on top, and one tape node 1312(3) positioned at the opposite end to tape node 1312(1). ULD 1306(2) is configured with one tape node 1312(4) positioned at one end, one tape node 1312(5) positioned on top, and one tape node 1312(6) positioned at the opposite end to tape node 1312(4). Of ULD cart 1406(1), front latch 1502(1) of is configured with front latch tape node 2102(1) and rear latch 1504(1) is configured with rear latch tape nodes 2104(1). Of ULD cart 1406(2), front latch 1502(2) of is configured with front latch tape node 2102(2) and rear latch 1504(2) is configured with rear latch tape node 2104(2). Tug rear latch tape node 2106 is configured with rear latch 1504(T) of tug 1410. FIG. 21 also shows a front latch 1502(3) and corresponding front latch tape node 2102(3) of a next ULD cart of train 2112.

Advantageously, the use of front latch tape nodes 2102, rear latch tape nodes 2104 and tug rear latch tape node 2106 may determine, based on detection of wireless communication and collaboration, which ULD carts 1406 are mechanically linked to each other on train 2112, and may also determine an order of ULD carts 1406 in train 2112. This order is important and is determined based on a path train 2112 takes when delivering ULDs 1306 to aircraft 1404. For example, ULD carts 1406 at the front of train 2112 carry ULDs 1306 intended for aircraft 1404 earlier on the path of train 2112, and a last ULD cart 1406 on train 2112 is intended for aircraft 1404 at the end of the path of train 2112. For example, train 1412 may stop to drop one or more ULD carts 1406 at aircraft 1404(2) prior to stopping at aircraft 1404(1).

FIG. 22 shows a diagrammatic example of a geofence 2202(1) implemented by, and centered around, front latch tape node 2102(1) and a geofence 2202(2) implemented by, and centered around, rear latch tape node 2104(1). Geofence 2202 is a sphere centered around the respective latch tape node with a one foot radius, in certain embodiments. In other embodiments, the size and shape of geofence 2202 is different. For example, geofence 2202 may be affected by surrounding objects and its mounting surface, or may include an RF antenna with a controlled radiation patterns that may be tuned. In some embodiments, geofence 2202 is affected by adjusting sensitivity or directionality of a tunable RF antenna or by limiting detection to specific direction.

Front latch tape nodes 2102 and rear latch tape nodes 2104 detect other tape nodes within their respective geofences 2202. For example, front latch tape node 2102(1) and tug rear latch tape node 2106 detect each other, rear latch tape node 2104(1) and front latch tape node 2102(2) detect each other. Front latch tape nodes 2102 and rear latch tape nodes 2104 may communicate this connectivity information to gateway node 1414 of tug 1410 and gateway node 1414 processes the information to determine which ULD carts 1406 form train 2112, and an order of ULD carts 1406. In certain embodiments, front latch tape nodes 2102 and rear latch tape nodes 2104 communicate with other nodes of wireless tracking system 1300 (e.g., network communications environment 800 of FIG. 8) that determine ULD carts 1406 and order of train 2112. When front latch tape nodes 2102 and rear latch tape nodes 2104 detect another wireless node (e.g., either another latch tape node or tape node 1312 of ULD 1306 loaded onto ULD cart 1406, as further described below) within its geofence 2202, it receives one or more identifiers of the wireless node within the wireless communication. The one or more identifiers may include an identifier for a specific ULD 1306 or for a specific ULD cart 1406.

In certain embodiments, the other tape node detected by front latch tape node 2102 or rear latch tape node 2104 exchange identifiers when the other tape node is determined to be within geofence 2202. Each latch tape node may detect the presence of another latch tape node when the other latch tape node enters the geofenced area and receive a ULD or ULD cart identifier. When front latch tape node 2102 and rear latch tape node 2104 detect one another, either may determine, based on a distance between front latch tape node 2102 and rear latch tape node 2104, one or both of front latch tape node 2102 and rear latch tape node 2104 may determine whether the mechanical latch is engaged (e.g., such as when front latch 1502 is brought all the way down onto rear latch 1504 as close as possible). Each front latch tape node 2102 and rear latch tape node 2104 maintains an updated list of wireless nodes, ULDs, and ULD carts detected within its geofence 2202. Based on the nearest neighbor, determined from received signal strength, a latch tape node may determine which ULD and ULD cart is neighboring the respective latch tape node's ULD or ULD cart.

Figure 23:
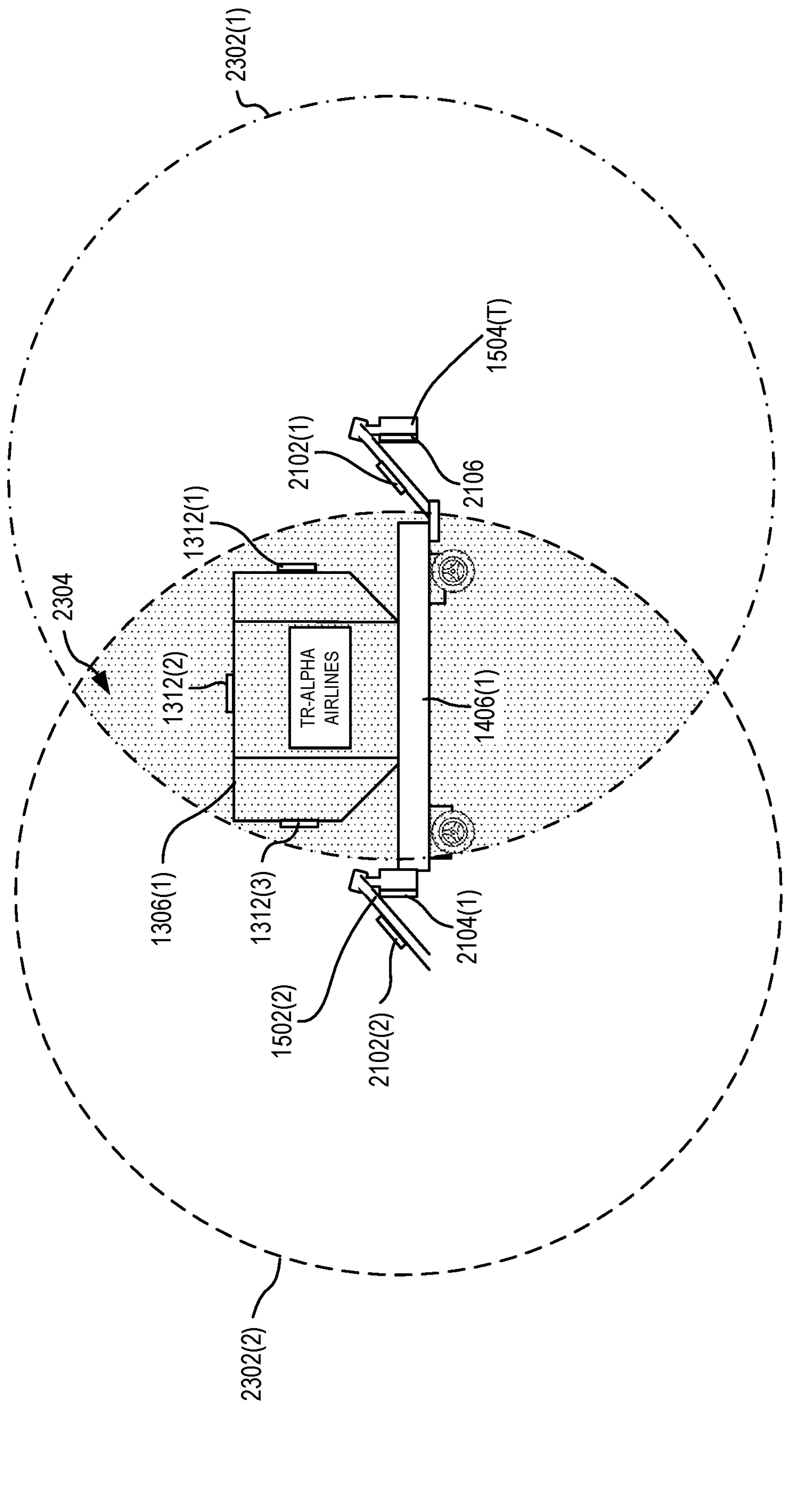
FIG. 23 shows the ULD cart of FIGS. 21 and 22 with a diagrammatic example of geofences around the front latch tape node and the rear latch tape node for detection of ULD loaded onto the ULD cart within an overlap region of the geofences, in embodiments.

FIG. 23 shows ULD cart 1406(1) of FIGS. 21 and 22 with a diagrammatic example of geofences 2302(1) and 2302(2) around front latch tape node 2102(1) and rear latch tape node 2104(1), respectively, for detection of ULD 1306(1) loaded onto ULD cart 1406(1) within an overlap region 2304 of the geofences, in embodiments. Geofences 2302 are different from geofences 2202 of FIG. 22. Geofence 2302(1) is a sphere centered around front latch tape node 2102(1) and geofence 2302(2) is a sphere centered around rear latch tape node 2104(1), and each has a radius of ten feet in certain embodiments. For example, the radius of geofences 2302 correspond to a size of ULDs 1306 and/or a length of ULD carts 1406 as used in the environment of wireless tracking system 1300. In other embodiments the size and shape of geofences 2302 may be different.

As described above, a plurality of tape nodes 1312 are attached to ULD 1306(1) for purposes of tracking the ULD. Front latch tape node 2102(1) detects tape nodes 1312(1)-(3) within geofence 2302(1) and for detecting ULDs loaded onto the respective ULD cart. However, where ULD cart 1406(1) is couples with ULD cart 1406(2), as shown in FIG. 21. rear latch tape node 2104(1) also detects tape nodes 1312 of ULDs 1306(2) on ULD cart 1406(2). Similarly, front latch tape node 2102(1) detects tape nodes of another ULD carried by another ULD cart 1406 coupled to front latch 1502(1).

To overcome this problem, rear latch tape node 2104(1) sends a list of tape nodes 1312 detected within geofence 2302(2) to front latch tape node 2102(1), which determines an intersection of the received list with its own list of tape nodes 1312 detected within geofence 2302(1), thus determining tape nodes 1312 located within overlap region 2304 and therefor likely indicative of ULD 1306(1) in this example. Alternatively, front latch tape node 2102(1) sends a list of tape nodes 1312 detected within geofence 2302(1)

to rear latch tape node 2104(1), which determines the intersection and thus tape node 1312 corresponding to ULD 1306(1). In certain embodiments, front latch tape node 2102(1) and rear latch tape node 2104(1) each send their lists to gateway node 1414 which determines the intersection and thus tape node 1312 corresponding to ULD 1306(1). Front latch tape nodes 2102 and rear latch tape nodes 2104 of each ULD cart 1406 of train 2112 determines a corresponding ULD 1306 it is transporting and reports the ULD identity to gateway node 1414 for example.

In certain embodiments, one or more of front latch tape nodes 2102 and rear latch tape nodes 2104 include LoRa communication capability (e.g., see medium-power communication-interface 672' of FIG. 6B) for reporting data back to a gateway node (e.g., gateway node 1414 of tug 1410) or server (e.g., server 804 of FIG. 8) of wireless tracking system 1300 (e.g., network communications environment 800 of FIG. 8).

Gateway node 1414 of tug 1410 may have GPS location tracking capabilities for tracking the geographic location of train 2112 and the location of ULD carts 1406.

One or more of gateway node 1414, front latch tape nodes 2102, and rear latch tape nodes 2104 of train 2112 may be configured to receive automatic dependent surveillance broadcast (ADS-B) signals broadcast from aircraft 1404 that include a wing number and/or a geographic location (e.g., GPS coordinates) of the aircraft that may be used to verify that ULDs 1306 are being delivered to a location appropriate for loading onto the intended aircraft 1404. For example, gateway node 1414 of tug 1410 may communicate with a server to verify a flight number against the aircraft identification and location and thereby determine when a current location of tug 1410 is appropriate for delivery of one or more ULDs 1306. In certain embodiments, gateway node 1414 of tug 1410 is configured to receive wireless communications from a distributed antenna system (DAS). For example, transportation facility 1402 may include DAS to extend coverage of Wi-Fi and/or cellular communications that may be used by gateway node 1414. In certain embodiments, DAS may be used to specifically extend or provide Wi-Fi and cellular coverage for nodes of wireless tracking system 1300.

FIG. 14 also shows other scenarios where ULDs 1306 are tracked and overall tracking is improved by combining multiple tracking techniques described above. ULDs 1306 may be stored in a storage area 1426 for a period until transportation is scheduled, for example. In some cases, the period may be several days or months. Within storage area 1426 there may be no direct mesh network coverage (e.g., by a dedicated gateway node). Accordingly, to preserve battery power, tape nodes 1312 on the stored ULDs 1306 reduce activity when movement is not detected, waking once a day to look for a Bluetooth mesh network (e.g., a gateway node or lime), switching to GPS and Wi-Fi and/or cellular communication for reporting back to cloud based server 1322 when no mesh network is found. Cloud based server 1322 thereby maintains an inventory of ULDs 1306 within storage area 1426. In certain embodiments, one tape node 1312 is configured to scan for other tape nodes 1312 to report back to cloud based server 1322, thereby saving battery power of other ones of tape nodes 1312 within storage area 1426 by only requiring the one tape node 1312 to report to the cloud based server 1322 on behalf of other nearby tape nodes. For example, the one tape node 1312 having the greatest remaining battery life is selected to scan and report for the other tape nodes. Certain ULDs 1306 may have tape nodes 1312 that do not include medium or long range communication capability and are therefore unable to communicate directly with cloud based server 1322. In such cases, a nearby tape node 1312 that is equipped with Wi-Fi and/or cellular communication capabilities uses short range communication communicates with these tape nodes and reports their location or approximate location (e.g., RSSI based on the short range wireless communication) to cloud based server 1322 on their behalf.

When tape node 1312 detects movement, tape node 1312 transmits a movement message on the motion communication channel of system 1300, as described above. A device that is moving the ULD 1306 (e.g., tug 1410 when the ULD 1306 is loaded onto a ULD cart 1406 for transportation to another part of the airport), or a nearby gateway node (e.g., a gateway node 1436 positioned near a ball-deck 1430 used to load ULDs 1306 onto an air-trailer 1428 (e.g., road trailers that are used to transport ULDs 1306 to and from transportation facility 1402) receive the movement messages on the motion communication channel, sending the tracking data to cloud based server 1322. Advantageously, ULDs 1306 within storage area 1426 are inventoried without requiring a specific action or activity. In certain embodiments, a dedicated gateway node may be positioned at storage area 1426 to inventory ULDs 1306 therein.

Wireless tracking system 1300 may implement a mesh network near ball-deck 1430 that includes multiple tape nodes 1432 (e.g., lime tape nodes) that implement Bluetooth communication and are positioned to detect ULDs 1306 being loaded onto air-trailers 1428 via ball-deck 1430. The mesh network may also include at least one plug-in node 1434 that implements LoRa communication for relaying tracking data from tape nodes 1432 to a gateway node 1436, which implements Wi-Fi and/or cellular communication for sending the tracking data to cloud based server 1322. For example, each position for loading one air-trailer 1428 may have at least one tape node 1432 configured to detect proximity of tape nodes 1312 as ULDs 1306 are moved onto, or off of, air-trailer 1428. Each tape node 1432 communicates, via plug-in node 1434, the detected IDs of tape nodes 1312 to gateway node 1436 that uses long-range communication (e.g., cellular) to communicate the tracking data to cloud based server 1322 for example.

Advantageously, wireless tracking system 1300 allows cloud based server 1322 to receive a full movement history of ULD 1306 at transportation facility 1402 (e.g., an airport). For example, cloud based server 1322 stores information such as ULD 1306(1) started on train 1412(1) pulled by tug 1410(1), stopped at functional area 1418 (e.g., for weighing) before the flight, arrived at loader 1304 that loaded it onto aircraft 1404(1) for flight 15az to Louisville. Particularly, wireless tracking system 1300 used multiple tracking functionality to verify that ULD 1306(1) was loaded onto aircraft 1404(1) by loader 1304 since gateway node 1314 received confirmation of a detected pressure changes by at least one tape node 1312 of ULD 1306(1) as gateway node 1314 detected upward movement of loading platform 1305 of loader 1304 while ULD 1306(1) was on the loader.

Tracking Assets Loaded Into ULD

Figure 24:
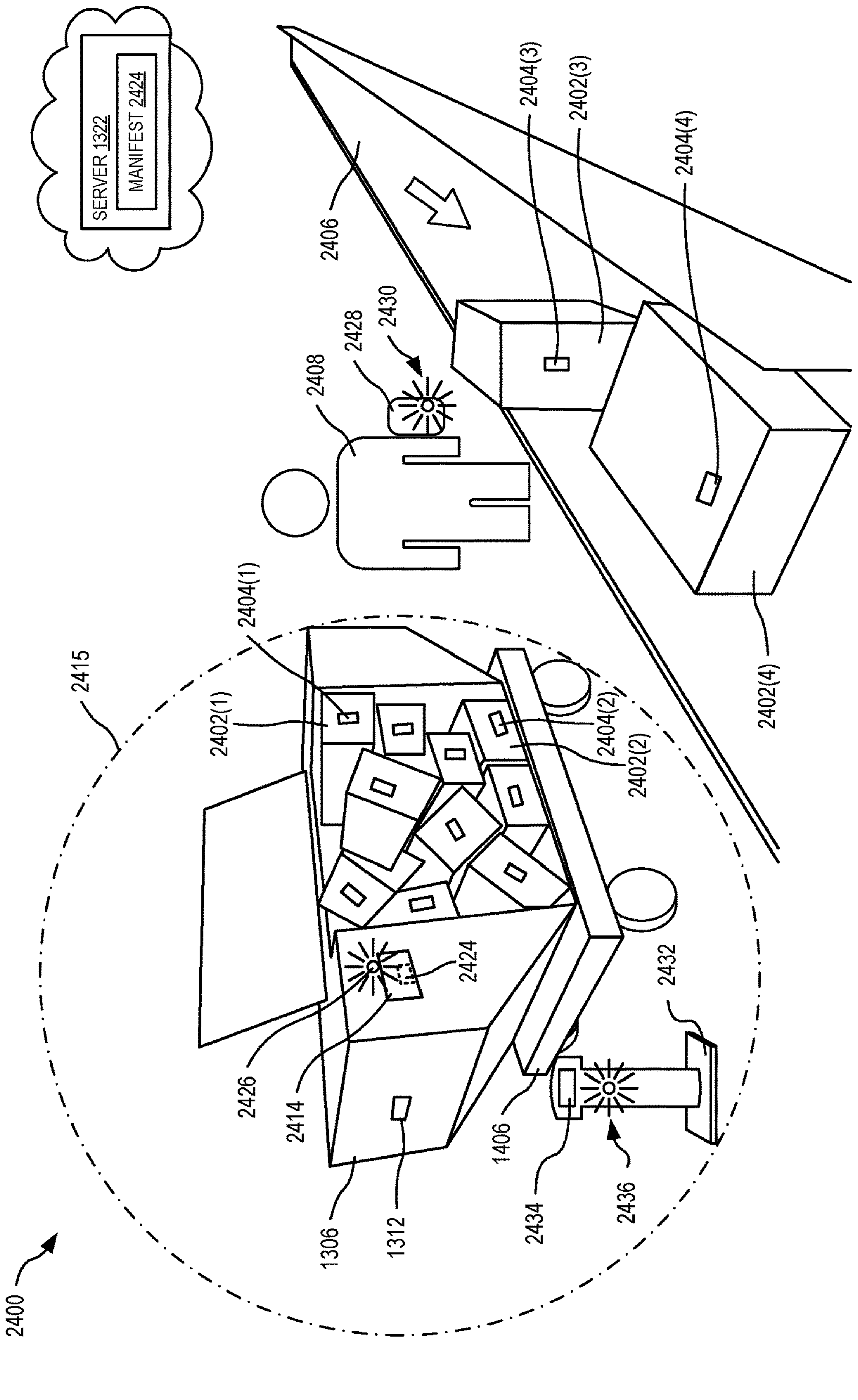
FIG. 24 is a schematic diagram illustrating example tracking of assets being loaded into a ULD by the wireless tracking system of FIG. 13, in embodiments.

FIG. 24 is a schematic diagram illustrating example tracking of assets being loaded into a ULD by wireless tracking system 1300 of FIG. 13, in embodiments. In this example, a plurality of assets 2402 (e.g., luggage, packages, etc.) are being loaded into ULD 1306 from a conveyor belt 2406 by an operator 2408. For example, operator 2408 reviews a printed label (e.g., on a tape node 2404 or a separate label) of each asset 2402 to determine whether the asset should be loaded into ULD 1306. ULD 1306 may also have a printed label indicating one or more of a destination, a route, a flight number, and so on, intended for the ULD. For clarity of illustration, not all assets 2402 and tape nodes 2404 within ULDs 1306 are labeled. ULDs 1306 may be carried by ULD cart 1406 in preparation for moving the ULD to a transportation vehicle (e.g., vehicle 1310 of FIG. 13, aircraft 1404 of FIG. 14, etc.). In certain embodiments, tape nodes 2404 are implemented as luggage tags.

In this embodiment, ULD 1306 is further configured with a gateway node 2414 that detects tape nodes 2404 of assets 2402 loaded into ULD 1306. In other embodiments, tape node 1312 operates to detect tape nodes 2404 of assets 2402 loaded into ULD 1306. Gateway node 2414 may implement a geofence 2415 with a radius set to only include the volume of ULDs 1306, and not extend significantly beyond that volume. Accordingly, gateway node 2414 may determine when asset 2402 is being loaded into ULD 1306 based on an RSSI of a received signal from tape node 2404 attached to the asset. In certain embodiments, gateway node 2414 monitors RSSI of signals received at intervals from tape nodes 2404 to identify assets that are stationary when ULDs 1306 is stationary, and that remain with ULD 1306 over time, thereby indicating that the asset is loaded into the ULD. For example, assets 2402(3) and 2402(4) are moving along conveyor belt 2406 and therefore signals from the respective tape nodes 2404(3) and 2404(4) have changing RSSI over time and therefore gateway node 2414 determines that these assets are not loaded into ULD 1306.

Gateway node 2414 may communicate with cloud based server 1322 (see FIG. 13) of wireless tracking system 1300 to receive a ULD manifest 2424 that defines unique IDs of tape nodes 2404 corresponding to assets 2402 expected to be loaded into ULDs 1306. Accordingly, gateway node 2414 may compare its list of tape nodes 2404 determined to be loaded into ULD 1306 against ULD manifest 2424 to identify discrepancies. In one embodiment, gateway node 2414 triggers a notification 2426 (e.g., a flashing light or display) to indicate detected discrepancies. For example, where asset 2402(1) is incorrectly loaded into ULD 1306, notification 2426 indicates the anomaly to operator 2408 such that the error may be easily correct. In certain embodiments, gateway node 2414 causes a mobile device 2428 of operator 2408 to display a notification 2430 of the loading error. In other embodiments, a portable wireless network enhancement device 2432 may be positioned near ULD 1306 during loading, whereby a human-interaction interface 2434 of portable wireless network enhancement device 2432 may be triggered by gateway node 2414 to generate a notification 2436 when gateway node 2414 detects a loading error.

In certain embodiments, ULD manifest 2424 defines destination (e.g., a vehicle ID) of each ULD 1306, but may not include a list of expected assets 2402. In such cases, tape nodes 2404 are assigned a destination (e.g., a vehicle ID) of the associated asset 2402. Accordingly, gateway node 2414 receives the destination along with the unique ID of tape node 2404 when asset 2402 is loaded onto ULD 1306 and compares the destination assigned to tape node 2404 to a destination of ULD 2404 to detect loading errors or discrepancies.

Advantageously, operator 2408 receives indications or loading errors during loading of assets 2402 into ULD 1306 allowing the problem to be resolved early and thereby avoiding costly delays and effort that would occur when the problem remains undetected until after ULD 1306 is moved. Further, gateway node 2414 may determine, based on ULD manifest 2424, when loading of ULD 1306 is complete, thereby indicating that the ULD is ready to be moved. Gateway node 2414 may also detect when ULD 1306 is being moved and, based on ULD manifest 2424, generate notification 2426 when any assets 2402 intended to be loaded into ULDs 1306 are missing.

RSSI Graph for Determining Location

Figure 25:
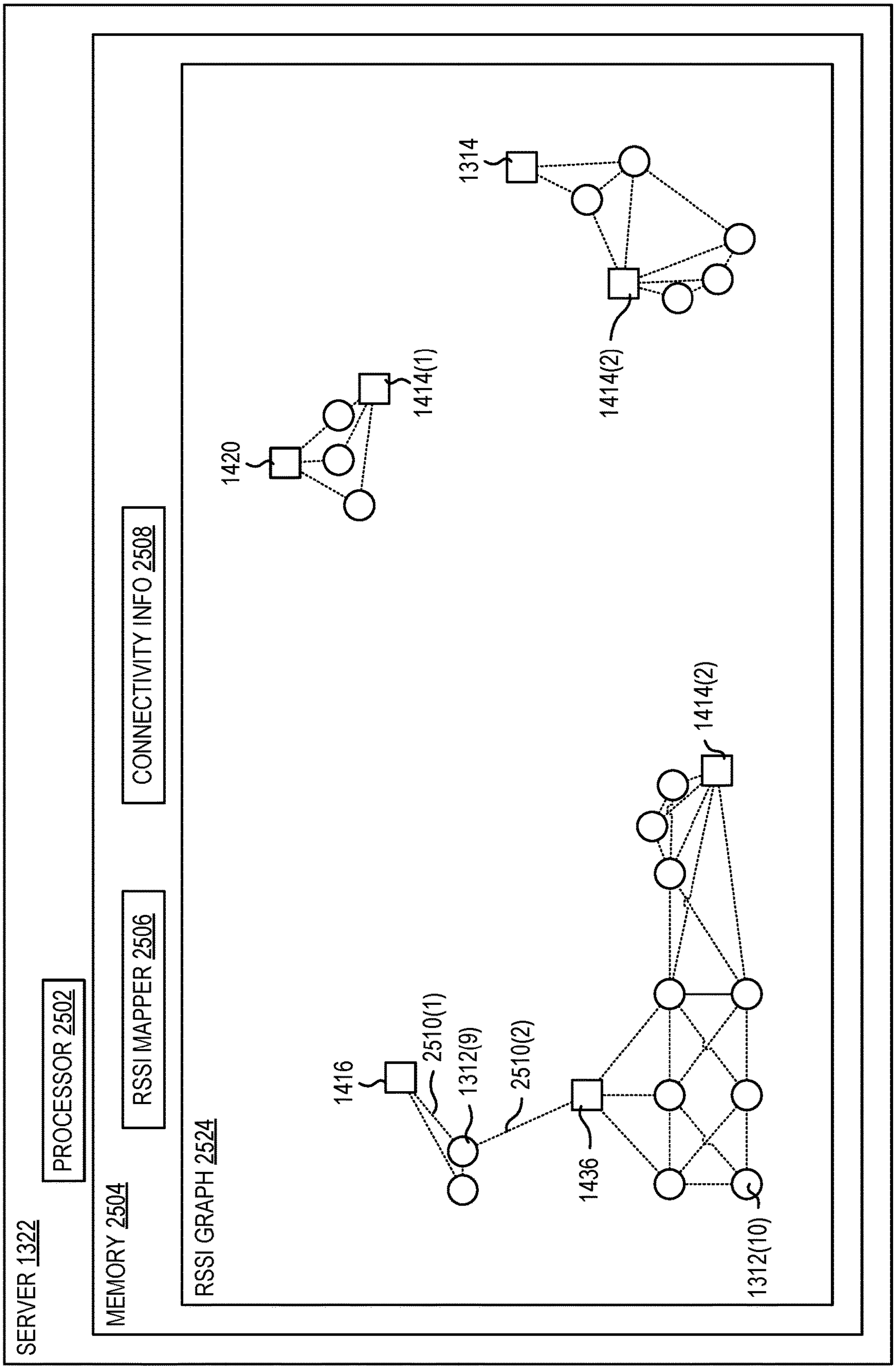
FIG. 25 is a schematic diagram illustrating example use of an RSSI graph within the cloud based server of FIG. 13 to determine location of the ULDs by the wireless tracking system, in embodiments.

FIG. 25 is a schematic diagram illustrating example use of an RSSI graph 2524 within cloud based server 1322 of FIG. 13 to determine location of ULDs 1306 by wireless tracking system 1300, in embodiments. FIG. 25 continues the example of FIG. 14 where ULDs 1306 are tracked within transportation facility 1402 by wireless tracking system 1300. This further includes tracking of ULDs within storage area 1426, for example. Wireless tracking system 1300 operates as a mesh network, as discussed above. Since tape nodes 1312 do not include, or do not use to conserve battery power, GNSS locationing services (e.g., GPS) to determine their geographic location, cloud based server 1322 receives connectivity information 2508 (e.g., unique ID and RSSI of received wireless signals) of tape nodes 1312 and 1432, from at least one of gateway nodes 1314, 1414, 1416, 1420, 1436, and plug-in node 1434. As shown in FIG. 14, gateway node 1414 of tug 1410(3) may be within wireless communication range of tape noes 1312 within storage area 1426 as tug 1410 passes nearby. Each tape node 1312 and 1432 may send collected connectivity information 2508 to a connected gateway node (e.g., any one of gateway nodes 1314, 1414, 1416, 1420, 1436, and plug-in node 1434 within wireless communication range), wherein the gateway node relays the connectivity information 2508 to cloud based server 1322.

Cloud based server 1322 includes at least one processor 2502 and memory 2504 that stores an RSSI mapper 2506 (e.g., software) and RSSI graph 2524. FIG. 25 illustrates RSSI graph 2524 spatially to illustrate the use of RSSI and geographic location relationships as determined by RSSI mapper 2506 based on received RSSI and corresponding unique IDs of connectivity information 2508. In this example, each gateway nodes 1314, 1414, 1416, 1420, 1436, and plug-in node 1434 includes its geographic location within connectivity information 2508, or has a static geographic location that is known by cloud based server 1322. These nodes are represented as squares. Other nodes that cannot determine or receive their own geographic location and represented as circles. Accordingly, squares represent gateway nodes 1314, 1414, 1416, 1420, 1436, and plug-in node 1434 with known locations within transportation facility 1402 and thereby function as reference locations and may be referred to hereinafter as reference nodes. Circles within RSSI graph 2524 represent locations of other nodes derived from the reference nodes and RSSI. RSSI of signals between nodes are represented as an RSSI 2510 (e.g., a dashed line) where a length of the dashed line corresponds to the RSSI.

In certain embodiments, RSSI mapper 2506 first determines locations of tape nodes (e.g., tape nodes 1312 and 1432) in direct communication with at least two reference nodes and based on RSSI of signals therebetween. For example, tape node 1312(9) has direct communication with gateway nodes 1416 and 1436, wherein a location of tape node 1312(9) may be defined by corresponding RSSI 2510(1) and 2510(2) as shown. In certain cases, a node may have multiple potential locations where triangulation is not definitive; however, these multiple locations may be resolved based on derived locations of other connected nodes. For example, RSSI mapper 2506 next uses connectivity information 2508 to determine locations of nodes not in direct communication with reference nodes. For example, tape node 1312(10) has no direct connection with any of gateway nodes 1314, 1414, 1416, 1420, 1436, or plug-in node 1434, but its location may be derived from the derived locations of other nearby nodes. Advantageously, cloud based server 1322 may use RSSI graph 2524 to track locations of each node within transportation facility 1402 and thereby provides end-to-end tracking of ULDs 1306 and individual assets 2402.

Cloud based server 1322 may receive connectivity information 2508 substantially continuously such that RSSI graph 2524 is updated as nodes move within transportation facility 1402. Further, RSSI mapper 2506 may use indicated movement, or non-movement, to resolve multiple locations into a single location.

ULD 1306 may represent any type, shape, and size of container used for transporting assets collectively, may represent uncontained assets groups, and may represent single assets. That is, ULD 1306 is not limited to the shapes indicated by the figures hereof.

Computer Apparatus

Figure 26:
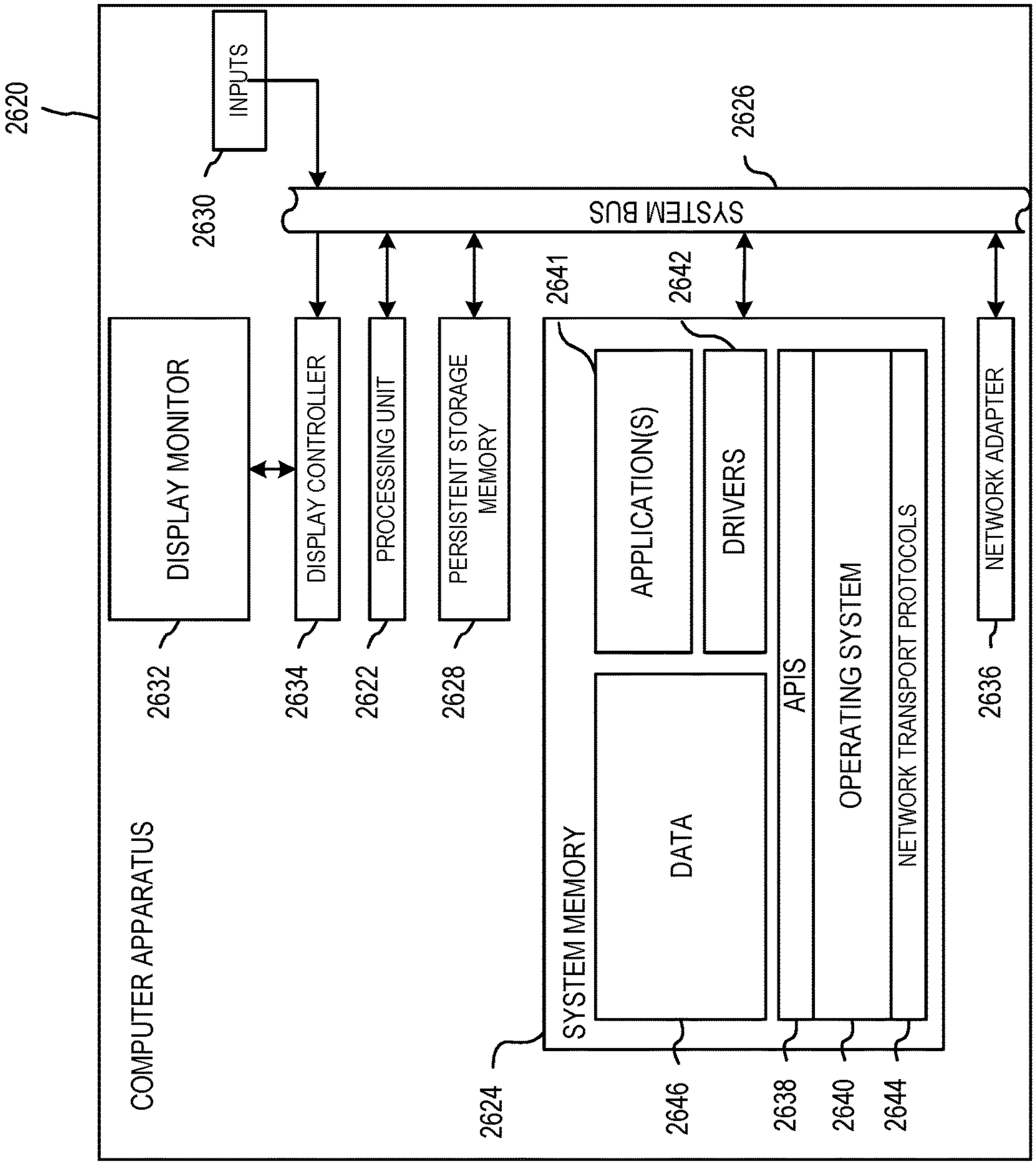
FIG. 26 shows one example computer apparatus that, either alone or in combination with one or more other computing apparatus, is operable to implement one or more of the computer systems described in this specification, in embodiments.

FIG. 26 shows an example embodiment of computer apparatus 2620 that, either alone or in combination with one or more other computing apparatus, is operable to implement one or more of the computer systems described in this specification. For example, computer apparatus 2620 may represent any of a phone, a mobile device, a smartphone, wireless transducing circuit 410 of FIG. 4, segment 640 of FIG. 6A, segment 670 of FIG. 6B, segment 680 of FIG. 6C, tracking circuit 778 of FIGS. 7A and 7B, mobile gateways 810, 812, and stationary gateway 814 of FIG. 8, network service servers 904, long-range tape node 982, medium range tape node 976, and short-range tape node 972 of FIG. 9A, master node 1051, nodes 1020 and 1026 of FIG. 10A, nodes 1034 and 1038 of FIG. 10B, peripheral nodes 1058, 1060, 1062 of FIG. 10C, tape nodes 1312, gateway node 1314, cloud based server 1322, and portable wireless network enhancement device 1332 of FIG. 13, multiple tape nodes 1432, at least one plug-in node 1434, and gateway nodes 1414, 1416, 1420, and 1436 of FIG. 14, and front latch tape nodes 2102 and rear latch tape nodes 2104 of FIG. 21. The computer apparatus 2620 includes a processing unit 2622, a system memory 2624, and a system bus 2626 that couples the processing unit 2622 to the various components of the computer apparatus 2620. The processing unit 2622 may include one or more data processors, each of which may be in the form of any one of various commercially available computer processors. The system memory 2624 includes one or more computer-readable media that typically are associated with a software application addressing space that defines the addresses that are available to software applications. The system memory 2624 may include a read only memory (ROM) that stores a basic input/output system (BIOS) that contains start-up routines for the computer apparatus 2620, and a random-access memory (RAM). The system bus 2626 may be a memory bus, a peripheral bus, or a local bus, and may be compatible with any of a variety of bus protocols, including PCI, VESA, Microchannel, ISA, and EISA. The computer apparatus 2620 also includes a persistent storage memory 2628 (e.g., a hard drive, a floppy drive, a CD ROM drive, magnetic tape drives, flash memory devices, and digital video disks) that is connected to the system bus 2626 and contains one or more computer-readable media disks that provide non-volatile or persistent storage for data, data structures and computer-executable instructions.

A user may interact (e.g., input commands or data) with the computer apparatus 2620 using one or more input devices 2630 (e.g. one or more keyboards, computer mice, microphones, cameras, joysticks, physical motion sensors, and touch pads). Information may be presented through a graphical user interface (GUI) that is presented to the user on a display monitor 2632, which is controlled by a display controller 2634. The computer apparatus 2620 also may include other input/output hardware (e.g., peripheral output devices, such as speakers and a printer). The computer apparatus 2620 connects to other network nodes through a network adapter 2636 (also referred to as a "network interface card" or NIC).

A number of program modules may be stored in the system memory 2624, including application programming interfaces 2638 (APIs), an operating system (OS) 2640 (e.g., the Windows® operating system available from Microsoft Corporation of Redmond, Washington U.S.A.), software applications 2641 including one or more software applications programming the computer apparatus 2620 to perform one or more of the steps, tasks, operations, or processes of the positioning and/or tracking systems described herein, drivers 2642 (e.g., a GUI driver), network transport protocols 2644, and data 2646 (e.g., input data, output data, program data, a registry, and configuration settings).

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

Combination of Features

Features described above as well as those claimed below may be combined in various ways without departing from the scope hereof. The following enumerated examples illustrate some possible, non-limiting combinations:

(A1) A method for detecting loading of an asset into a vehicle, includes: detecting, by a gateway node physically coupled to a loading platform of a loader, an increase in elevation of the loading platform; receiving, by the gateway node, a movement message containing a unique ID of a wireless tracking device attached to the asset; and determining, by the gateway node, that the asset is being loaded into the vehicle based on the detected increase in elevation of the loading platform and an association of the unique ID with the asset.

(A2) Embodiments of (A1), the asset being a unit loading device and the vehicle being an aircraft.

(A3) Either of embodiments of (A1) or (A2), further including determining that the asset is being loaded erroneously when the unique ID does not match a manifest of the vehicle.

(A4) Any of embodiments of (A1)-(A3), further including determining, by the gateway node, a current location of the gateway node; determining, based on the current location, a vehicle identifier (ID) of the vehicle; and retrieving the manifest of the vehicle based on the vehicle ID.

(A5) Any of embodiments of (A1)-(A4), further including determining, by the gateway node, a vehicle identifier (ID) of the vehicle; and retrieving the manifest of the vehicle based on the vehicle ID.

(A6) In any of embodiments of (A1)-(A5), the gateway node retrieving the manifest for a portion of a current day, the manifest defining a geofence of a loading area of the vehicle.

(A7) Any of embodiments of (A1)-(A6), further including determining the loader is at a wrong location when a current location of the gateway node is not within the geofence of the loading area.

(A8) Any of embodiments of (A1)-(A7), further including generating a notification to indicate an anomaly for the asset when the asset is being loaded erroneously.

(A9) In any of embodiments of (A1)-(A8), the notification triggering one or both of a flashing light and an audible alert near the loader.

(A10) In any of embodiments of (A1)-(A9), the notification including a notification sent to a mobile device of an operator of the loader.

(A11) In any of embodiments of (A1)-(A10), the notification comprising one or more of a phone call, a text message, and an email message.

(A12) Any of embodiments of (A1)-(A11), further including positioning a portable wireless network enhancement device near the loader, the portable wireless network enhancement device communicating with the gateway node to display the notification.

(A13) Any of embodiments of (A1)-(A12), further including determining a distance of the wireless tracking device from the gateway node based on a received signal strength index (RSSI) of the movement message; and determining, by the gateway node, that the asset is being loaded when the distance indicates that the asset is within a geofence around the gateway node that includes the loading platform, where the geofence does not extend significantly beyond the loading platform.

(A14) In any of embodiments of (A1)-(A13), the movement message being received on a motion communication channel of a wireless tracking system in response to the wireless tracking device detecting motion, wherein the motion communication channel is not used by wireless tracking devices that are stationary.

(A15) Any of embodiments of (A1)-(A14), further including detecting, by the gateway node, an decrease in elevation of the loading platform; receiving, by the gateway node, a second movement message containing the unique ID of the wireless tracking device; and determining that the asset corresponding to the unique ID is being unloaded from the vehicle based on the detected decrease in elevation of the loading platform, and the association of the unique ID with the asset.

(B1) A method, including determining, by a wireless tracking device on an asset, an elevation of the asset; and determining, by the wireless tracking device, that the asset has been loaded onto a vehicle when the elevation corresponds to an elevation of a cargo hold of the vehicle.

(B2) In embodiments of (B1), the determining the elevation including determining, by a gateway node physically coupled with a loading platform of a loader, ambient air pressure; determining the elevation based on the ambient air pressure; and sending the elevation to the wireless tracking device.

(C1) A method for detecting loading of an asset into a vehicle, including receiving, by a gateway node physically coupled to a loading platform of a loader, a movement message containing a loading indication and a unique ID of a wireless tracking device physically attached to the asset; and determining, by the gateway node, that the asset is being loaded into the vehicle based on the loading indication and an association of the unique ID with the asset.

(C2) Embodiments of (C1) further including determining, by the gateway node, a location of the gateway node; determining, based on the location, a vehicle identifier (ID) of the vehicle; and determining that the asset is being loaded in error when a manifest of the asset does not match the vehicle ID.

(C3) In either of embodiments (C1) or (C2), the asset being a unit loading device and the vehicle being an aircraft, wherein the manifest defines a flight number of the aircraft, the method further including receiving, from a cloud based server, a designated area for loading the aircraft based on the flight number; and determining, by the gateway node, that the asset is being loaded in error when the location of the gateway node is not within the designated area.

(C4) In any of embodiments (C1)-(C3), the designated area being one of an airport gate and a tarmac area of an airport.

(C4) Either of embodiments (C1) or (C3) further including detecting, by the wireless tracking device, an increase in elevation of the asset; determining, by the wireless tracking device, that the asset is being loaded; and sending the movement message to the gateway node.

(D1) A method for determining assets being moved by a tug, including transmitting, at intervals, a request from a gateway node physically coupled to the tug; receiving, at the gateway node, responses to the request from wireless tracking devices in communication range of the gateway node, each response including a corresponding node identifier (ID) of the wireless tracking device sending the response; adding the responses to an in-range list within the gateway node; removing responses received outside a time window from the in-range list; grouping the responses based on the node ID; ignoring groups having fewer than a validating number of responses; determining, for each non-ignored group, a distance of a corresponding asset from the gateway node based on an average RSSI of a strongest validating number of responses for the group; ignoring groups located outside a geofence around the gateway node; and identifying assets associated with non-ignored groups as being on a train pulled by the tug.

(D2) Embodiments of (D1) further including receiving, within the gateway node, a tug manifest defining at least one node ID of each asset included on the train; determining an anomaly for assets on the train that are not in the tug manifest and assets in the tug manifest that are not on the train; and generating a notification indicative of the anomaly.

(D3) In either of embodiments (D1) or (D2), the time window being determined as the interval multiplied by the validating number plus one.

(D4) In any of embodiments (D1)-(D3), the geofence includes a last asset cart of a maximum length train pulled by the tug.

(D5) In any of embodiments (D1)-(D4), the geofence not extend significantly beyond the last asset cart.

(E1) A wireless tracking method for generating a notification of a tracking anomaly with low latency for movement of an asset at a transportation facility, including tracking, by a first gateway node, movement of the asset within a functional area of the transportation facility; tracking, by a second gateway node, movement of the asset on vehicle within the transportation facility; tracking, by a third gateway node, movement of the asset being loaded into a cargo space of a transportation vehicle; determining an anomaly when any of the tracking movements indicate that the asset has departed from an expected path through the transportation facility; and generating a notification indicating the anomaly early during movement of the asset.

(F1) A method, including determining, by a gateway node associated with a vehicle, movement of the vehicle at a speed above a threshold value; receiving, by the gateway node on a motion communication channel when the speed is above the threshold speed, a broadcasted signal including an identifier of a wireless tracking device; and determining, by the gateway node, that an asset associated with the broadcasted identifier is loaded onto the vehicle when that a received signal strength of the broadcast signal is above a threshold value.

(F2) In embodiments of (F1), the gateway node receiving on a stationary communication channel, different from the motion communication channel, when the speed is greater than the threshold speed.

(F3) In either of embodiments (F1) or (F2), the wireless tracking device transmitting the broadcast signal at intervals when a detected speed of the wireless tracking device is greater than a threshold speed.

(F4) In any of embodiments (F1) or (F3), the wireless tracking device only transmits on the motion communication channel when a detected speed of the wireless tracking device is greater than a threshold speed.

(G1) A method for determining assets being moved by a tug, including receiving, by a gateway node of the tug, a first message indicating a first front latch of a first cart is coupled to a first rear latch associated with a first rear latch node ID; determining that the first cart is coupled to the tug when the first rear latch node ID is associated with a rear latch tape node of the tug; and determining that the first cart is coupled to a second cart when the first rear latch node ID is associated with a rear latch tape node of the second cart.

(H1) A method for determining coupling of carts in a train, including receiving, by a front latch tape node of a first cart, a first transmission including a rear latch ID from a rear latch tape node of a second cart or a tug; determining, by the front latch tape node, a first distance of the rear latch tape node from the front latch tape node based on an RSSI of the first transmission; determining that a front latch of the first cart is coupled to a rear latch of the second cart or the tug when the first distance is within a first geofence around the front latch tape node; and sending a message indicating the coupling between a front latch ID of the front latch and a rear latch ID of the rear latch.

(H2) Embodiments of (H1) further including receiving, by the rear latch tape node, a second transmission including the front latch ID from the front latch tape node; determining, a second distance of the front latch tape node from the rear latch tape node based on an RSSI of the second transmission; determining that the rear latch is coupled to the front latch when the second distance is within a second geofence around the rear latch tape node; and sending a second message indicating the coupling between the rear latch ID and the front latch ID.

(H3) Either embodiments of (H1) or (H2), further including receiving the second message by a cloud based server that determines an order of carts in the train based on an association of the front latch ID with a first cart and an association of the rear latch ID with either a second cart or the tug.

(I1) A method for detecting an asset on a cart, including receiving, by a front latch tape node of the cart, a first transmission including a first node ID from a first wireless tracking device attached to the asset; determining, by the front latch tape node, a first distance of the first wireless tracking device from the front latch tape node based on a first RSSI of the first transmission; determining, by the front latch tape node, that; receiving, by a rear latch tape node of the cart, a second transmission including a second node ID from a second wireless tracking device attached to a second asset; determining, by the rear latch tape node, a second distance of the tape node from the rear latch tape node based on a second RSSI of the second transmission; sending a message including the second node ID from the rear latch tape node to the front latch tape node when the second distance is within a second geofence of the rear latch tape node; and determining, by the front latch tape node, an asset ID of the first asset based on the first node ID when (a) the first distance is within a first geofence of the front latch tape node and (b) the first node ID and the second node ID are associated with the asset ID.

(I2) In embodiments of (I1), the first node ID and the second node ID being the same.

(I3) In either of embodiments (I1) or (I2), the first tape node and the second tape node being the same.

(I4) In any of the embodiments (I1)-(I3), the first transmission and the second transmission being the same.

What is claimed is:

1. A method for detecting loading of an asset into a vehicle, comprising:

detecting, by a gateway node physically coupled to a loading platform of a loader, an increase in elevation of the loading platform, the gateway node including a processor, memory and communication interface to communicate with a wireless tracking device;

receiving, by the gateway node, a movement message containing a unique ID of the wireless tracking device attached to the asset; and determining, by the gateway node, that the asset is being loaded into the vehicle based on the detected increase in elevation of the loading platform and an association of the unique ID with the asset.

2. The method of claim 1, the asset being a unit loading device and the vehicle being an aircraft.

3. The method of claim 1, further comprising determining that the asset is being loaded erroneously when the unique ID does not match a manifest of the vehicle.

4. The method of claim 3, further comprising:

determining, by the gateway node, a current location of the gateway node;

determining, based on the current location, a vehicle identifier (ID) of the vehicle; and retrieving the manifest of the vehicle based on the vehicle ID.

5. The method of claim 3, further comprising:

determining, by the gateway node, a vehicle identifier (ID) of the vehicle; and retrieving the manifest of the vehicle based on the vehicle ID.

6. The method of claim 3, wherein the gateway node retrieves the manifest for a portion of a current day, the manifest defining a geofence of a loading area of the vehicle.

7. The method of claim 6, further comprising determining the loader is at a wrong location when a current location of the gateway node is not within the geofence of the loading area.

8. The method of claim 3, further comprising generating a notification to indicate an anomaly for the asset when the asset is being loaded erroneously.

9. The method of claim 8, the notification triggering one or both of a flashing light and an audible alert near the loader.

10. The method of claim 8, the notification comprising a notification sent to a mobile device of an operator of the loader.

11. The method of claim 8, the notification comprising one or more of a phone call, a text message, and an email message.

12. The method of claim 8, further comprising positioning a portable wireless network enhancement device near the loader, the portable wireless network enhancement device communicating with the gateway node to display the notification.

13. The method of claim 1, further comprising:

determining a distance of the wireless tracking device from the gateway node based on a received signal strength index (RSSI) of the movement message; and determining, by the gateway node, that the asset is being loaded when the distance indicates that the asset is within a geofence around the gateway node that includes the loading platform, where the geofence does not extend significantly beyond the loading platform.

14. The method of claim 1, the movement message being received on a motion communication channel of a wireless tracking system in response to the wireless tracking device detecting motion, wherein the motion communication channel is not used by wireless tracking devices that are stationary.

15. The method of claim 1, further comprising:

detecting, by the gateway node, an decrease in elevation of the loading platform;

receiving, by the gateway node, a second movement message containing the unique ID of the wireless tracking device; and determining that the asset corresponding to the unique ID is being unloaded from the vehicle based on the detected decrease in elevation of the loading platform, and the association of the unique ID with the asset.

16. A method, comprising:

determining, by a wireless tracking device on an asset, an elevation of the asset, the wireless tracking device including a processor, memory, and at least one sensor used for determining the elevation; and determining, by the wireless tracking device, that the asset has been loaded onto a vehicle when the elevation corresponds to an elevation of a cargo hold of the vehicle.

17. The method of claim 16, the determining the elevation comprising:

determining, by a gateway node physically coupled with a loading platform of a loader, ambient air pressure;

determining the elevation based on the ambient air pressure; and sending the elevation to the wireless tracking device.

18. A method for detecting loading of an asset into a vehicle, comprising:

receiving, by a gateway node physically coupled to a loading platform of a loader, a movement message containing a loading indication and a unique ID of a wireless tracking device physically attached to the asset, the gateway node including a processor, memory and communication interface to communicate with the wireless tracking device; and determining, by the gateway node, that the asset is being loaded into the vehicle based on the loading indication and an association of the unique ID with the asset.

19. The method of claim 18, further comprising:

determining, by the gateway node, a location of the gateway node;

determining, based on the location, a vehicle identifier (ID) of the vehicle; and determining that the asset is being loaded in error when the unique ID does not match the vehicle ID in a manifest.

20. The method of claim 19, the asset being a unit loading device and the vehicle being an aircraft, wherein the manifest defines a flight number of the aircraft, the method further comprising:

receiving, from a cloud based server, a designated area for loading the aircraft based on the flight number; and determining, by the gateway node, that the asset is being loaded in error when the location of the gateway node is not within the designated area.

21. The method of claim 20, the designated area being one of an airport gate and a tarmac area of an airport.

22. The method of claim 18, further comprising:

detecting, by the wireless tracking device, an increase in elevation of the asset;

determining, by the wireless tracking device, that the asset is being loaded; and sending the movement message to the gateway node.

* * * * *

UNITED STATES PATENT AND TRADEMARK OFFICE

CERTIFICATE OF CORRECTION

PATENT NO. : 12,236,397 B2
APPLICATION NO. : 18/433227
DATED : February 25, 2025
INVENTOR(S) : Hendrik J. Volkerink et al.

It is certified that error appears in the above-identified patent and that said Letters Patent is hereby corrected as shown below:

On the Title Page

Item (72), Inventors currently reads:
"Hendrik J. Volkerink, Palo Alto, CA (US); Ajay Khoche, West San Jose, CA (US); Aaron Storrs, Santa Cruz, CA (US); Patrick Muggler, Palo Alto, CA (US); Prabhat Verma, Fremont, CA (US)", Should read:
-- Hendrik J. Volkerink, Palo Alto, CA (US); Ajay Khoche, West San Jose, CA (US); Aaron Storrs, Santa Cruz, CA (US); Patrick Muggler, Palo Alto, CA (US); Prabhat Verma, Fremont, CA (US); Rohit Govindbhai Chudasama, Fremont, CA (US) --.

Signed and Sealed this
Second Day of September, 2025

Coke Morgan Stewart
*Acting Director of the United States Patent and Trademark Office*